US00RE42284E

(19) United States
(12) Reissued Patent
Severson et al.

(10) Patent Number: US RE42,284 E
(45) Date of Reissued Patent: Apr. 12, 2011

(54) SIGNALING TECHNIQUES FOR DC TRACK POWERED MODEL RAILROADS

(76) Inventors: Frederick E. Severson, Beaverton, OR (US); Patrick Allen Quinn, Beaverton, OR (US)

(21) Appl. No.: 11/933,290

(22) Filed: Oct. 31, 2007

Related U.S. Patent Documents

Reissue of:
(64) Patent No.: 5,448,142
Issued: Sep. 5, 1995
Appl. No.: 08/127,630
Filed: Sep. 27, 1993

U.S. Applications:

(60) Continuation-in-part of application No. 08/012,364, filed on Feb. 2, 1993, now Pat. No. 5,394,068, which is a division of application No. 07/480,078, filed on Feb. 14, 1990, now Pat. No. 5,184,048, which is a division of application No. 07/037,721, filed on Apr. 13, 1987, now Pat. No. 4,914,431, which is a division of application No. 06/672,397, filed on Nov. 16, 1984, now abandoned.

(51) Int. Cl.
*H02P 7/00* (2006.01)

(52) U.S. Cl. ..... 318/280; 104/DIG. 1; 246/187 A

(58) Field of Classification Search ..... 318/280–286, 318/16, 34, 51, 53, 54, 59, 67, 587; 388/807–815; 104/300–302, DIG. 1; 340/825.69–825.72, 340/825.76; 246/187 A, 187 B
See application file for complete search history.

(56) References Cited

U.S. PATENT DOCUMENTS

| | | | | |
|---|---|---|---|---|
| 2,826,996 | A | | 3/1958 | Smith |
| 3,061,973 | A | | 11/1962 | Oberdorf |
| 3,425,156 | A | | 2/1969 | Field |
| 3,639,755 | A | | 2/1972 | Wrege |
| 3,664,060 | A | | 4/1972 | Longnecker |
| 3,839,822 | A | | 10/1974 | Rexford |
| 3,893,107 | A | | 7/1975 | Schedler |
| 4,051,783 | A | | 10/1977 | Caliri ..... 104/DIG. 1 |
| 4,266,368 | A | | 5/1981 | Nyman |
| 4,267,551 | A | | 5/1981 | Dankman et al. |
| 4,293,851 | A | | 10/1981 | Beyl, Jr. |
| 4,314,236 | A | | 2/1982 | Mayer et al. |
| 4,325,199 | A | | 4/1982 | McEdwards |
| 4,326,355 | A | * | 4/1982 | Watanabe ..... 446/178 |
| 4,334,221 | A | | 6/1982 | Rosenhagen et al. |
| 4,335,381 | A | | 6/1982 | Palmer |

(Continued)

OTHER PUBLICATIONS

Lionel Product Catalog, "Amazing New Lionel Electronic Control", p. 18, 1947.

(Continued)

*Primary Examiner*—Jonathan Salata
(74) *Attorney, Agent, or Firm*—Stolowitz Ford Cowger LLP

(57) ABSTRACT

Electronic circuits and methods are provided for remote control of a locomotive in a model railroad layout having an interruptible DC power supply coupled to the railroad track. The locomotive motor is isolated from the track so as to allow use of polarity reversals on the track power signal for controlling remote effects in the locomotive such as sound effects. An on-board electronic state generator is provided in the locomotive for maintaining one at a time of a predetermined set of states, at least one of the states having a corresponding remote effect associated therewith. Remote control signals such as a reverse in polarity of the DC track power signal are used to clock the state generator to a desired state, thereby permitting control of a plurality of remote effects using only the traditional DC power supply interface. The locomotive motor is controlled by a motor reverse unit so that the motor direction is controllable independently of the polarity of the DC power signal applied to the track. Accordingly, both motor direction and remote effects are controllable using only the throttle and polarity reversal switch which are available in known DC model railroad power supplies.

270 Claims, 18 Drawing Sheets

U.S. PATENT DOCUMENTS

| | | | | |
|---|---|---|---|---|
| 4,341,982 | A | 7/1982 | Lahti et al. | |
| 4,390,877 | A | 6/1983 | Curran | |
| 4,488,094 | A | 12/1984 | Min et al. | |
| 4,524,932 | A | 6/1985 | Bodziak | |
| 4,560,909 | A | 12/1985 | Peil | 318/67 X |
| 4,572,996 | A | 2/1986 | Hanschke et al. | |
| 4,584,504 | A | 4/1986 | Lee et al. | |
| 4,591,158 | A | 5/1986 | Samson et al. | |
| 4,613,103 | A | 9/1986 | Waranowitz | |
| 4,914,431 | A | 4/1990 | Severson et al. | |
| 4,946,416 | A | 8/1990 | Stern et al. | |
| 5,174,216 | A | 12/1992 | Miller et al. | |
| 5,251,856 | A | 10/1993 | Young et al. | |
| 5,321,344 | A | 6/1994 | Ott et al. | 318/280 |
| 5,341,453 | A | 8/1994 | Hill | 388/815 |

OTHER PUBLICATIONS

Edco Products, "Radio Control" (Ad), Model Railroader, Feb. 1952, p. 13, Kalmach Publishing, Milwaukee, WI.

Westcott, "All–purpose Twin–T", Model Railroader, Jul. 1958, pp. 42–47, Kalmbach Publishing, Milwaukee, WI.

Chaudiere, "Authentic Sound in Locomotives", Model Railroader, May 1959, pp. 33–34, Kalmbach Publishing, Milwaukee, WI.

Larson, "At the Throttle: Radio Control", Model Railroader, Sep. 1960, p. 19, Kalmbach Publishing, Milwaukee, WI.

Haning, "Transistor Throttle", Model Railroader, Nov. 1960, pp. 56–59, Kalmbach Publishing, Milwaukee, WI.

Westcott, et al., "Seven Circuits for Transistor Throttles", Model Railroader, Jan. 1962, pp. 58–63, Kalmbach Publishing, Milwaukee, WI.

MRC "Supercontrol Power Pack: the Controlmaster I", Model Railroader, Mar. 1962, pp. 20–22, Kalmbach Publishing, Milwaukee, WI.

M.R. Staff, "Trade Topics: Realist MK IV Train Control", Model Railroader, Apr. 1962, pp. 12–13, Kalmbach Publishing, Milwaukee, WI.

M.R. Staff, "Trade Topics: Trackmaster Control Unit", Model Railroader, Mar. 1963, pp. 6–8, Kalmbach Publishing, Milwaukee, WI.

Vogt, "Transistors for Model Circuitry", Model Railroader, May 1963, pp. 50–52, Kalmbach Publishing, Milwaukee, WI.

G.E., "A Giant Step Forward in Model Railroading", (Ad) Model Railroader, Jul. 1963, pp. 14–15, Kalmbach Publishing, Milwaukee, WI.

Fyffe, "Pure–Pulse Transistor Throttle", Model Railroader, Jan. 1965, pp. 63–64, Kalmbach Publishing, Milwaukee, WI.

Chaudiere, "Whistle, Bell, Steam, and Exhaust Sounds", Model Railroader, May 1966, pp. 44–48, Kalmbach Publishing, Milwaukee, WI.

Grande, "Magic Diesel Horn", Model Railroader, Apr. 1969, pp. 56–58, Kalmbach Publishing, Milwaukee, WI.

Westcott, "Improved Transistor Throttle", Model Railroader, Mar. 1969, pp. 13–15, Kalmbach Publishing, Milwaukee, WI.

Trade Topics—New Products—Built and Tested by MR's Staff—Steam Locomotive Sound System, Model Railroader, Jan. 1970, pp. 12–13, Kalmbach Publishing, Milwaukee, WI.

Cook, "Tender Speaker for Noise Effects", Model Railroader, Jan. 1971, pp. 62–63, Kalmbach Publishing, Milwaukee, WI.

Westcott, "At the Throttle: Command Control for Easy Operation", Model Railroader, Aug. 1971, p. 31, Kalmbach Publishing, Milwaukee, WI.

Fyffe Electronics, "Solid State Throttle", Model Railroader, Nov. 1971, pp. 32–34, Kalmbach Publishing, Milwaukee, WI.

MRC, "Power Pack for N & HO", Model Railroader, Dec. 1971, pp. 40–41, Kalmbach Publishing, Milwaukee, WI.

M.R. Staff, "The ABC's of Model Railroading: Model Train Control Methods 1", Model Railroader, Jan. 1972, pp. 73–78, Kalmbach Publishing, Milwaukee, WI.

M.R. Staff, "Trade Topics: New Products: Steam Locomotive Sound System", Tom Hunt, Model Railroader, Feb. 1972, pp. 28–29, Kalmbach Publishing, Milwaukee, WI.

M.R. Staff, "The ABC's of Model Railroading: Model Train Control Methods 2", Model Railroader, Feb. 1972, pp. 71–75, Kalmbach Publishing, Milwaukee, WI.

M.R. Staff, "Trade Topics: New Products: Steam Locomotive Sound & Lighting Simulator", Model Railroader, Jul. 1972, pp. 16–18, Kalmbach Publishing, Milwaukee, WI.

Larson, "The Digitrack 1600", Model Railroader, Aug. 1972, pp. 37–40, Kalmbach Publishing, Milwaukee, WI.

Paul, "Op Detection Circuit", Model Railroader, Aug. 1973, pp. 65–57, Kalmbach Publishing, Milwaukee, WI.

Miller, "Light Beams Detect Trains", Model Railroader, Sep. 1973, pp. 59–60, Kalmbach Publishing, Milwaukee, WI.

Chaudiere, "Echoes Add to Sound Effects", Model Railroader, Dec. 1973, pp. 42–43, Kalmbach Publishing, Milwaukee, WI.

L.H.W., "Diode Lighting for Locomotives and Cars", Model Railroader, May 1974, p. 61, Kalmbach Publishing, Milwaukee, WI.

Westcott, "Constant Lighting or Separate Control of Two Motors", Model Railroader, Sep. 1974, pp. 74–75, Kalmbach Publishing, Milwaukee, WI.

Ravenscroft, "Indicating Where Train Are: Final Description of MZL Control", Model Railroader, Oct. 1974, pp. 66–69, Kalmbach Publishing, Milwaukee, WI.

Feinwerktecnic Arthur Lechner, "Multi–train–electronic–80", (Ad) Model Railroader, Jul. 1975, p. 75, Kalmbach Publishing, Milwaukee, WI.

Janssen Enterprises, "All Other Power Supplies Are Obsolete", (Ad) Model Railroader, Jun. 1976, p. 18, Kalmbach Publishing, Milwaukee, WI.

Hediger, "HO Diesel Sound System", Model Railroader, May 1977, pp. 35–36, Kalmbach Publishing, Milwaukee, WI.

Thorne, "Action Crossing: Light Flash, A Diesel Horn Blows, and a Bells Ring", Model Railroader, Jul. 1977, pp. 79–82, Kalmbach Publishing, Milwaukee, WI.

Lambert Associates, "HO Sound System", Model Railroader, Aug. 1977, pp. 33–34, Kalmbach Publishing, Milwaukee, WI.

Douds, "Computers in Model Railroading", Model Railroader, Sep. 1977, pp. 83–97, Kalmbach Publishing, Milwaukee, WI.

B.T. Enterprises, "Speedmeter", Model Railroader, Nov. 1977, pp. 49–50, Kalmbach Publishing, Milwaukee, WI.

Greenberg, "No. 2333 Locomotive" Greenberg's Repair & Operating Manual For Lionel Trains, 1978, p. 173–178, Greenberg Publishing Co., Columbia, MD.

Greenberg, "Lionel "E–Units"", Greenberg's Repair & Operating Manual For Lionel Trains, p. 181, Greenberg Publishing Co., 1978, Columbia, MD.

Greenberg, "Lionel Smoke Generators", Greenberg's Repair & Operating Manual For Lionel Trains, 1978, p. 185–188, Greenberg Publishing Co., Columbia, MD.

Greenberg, "Lionel Transformers", Greenberg's Repair & Operating Manual For Lionel Trains, 1978, p. 531–533, Greenberg Publishing Co., Columbia, MD.

Greenberg, "Lionel Tenders Nos. 6026W and 6026T", Greenberg's Repair & Operating Manual For Lionel Trains, 1978, p. 649, Greenberg Publishing Co., Columbia, MD.

Greenberg, "Lionel Tenders Nos. 6026W and 6026T", Greenberg's Repair & Operating Manual For Lionel Trains, 1978, p. 651, Greenberg Publishing Co., Columbia, MD.

Greenberg, "Introduction (to Lionel Electronic Train Control", Greenberg's Repair & Operating Manual For Lionel Trains, 1978, p. 515–530, Greenberg Publishing Co., Columbia, MD.

M.R. Staff, "Railway Post Office: Command Control", Model Railroader, Jun. 1978, p. 20, Kalmbach Publishing, Milwaukee, WI.

M.R. Staff, "Trade Topics: New Products: Electronic Whistles", Model Railroader, Sep. 1978, pp. 36–37, Kalmbach Publishing, Milwaukee, WI.

Larsen, "At the Throttle: A Dream About to Come True", Model Railroader, Nov. 1978, p. 65, Kalmbach Publishing, Milwaukee, WI.

Hobby Marketing Inc., "Salota: Simultaneous, Independent Speed & Direction Control . . . ", (Ad) Model Railroader, May 1979p. 136, Kalmbach Publishing, Milwaukee, WI.

* cited by examiner

| * | Q1 | Q2 | STATE |
|---|---|---|---|
| 1 | 1 | 1 | FORWARD |
| 2 | 0 | 1 | NEUT. B. REVERSE |
| 3 | 0 | 0 | REVERSE |
| 4 | 1 | 0 | NEUT. B. FORWARD |

SIGNALING TECHNIQUES FOR DC TRACK POWERED MODEL RAILROADS

Matter enclosed in heavy brackets [ ] appears in the original patent but forms no part of this reissue specification; matter printed in italics indicates the additions made by reissue.

This application is a continuation-in-part of U.S. Ser. No. 08/012,364, filed Feb. 1, 1993 now U.S. Pat. No. 5,394,068, which is a division of U.S. Ser. No. 07/480,078, filed Feb. 14, 1990, now U.S. Pat. No. 5,184,048, which is a division of U.S. Ser. No. 07/037,721, filed Apr. 13, 1987, now U.S. Pat. No. 4,914,431 which is a division of Ser. No. 06/672,397, filed Nov. 16, 1984, now abandoned. ©Copyright Frederick Severson and Patrick Quinn 1993: The disclosure of this patent document contains material which is subject to copyright protection. The copyright owners have no objection to facsimile reproduction by anyone of the patent document or the patent disclosure, as it appears in the Patent and Trademark Office patent file or records, but otherwise reserve all copyrights whatsoever.

FIELD OF THE INVENTION

This invention describes ways to extend the controls and features of the model railroad train control and sound system described in U.S. Pat. No. 4,914,431. In particular, we describe a novel and simple way of generating and receiving remote control signals for DC powered two or three rail trains that does not require a change in the DC operating standard or require changing track power supplies.

BACKGROUND OF THE INVENTION

History of Model Railroad Standards

Model railroading has developed a number of standards since its beginning at about 1900. Some of the more obvious standards relate to the physical dimensions such as scale and track gauge. Other standards determine physical operating requirements such as coupler design, coupler height, wheel flange size, etc. A third category of standards specifies the electrical power requirements necessary to operate the electric motors inside the engines and the specification of remote control signaling, if any.

The advantage of a standard is that it allows all contributors to the field to specify their products in ways that will allow them to operate with existing model railroads. The disadvantage of a standard is that it can be too restrictive, not allowing new ideas and inventions to be integrated into older established model train layouts. As the pressure of new technology advances, the desire for new operating capabilities can become important enough to actually demand a change from the old standard to a new standard. This is always done with great reluctance since it often involves discarding older models that cannot be modified to work within the new standard or in can require extensive redesigns of existing layouts.

Usually, in model railroading, there is little change to the physical standards and even the ones that are introduced can often be integrated into existing layouts. For instance, a new coupler design can be added to some cars and still allow the operator to use all his other equipment by adding at least one car that has the old coupler style on one end and the new style on the other Changes to the electrical standards are much more difficult to accomplish.

Standards for AC Powered Model Trains

Commercial electric model trains in the United States were introduced about 1896 and used AC power applied to the track with AC/DC universal motors in the engines to power the wheels. The AC power, at first, came directly from 110 v household power but later, step-down transformers were used to provide a safer 20 to 30 volts of track power. When speed control was introduced, it was first accomplished by dropping the voltage to the track with resistors such as high-wattage slide-type potentiometers or switching in banks of light bulbs to vary the series resistance. In 1906, Lionel introduced variac-type transformers that could vary the track voltage more efficiently.

Remote control signaling for AC powered trains

In 1935, the Lionel corporation introduced the idea of applying a small amount of DC superimposed on the AC track power to do simple remote control operation of a whistle sound effect in their engines. Besides the difficulty of designing a reliable and inexpensive DC source, there were also technical obstacles with the DC detector in the engine. Lionel chose to use a special relay that would ignore AC and respond only to the presence of DC. This relay required a sizable amount of DC (1.1 v to 3 v) before the relay would close. Once closed, however, it only required a small amount (300–500 mV) to stay in the closed position. Unfortunately, if 5 v or more of DC was maintained on the track, the relay would often become magnetized and stay in the closed position even after the DC signal had been removed. Also, it was difficult to provide a sustained large-voltage DC signal from available rectifiers of the time that would not over-heat at the current levels required by Lionel motors. Lionel solved these problems by designing their DC remote control technique to use a lever or button that would first make contract to a source of half-wave rectified voltage and then to make contact to a second terminal that applied the full amount of track AC with a sustained superimposed 300 to 500 mV of DC. Although the half-wave rectified signal for the first contact would decrease the power to the track by more than half, it provided a very strong DC source signal and it was applied only long enough to close the horn relay in the engine. The first contact is called "horn position one" and the second contact is called "horn position two".

The early Lionel whistle sound effect used a motor to turn a fan that produced a "woooooo" like sound in two air chambers (same principle as an organ pipe). This motor required extra current from the power supply to the track and would slow the engine down. Lionel solved this problem by adding a booster winding to their transformer that added in an extra 5 to 8 volts of AC when the whistle button was pressed.

Lionel's method of applying AC power along with DC signaling and the use of the four position reversing unit (E-unit) has been the basis of their operating electrical standard since the early 1950's. At first, Lionel did not distinguish between plus or minus DC signaling since their whistle or horn sound effect would work with either polarity. Later in the 1980's, Lionel engines were introduced that had different remote control effects when positive or negative DC was superimposed on the AC power applied to the track; e.g. the horn or whistle would operate with +DC and the bell would toggle on and off with –DC. These systems used electronic detectors in the engine that would distinguish the different DC polarities. Unfortunately, these detectors required that the DC voltage component on the track exceed the amount necessary to turn on a silicon pon junction (about 0.7 to 0.9 v). The older Lionel transformers usually only produced this amount when the transformer horn button was in horn position one where half wave DC was applied. Since this reduces the power, the engines with the new electronic detectors would slow down when the whistle effect is operating even with the benefit of the whistle boost winding on their early transformers. With the transformer in horn position 2, the horn would often shut off completely or go off intermittently.

Also, when no horn signal was applied, the electronic horns had the annoying problem of periodically going off from noise on the track. This did not happen as often with the earlier horn design since the horn relay had a built in hysteresis that required a "position 1" signal to get the horn to operate followed by a "position 2" signal to keep it closed. The new electronic detectors could have been designed to maintain this standard by having hysteresis designed into the circuit. In other words, a large DC signal would be required to turn on the detector (horn position 1) and only a small amount required to keep in on (horn position 2). With the extra advantage of having the horn DC signal always start with a large amount of DC, the detector circuit could be designed to be more responsive to the large "position 1" horn signals to turn on quickly and, at the same time, more immune to noise spikes of DC on the track that are below the hysteresis threshold.

Most current Lionel transformer now only have a single horn position that produces from 0.8 to 5 volts of DC offset. It would have been an advantage for Lionel designers to stay within the existing standard to provide better horn detectors. Engineers and designers could have used the two horn positions to do other effects such as having the horn change pitch from horn position one to horn position two. The standard could easily have been expanded to have the value of DC voltage control some feature in a continuous analog manner (the pitch could vary continuously from a low to a high value depending on the amount of DC, etc.). Relaxing the standard to only having one horn signal position means that some older products will not work correctly with new transformers and some new products that could have been developed with the original standard will not work with modern power supplies. If the original Lionel standard is more accepted, then most of the newer power supplies will be discarded over time; however, if the new transformer design becomes the standard, then the older equipment will be discarded or changed to work with the newer horn signals. In either case, making changes to a standard can have significant implications. Again, maintaining the standard or intelligently extending the standard is the important issue. Any changes to a standard should be an expansion rather than a restriction. It is risky to make arbitrary changes to a standard since your products may become unacceptable.

There are a number of other specifications for the original standard used by Lionel that should be mentioned here:

1) Lionel also had always used full AC sine wave on the track to power the trains. The power was changed by changing the amplitude of the applied voltage by first using voltage-dropping techniques and then later by using vadacs. Some Lionel operating cars depended on the sine-wave shape of applied power for proper operation.

2) The range of applied A.C. voltage from most Lionel transformers is from completely off to turning on abruptly at 5 volts rms and then continuously variable up to 17–22 volts rms. The minimum voltage of 5 volts was chosen because most of the universal AC/DC motors used by Lionel would not start to rotate until 5 to 8 volts. When designing electronics that will operate on-board in a model train, the 5 volt minimum voltage is very useful since most simple circuits require a minimum of 3–5 volts to operate properly.

3) Lionel's also kept to the standard of using three-rail track for most of their trains which obviated the need to switch the track connections on reverse loops, and made it easier for children to operate.

Standards for DC Powered Model Trains

Also, in the mid 1940's, it was becoming possible to manufacture DC rectifiers with sufficient capacity and a low enough cost to power model railroads. This, along with the more efficient DC permanent magnet motor, allowed the model railroad field to introduce a new standard for model railroads that use DC power instead of AC power applied to the track. With on-board DC motors wired directly through the wheels to the track, the direction of model train locomotives could now be reversed by changing the polarity of DC track voltage at the power source. This gave the operator a simple method of controlling his model engine's direction by remote control. This standard is still in use today, primarily on two-rail systems. It's biggest problem is that, unlike the Lionel standard, there is no method specified to do simple remote control signaling.

Most model trains that were operated on DC power, used two-rail track with a polarity reversal switch to solve the reverse loop track problem. The range of applied track voltage is usually from 0–12 volts and most motors used in the locomotives are permanent DC "can" type. Some new power packs for G-Gauge, DC powered trains have a range from 0–17 volts DC. The applied DC voltage can be simply full wave rectified and varied over its range by changing the amplitude. However, many DC power packs will filter the DC to remove the AC ripple and control the amount of power to the track by either varying the amplitude or changing the duty cycle of a pulse drive output or a combination of both. In any case, unlike AC powered trains, there is often less of a range of applied track voltage and there is no dependable minimum voltage to power on-board electronic circuitry.

Standards for New Model Train Control Systems

One difficulty with designing any new control system is customer acceptance. It is most important that the new system not require major modification of the layout and the engines. In particular, it is an operating and marketing advantage for any new system to have the following characteristics:

It should allow older locomotives to interact with newer engines equipped with the new system receiver units (backward compatible). The new system should not require that all engines be changed before it can be used.

It should not require major rework or modification of the engines when installing any on-board new-system product that would, in turn, decrease the value of the engine.

It should operate with existing controllers and power supplies. If a new system controller/power pack is added to extend the system capabilities, it should be easily connected to the layout and require no modifications of the track.

Any on-board system product added to an engine should be usable on other layouts that use standard traditional control methods.

The new system should be flexible. The design should have enough foresight to allow for new inventions and products that have not been thought of yet.

The new system should be reliable and, particularly, it should be immune to electrical noise that is quite prevalent in the model train environment.

Since the existing standard for model trains is either 50 or 60 Hz for AC powered trains with DC remote control signaling or DC powered trains, it would be a tremendous advantage if remote control signaling techniques could be developed that used DC or AC remote control signaling for both AC and DC powered trains rather than more complex signaling systems such as high frequency carriers, high speed digital, touch tones, etc. A new system, certainly, should not preclude the use of more exotic signaling techniques, but it should explore the possibilities of simple AC and DC techniques first, simply because of its inherent simplicity. Considering how effectively the concept of the on-board state generator described in U.S. Pat. No. 4,914,431 can enhance the number of remote control options available for AC model railroads, it is not difficult to develop a complete system that can utilize the existing standards of either AC or DC model train environments. As long as there is a least one remote control signal available we can expand on this platform to develop a system that can effectively utilized the existing standard and allow for new systems to evolve.

With the three-rail AC train environment, this is a straight forward task using the two DC remote control signals (positive and negative) and an on-board state generator to provide additional remote control functions. However, scale two-rail trains that operate from DC applied power do not specify a remote control signal within their existing standard. In order to use the advantages of our on-board state generator, we have developed a new way to use the existing two rail DC standard to provide simple DC remote control capability. Once this is implemented, we can then develop newer systems that require more complex signaling. A major requirement of any evolutionary new system is that it allows the user to return to the standard system he now has. This will allow him to move all the way from simple block control with very limited remote control to complete command control without changing his layout.

SUMMARY OF THE INVENTION

This invention is an extension of the ideas described in our U.S. Pat. No. 4,914,431 where an on-board state generator is used to increase the number of remote control options available from a limited number of remote control signals. FIG. 1 from that patent is included here as FIG. 1 in this patent specification as a reference. Briefly, the on-board state generator, 104, is used to specify the effect that detected remote control signals, 101, will have. If the state of the on-board state generator is changed, the same remote control signal may have an entirely new effect. In this way, the number of different remote control effects is only limited by the number of available states for the On-Board State Generator. The state of the On-Board State Generator can be changed by a number of conditions including the state of the remote object, such as its directional state, its speed, how long it has been operating, etc. plus the state can be changed by the application of remote control signals or the state can be changed by a combination of its present state and the application of remote control signals.

In U.S. Pat. No. 4,914,431, we made extensive use of the direction state of the engine to specify, in part, the state of the on-board state generator. Since we also use direction states in this invention, we have included FIG. 2 from that patent in this patent specification as FIG. 2. FIG. 2 shows, four direction states of forward, neutral before reverse, reverse and neutral before forward plus a fifth state called reset. For AC-powered trains described in this earlier patent, the direction state was changed by each power interruption to the track of some minimum time and less than a specified maximum time (usually between 180 mSec and 1 second). The sequential and periodic nature of direction changes is shown as a circle; the next direction state is always uniquely defined and you always return to the same direction state every forth direction change. The reset state, 201, is a state that occurs or is enabled when the power has been off for some minimum time (usually 3 or 4 seconds). When track power is re-applied, the direction state always comes up in a specific state (usually forward or neutral before forward).

In order to make effective use of this patent for DC-powered trains, at least one remote control signal must be available. This invention describes a number of novel remote control signaling methods that can be used within the existing DC powered train standard and describes a number of novel remote control effects that can be operated by these signals.

Note: Because there are many variables that can determine the state of the on-board state generator and many of these variables are described with the word "state" (such as direction STATE), we will preface each "state" with its descriptor in order to avoid confusion. In addition, "On-Board Electronic State Generator" is an electronic form of the "On-Board State Generator" referred to in U.S. Pat. No. 4,914,431. In this patent, "On-Board State Generator" will often be abbreviated as "OBSG" (e.g. "on-board state generator states" will be written as "OBSG states").

DC Remote Control of Engines, Cars and Accessories that Use DC Track Power

FIG. 3 shows a schematic diagram for a simple DC power supply that are used for DC two-rail operation. Variable AC power is applied from a variac-type transformer, 301, to a full-wave bridge, 302, which produces a full-wave rectified output, 311, on out line, 303 with respect to line 312. This DC is applied directly to the track through double-pole double-throw direction slide switch, 304, to the two track rails, 307 and 308. The polarity to the track is changed by toggling the direction switch, 304, between position A, 305, and position B, 306. Switch, 304, is shows slide mechanism with metal contacts on top and bottom separated by an insulator and fixed activator handle in the center to move the slide.

FIG. 4 shows an engine, 401, on some remote section of track that is connected to the power supply described above. The track voltage from rails, 307 and 308, are connected to a motor controller, 402, through wires 406 and 407 that connects to the wheel power pickups. The motor controller converts the track voltage of either positive or negative polarity to a specified DC output voltage on lines, 403, for the motor, 404. The polarity to the motor is determined by the on-board state generator, 405, and motor controller, 402.

The direction control switch, 304, in FIG. 3, which normally is only used to change the direction of the engine by changing the polarity of DC voltage on the track, can be used to do simple remote control operations under certain conditions. This new remote control signal will be called, PR, for Polarity Reversal. The on-board motor controller, 402, supplies a specific polarity of voltage to the motors independent of the polarity of the track voltage on rails 307 and 308. That is, the motor controller, 402, can prevent the engine from changing direction when the direction switch, 304, is toggled between position A and B, 305 and 306. Instead, the on-board state generator will specify the motor direction to the motor controller, 402. Direction changes will be made by changing the OBSG state using other remote control signals or even combinations of signals that may involve PR signals and possibly by the state of on-board state generator, 405.

Having this one single remote control signal, PR, plus an on-board state generator and a motor controller that can be programmed to interpret this signal can improve the operation of DC-powered trains in a number of ways. For instance, when power is applied to the engine, toggling the direction switch, 304, on the track power-pack could actuate a remote control feature like blowing the horn but will not cause the engine's direction to change. However, changing direction of an engine could be done in the normal way with a minor limitation: if the engine is stopped by turning the power off and the direction control switch, 304, is toggled, reapplying the power could cause the direction of the engine to change. In this way, the direction switch, 304, would still provide the familiar operation control that is standard for DC powered trains. This is a very natural use of the direction switch since the DC train operator is not in the habit of using the direction switch to change direction while an engine is moving; otherwise it causes an abrupt reversal of his locomotive which is very unrealistic and may damage the engine or, at least, cause a train derailment. Hence, changing track polarity while the engine is moving is a new operation that can be used for remote control functions without violating the normal operating standard.

Other features like turning on and off the bell can be done by using a coded signal such as changing DC track polarity for two long and one short period of time or perhaps a short duration of changing DC track polarity will turn on or off the bell while a long duration of changing DC track power will blow the whistle. Or the bell can be turned on or off if a polarity reversal is used while the track voltage is low but a PR will turn on the horn if the track voltage is high.

When at least one independent remote control signal is available (such as the above described DC polarity reversal), there are many ways to utilize and multiply its signaling capabilities. For instance, we can now use the on-board state generator, to increase the number of options. If we also added a motor reverse unit that has the four distinct direction states of, neutral before forward, forward, neutral before reverse and reverse and the special fifth state of Reset, we can use this with the OBSG to generate even more effects. In this respect, the use of an OBSG and a PR remote control signal would make the operation of DC-powered trains very similar to the operation of AC trains with an OBSG and superimposed DC as a remote control signal. Although the signaling would be different, the types of operations and features could be the same.

Another remote control signal that can be used for DC powered trains is two polarity reversals in a row to allow the applied power to return to its initial condition. We will call two polarity reversals, PRP, for Polarity Reversal Pulse. In yet, more advanced, remote-control systems, PR and PRP could be under high-speed control permitting a wide range of signaling, addressing and control effects, including digital transmission.

Note that a DC or permanent magnet motor is shown in FIG. 4 for simplicity and because most modern model railroads that use DC for track power use DC motors in the locomotive. However, there is nothing to prevent the use of AC/DC motors in this application. In this case, the motor controller would not simply change the polarity to the motor to change direction since universal motor direction is not controlled by polarity but by the relation of the field winding to the armature winding. In the case of a universal motor, the motor controller would swap connections to the art nature or field to cause the engine to reverse direction.

A New Remote Control Signal for DC Operation

In U.S. Pat. No. 4,914,431, we proposed using applied AC power supply voltage in excess of a predetermined value as a new remote control signal. This signal has its main advantage when the engine is not moving such as in the two neutral states, neutral before forward and neutral before reverse and reset if reset is a non-moving state. The same idea can be applied to DC systems where a DC voltage whose absolute value is in excess of a predetermined value is considered a remote control signal. This remote control signal will be called HV for applying High Voltage above some value. Actually any use of high voltage could also be considered a remote control signal such as a transition from low to high to low or leaving it in high voltage for some time period, etc. We will call the remote control signal of applying HV and then returning to a lower setting as HVP for High Voltage Pulse.

With the addition of HV (or HVP) we have a minimum of two remote control signals and can expand the use of our remote control capabilities for either AC or DC powered trains by using one of the remote control signals to change the state of the OBSG and the other to operate some feature specified by the OBSG state. As an example, consider the neutral direction states described in U.S. Pat. No. 4,914,431. We could use HV or HVP as an additional remote control signal to change the state of the OBSG; each time the throttle is moved up and down one time, the on-board state generator moves to the next designated state within each neutral state (in other words, the state of the OBSG is determined by both the neutral state and the number of times the system detects a HVP). Since the engine is not moving the use of the throttle to change the OBSG state will not affect the operation of the train. After we have "selected" the OBSG state we want, we could use the other remote control signal (superimposed DC in the case of AC powered engines or PR and/or PRP in the case of DC powered engines) to "operate" our selection.

This method of making a selection with one remote signal and operating it with another is very simple for either AC or DC power model engines in neutral. If reset is a non-moving state, using this technique is ideal for initializing the operation of an engine such as starting the engine sounds, turning on various lights, etc. For instance, imagine that we moved the throttle up and down a total of six times (6 HVP's) after entering reset which changes the OBSG to a state called "engine sound volume". Then, the second remote control signal could be used to change the volume from the present value to progressively lower values until it returned to the highest value in a continuous loop. Moving the throttle up and down again at any of the volume setting would lock-in the volume choice and move to the next state of the OBSG for another option. For instance, this next option could be "overhead blinking light". Now, toggling the second remote control signal could be used to toggle the light between on and off. This approach of selecting and operating different options could proceed indefinitely. Again, the use of the OBSG increases the number of remote control options.

It is, in fact, possible to nest sets of options so the list of options does not become too unwieldy. For example, the in Reset option 12, operating the option could perform "page advance". The next option available to the operator might then be Page 2/Reset option 1. Now, repeated uses of HVP would advance through Page 2 options. Option 13 on every page (higher than page 1) could be "return to page 1 options". Nesting like this can produce any number of pages with any number of options per page in a way that is easy for the operator to use.

Other Remote Control Signals for Engines, Cars and Accessories on DC Powered Layouts Since Lionel used DC superimposed on AC power, it is possible to use AC superimposed on DC to do remote control signaling. Since DC power packs are often designed to produce DC from full-wave rectified AC, there can be a large amount of AC ripple present on the DC output. However, for full-wave (or half-wave) rectified outputs, the AC ripple term does not cause the output wave form to ever go to the opposite polarity. Therefore, if a method were developed to apply enough AC to drive the output to the opposite polarity at any time, this could be detected as different from ripple and could be used as a viable remote-control signal. In general, a "DC" power pack of any design that can be made to produce brief excursions of the applied voltage which cross into the polarity opposite from what has been "nominally" selected, can be used to generate this new remote-control signal.

Another way to operate scale layouts that use DC power is to convert the entire layout to AC track power and use DC remote control signals in the same way we proposed for Lionel-like three-rail operation.

The only difficulty with the second method is that all engines, cars and accessories that are used on the layout must be equipped with the new on-board system or have universal AC/DC motors or on-board bridge rectifiers to convert applied AC track power to DC for the DC motors. Since many operators have many engines with DC "can" motors and have already made considerable investment in DC power supplies, this can be a deterrent to converting to AC power. It is always an advantage to come up with new control systems that already use existing power packs, engines and layouts. Note only is there no new investment, the operator is completely familiar with his old power pack and its features.

Summary

This invention describes new remote control signals that can be easily generated within the existing DC powered model train standard and how these signals can be used with an on-board state generator in the remote object (usually an engine) to expand remote control operations. In particular, when two remote control signals are available, the idea of "select" and "operate" can be used to simplify remote control operations.

DESCRIPTION OF THE INVENTION

Methods to generate a polarity reversal (PR) remote control signals for DC powered layouts There are two types of simple remote control operations that will respond to a PR. The first is a sustained response like a horn where the effect is on as long as the remote control signal is applied. The second is a toggle or counting action where the response is to switch to an alternative each time the remote control signal is applied. It seems convenient to use the direction switch on the power pack, such as the switch, 304 in FIG. 3, to provide a PR to blow the horn as long as the PR is present and then turn the horn off as soon as the direction switch is returned to its original position. However, when used to toggle a remote feature on and off in the engine, there are two acceptable possibilities. We could affect the toggle when a single PR is received such as when the switch, 304, is changed or we could only toggle the remote effect when two PR are received such as when the direction switch is changed from one position to the other and back again (in other words, a "PRP"). The second alternative has the advantage of returning the direction switch to its original position after the toggle remote control effect has been achieved. For instance, if the direction switch is used to turn on a bell while the engine is sitting in neutral, the direction switch, 304, would be changed and returned to its original position. The effect would be that the bell is on and the power pack direction switch is back to its original status. This method allows us to replicate the direction slide switch with a push button since the push button always provides two polarity reversals whenever it is pressed and released. Whenever we toggle a remote effect from "on" to "off" or "off" to "on", we will use a PR twice to always return the polarity to its original status. When we want to apply a signal for counting we will apply two PR's (one PRP) for each count. For instance, if we wanted to transmit the number four to turn on a forth remote control effect, we would apply four PRP's.

Figure 3:
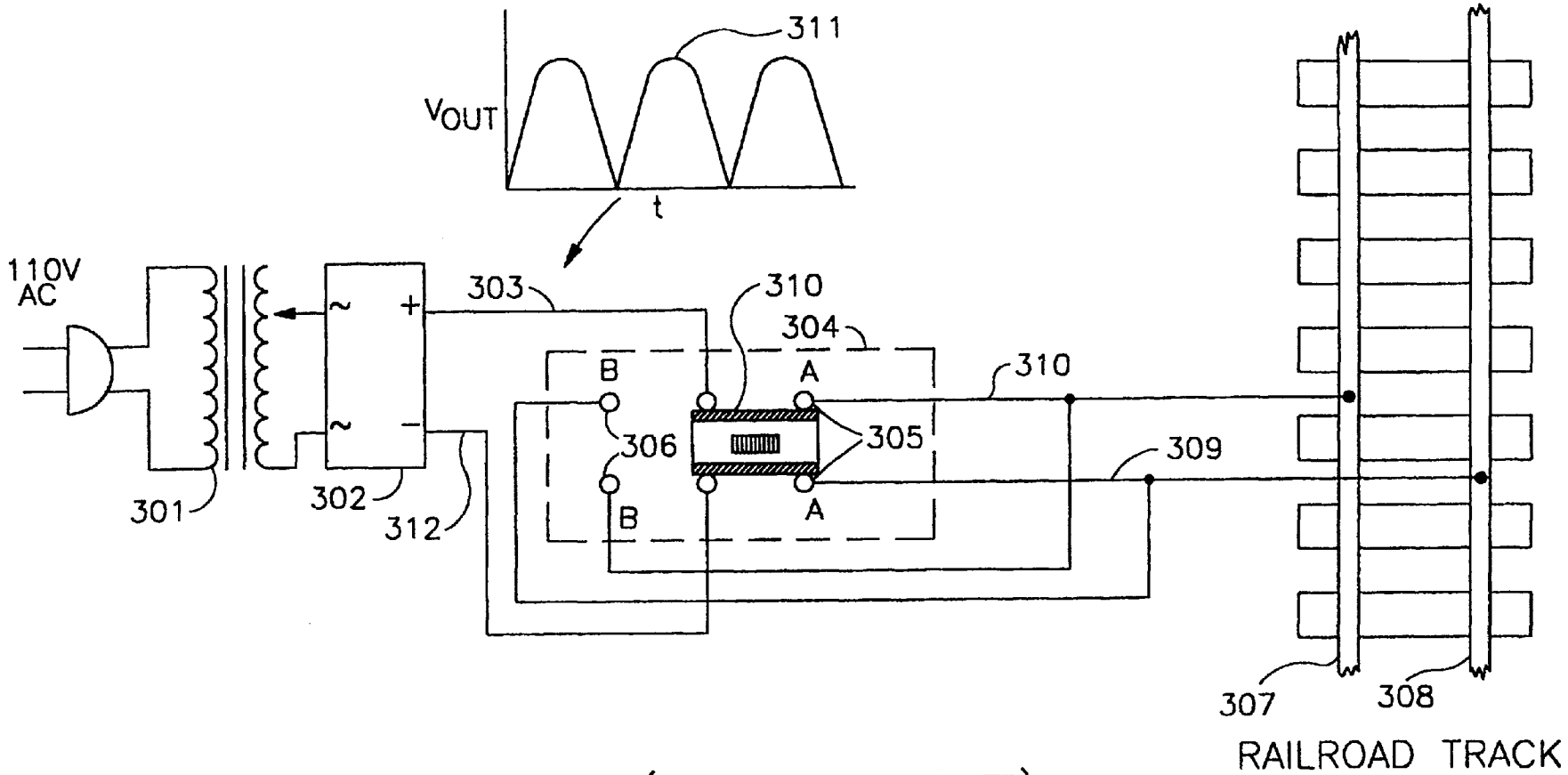
FIG. 3 (PRIOR ART)
FIG. 3. Description of common power pack used to power DC trains.
Figure 4:
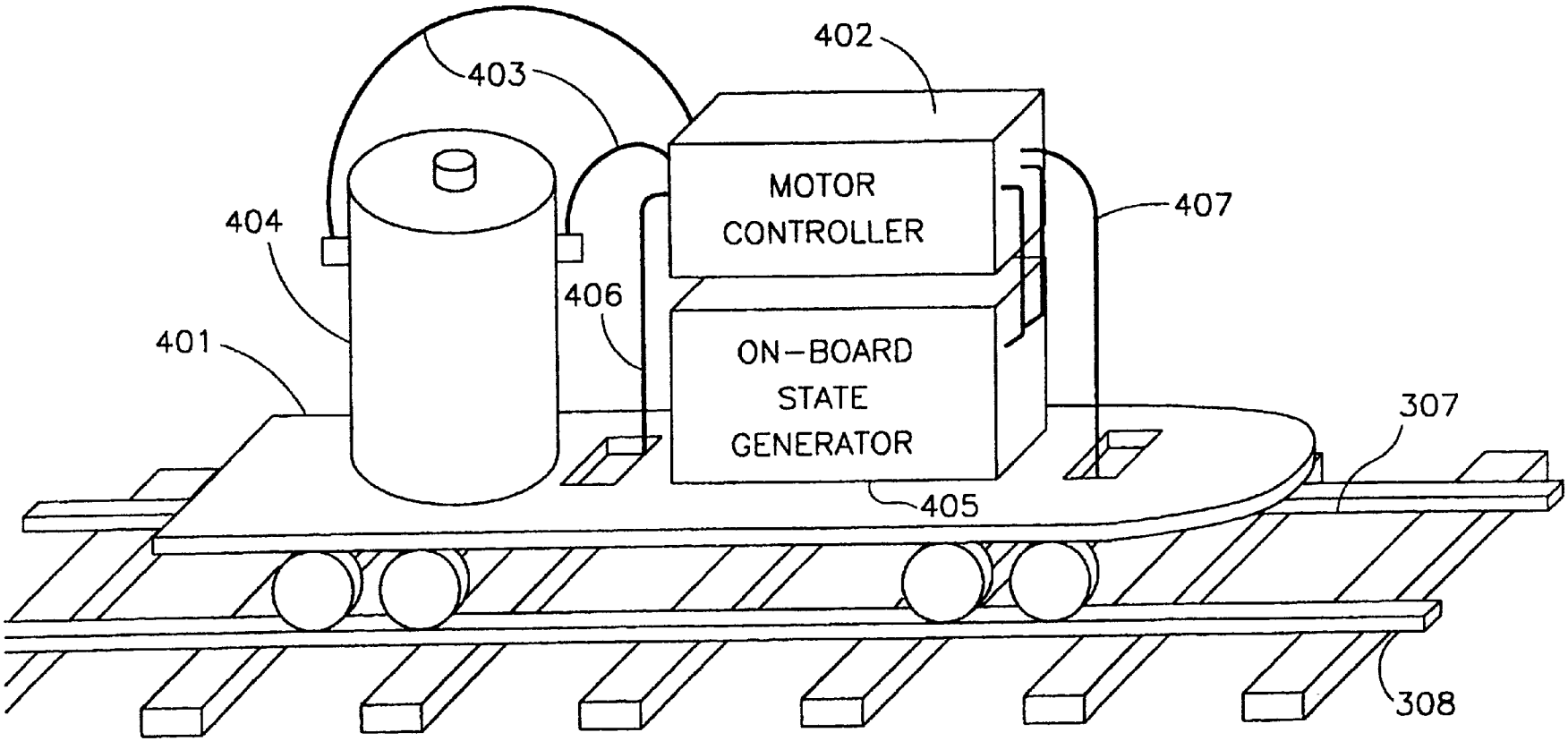
FIG. 4. Conceptual drawing showing the use of an on-board state generator and motor controller on a DC powered train.
Figure 5:
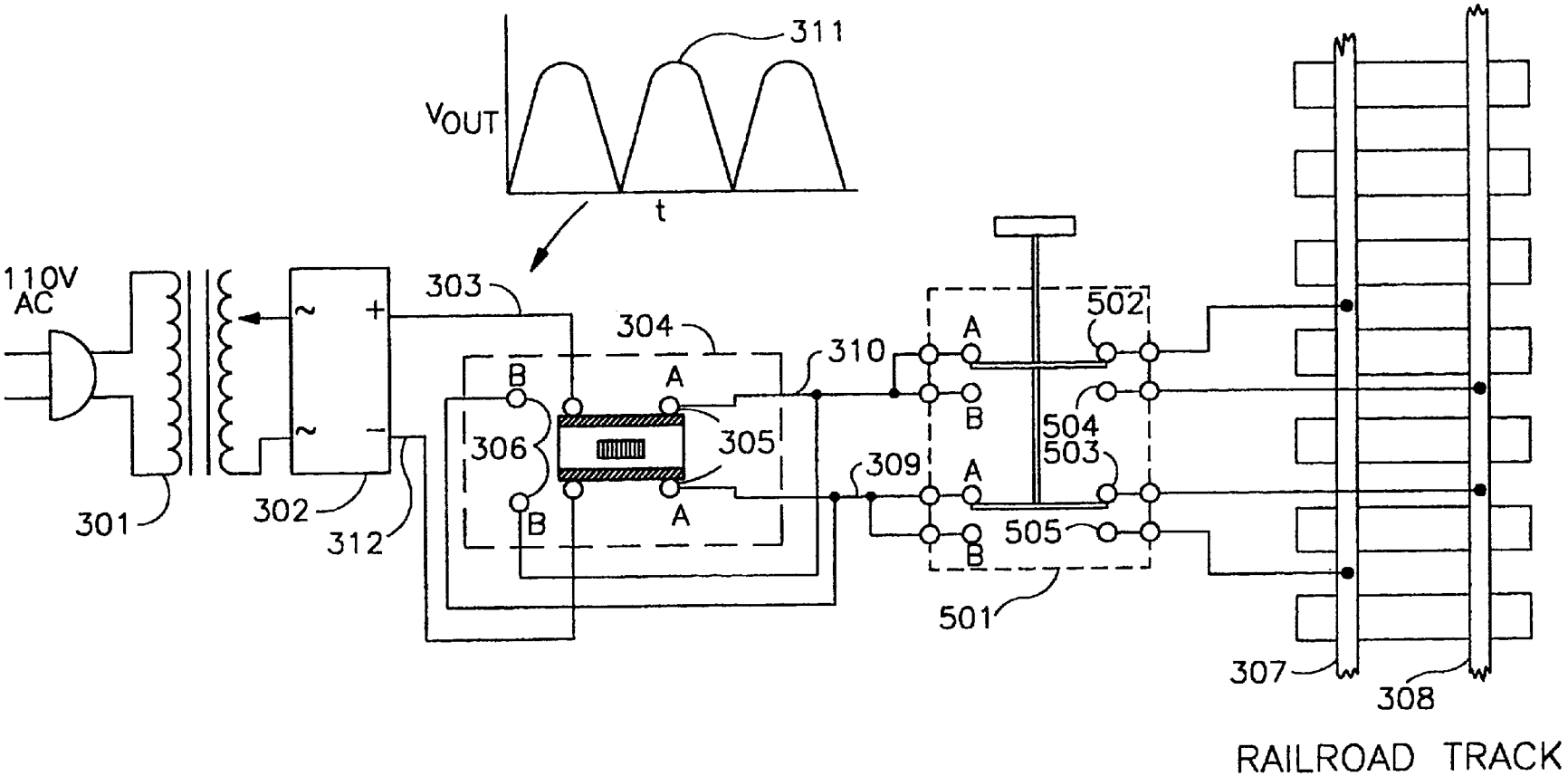
FIG. 5. Method to provide Polarity Reversal and Polarity Reversal Pulse to track.

FIG. 5 shows a double-pole double-throw push button switch, 501, added in series to the output lines 309 and 310 of the simple DC power supply in FIG. 3. When the push button switch, 501, is in its resting position, position A, the line 310 is connected to output terminal, 502 which connects directly to track rail, 307. Also, line 309 is connected to output terminal, 503 which is connected to the other track rail, 308. When the push button, 501, is in the resting position the two lines, 309 and 310 are connected to the track with the same electrical polarity as the connections shown in FIG. 3.

When the push button, 501, is pressed to position B, line 310 is now connected to the other track rail, 308 via output terminal, 504. Similarity, line 309 is now connected to track rail, 307 via output terminal, 505. The polarity to the track is reversed when the button is pressed.

Figure 6:
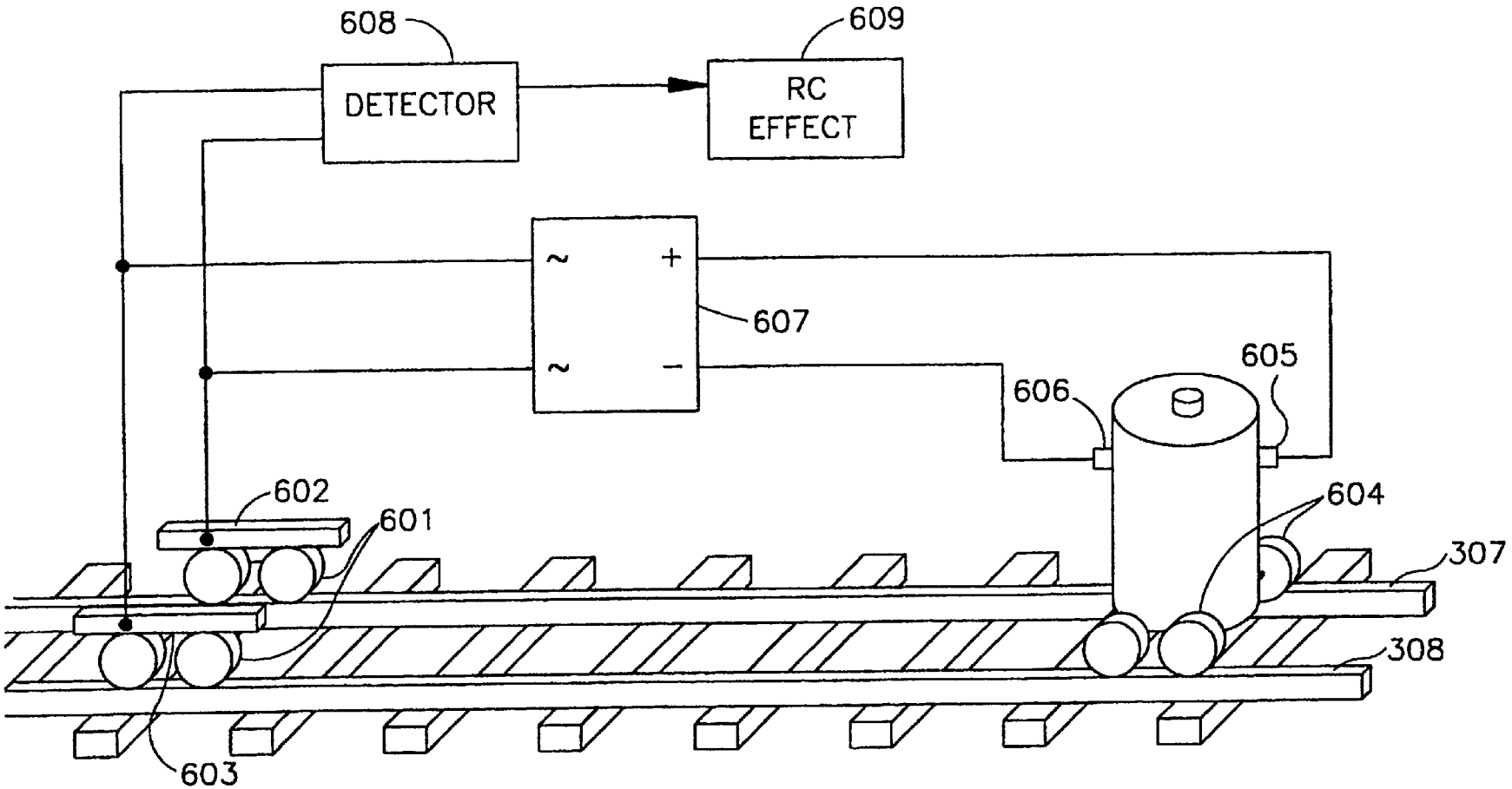
FIG. 6. Method to detect polarity reversal without changing direction of motor.

The push button, 501, provides a PR whenever it is pressed down and a second PR whenever it is released, regardless of how the direction switch, 304, is set. In other words, the push button will provide a PR for a sustained effect like blowing a horn and then release the effect when the button is released. On the other hand, the push button provides a simple method to apply a PRP for toggling or counting by simply pressing the button in and releasing. This switch is much simpler to use than the direction switch, 304, to provide a PRP. Receiver method to detect a PR or PRP for DC powered layouts without affecting the direction of the locomotive Since most engines designed to work on model layouts receive power directly from the track rails, a PR would cause the engines to reverse direction abruptly and a brief PRP may cause the engine to at least stutter. In either case, this is not an acceptable response. FIG. 6 shows a method of receiving and detecting a PR or PRP without causing a change in engine direction.

The engine power pick-up is common for model trains using two rail track. The locomotive is electrically connected to the track power through truck 601. Sliding shoe 602 picks up one polarity of power though the metal wheels connected to track rail 307. Sliding shoe, 603, picks up the other polarity of power connection though the metal wheels in contact with track rail 308. The two trucks, 601 and 604 are both attached to the locomotive chassis (not show).

Both track connections are then routed to detector circuit, 608 and to the input of full wave bridge rectifier, 607. The DC output of the bridge, 607, is connected to the DC motor brush terminals, 606 and 605. The output of the detector, 608, is connected to the remote control effect, 609. The detection method for a PR or PRP can either be a simple analog circuit or a microprocessor based system that will digitize the applied wave form on the track and determine the PR or PRP by mathematical methods.

When a PR or PRP is applied to the track, the motor direction will now remain the same since the bridge rectifier, 607, will always deliver the same output polarity regardless of the track polarity. The problem with this method is that there is no way for the user to change the direction of the engine since the polarity to the motor terminals is always the same.

Figure 7:
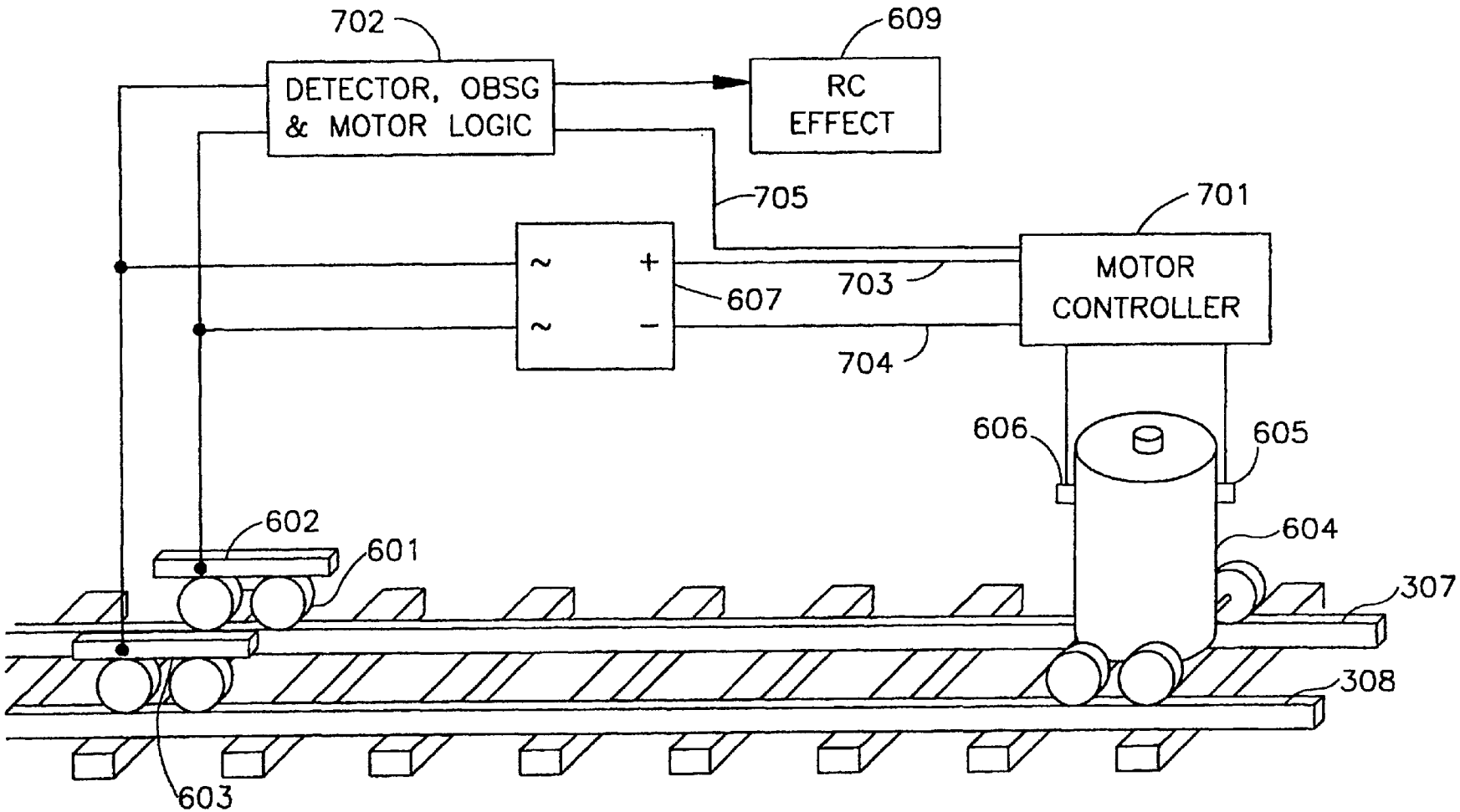
FIG. 7. Method to detect polarity reversal and control motor direction independently.

FIG. 7 shows an addition of a motor controller, 701, to the circuit shown in FIG. 6 that will allow motor direction changes. The detector, 702, has been expanded to include an OBSG, motor direction logic outputs to control the motor controller, 701.

When the motor controller, 701, receives logic output from the control line, 705, the motor controller will apply the correct polarity of DC to the motor terminals, 606 and 605, regardless of the voltage polarity from the output of the bridge rectifier, 607, or the polarity on the track rails, 307 and 308.

We are proposing two methods for the user to specify the desired direction of his locomotive. One is to turn the track power off and then affect a PR and then turn the power back on. This operation can be easily detected as a special command different from a standard PR since there is a period of time when no power is applied. We could also specify how long this period of time of no power must be before a PR signal is accepted as an engine reversal command to avoid any confusion from a momentary no-power conditions that may happen frown a normal PR remote control signal. For example, if we specify that power must be off for at least a second before a PR works for a direction change, this would avoid any problems with a push button, 501, or slide switch, 304, having a brief no-power condition between contact position A and B or any power interruptions that might result from faulty track.

A second method of motor control is to use deliberate power interruptions to change motor direction. In other words, each time the power is interrupted for more than a specified period of time, the motor changes to another direction state. Each successive power interruption could cause the engine to change from forward to reverse to forward to reverse, etc. If the motor controller, 701, had provision to turn the power off to the motor completely, then a neutral could be added to the sequence to provide the same direction control that is now done with three-rail AC power trains such as Lionel. That is, successive power interruptions would produce direction states of forward, neutral before reverse, reverse, neutral before forward, forward, etc.

Figure 8:
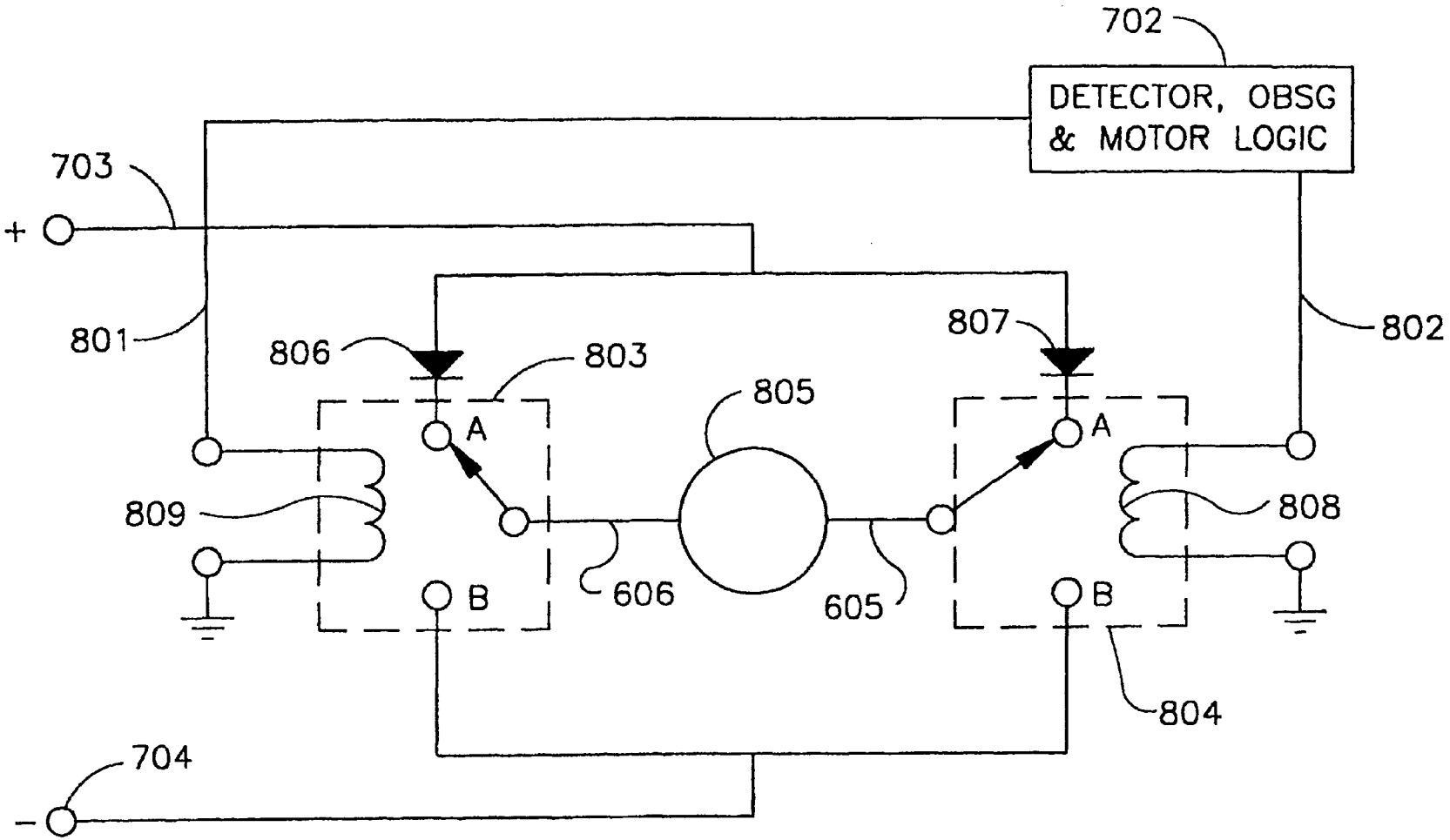
FIG. 8. Method to control DC motor.

A simple motor controller is shown in FIG. 8 using two single-pole double-throw relays. Detector, OBSG and motor logic circuit, 702, connects though line, 801, to relay, 803 and though line, 802, to relay, 804, to actuate relay coil, 809 or 808, respectively. Positive output from bridge rectifier, 607, in FIG. 7, is applied through line, 703, through diode, 806, to the A contact of relay 803 and also through diode, 807, to the "A" contact of relay, 804. Negative output from the bridge rectifier is applied through line, 704, to the B contacts of both relays, 803 and 804.

When both control lines, 801 and 802, are inactive, both relays, 803 and 804, are in the "A" position. This is a neutral state since no power is delivered to the motor. The diodes, 806 and 807, prevent the generator action from a turning motor to generate current that would cause dynamic braking. If both diodes were replaced by short circuits, and if the motor was turning when the remote control command to change direction to neutral was received by the detector, OBSG and motor logic circuit, the motor would come to a very abrupt stop as it tried to drive current into a short circuit. The diodes allow the motor to coast to a natural stop since no matter which way the motor is turning, one of the two diodes, 806 and 807, will be back biased. FIG. 8 is similar to the motor controller circuitry shown as FIG. 3 of U.S. Pat. No. 4,914,431 except for the addition of the two diodes and the bridge rectifier; since the circuit (in FIG. 3) is used for AC motors with field windings it does not have the same problem with dynamic breaking. The circuit in FIG. 8 achieves motor control by switching one relay at a time. If both relays are activated at the same time to position B, the motor is in neutral except that it will have dynamic breaking effects. This effect may, in fact, be produced as a desired remote control feature. A way to produce a less harsh brake effect would be to switch in a pair of resistors across diodes, 806 and 807. That is, one resistor across diode 806 and one resistor across diode 807. Further, by controlling the amount of conduction around diodes 806 and 807, a specifiable amount of dynamic braking can be produced. For example, a dynamic brake effect might start applying only a small amount of braking, but the longer the operator continues to request dynamic braking, the level of conduction around these diodes steadily increases. This way, the longer the operator requested dynamic braking, the more of it they would get. Variable conduction like this can easily be produced by an appropriate active device such as a transistor, HexFET, or SCR which is pulsed on and off.

Figure 9:
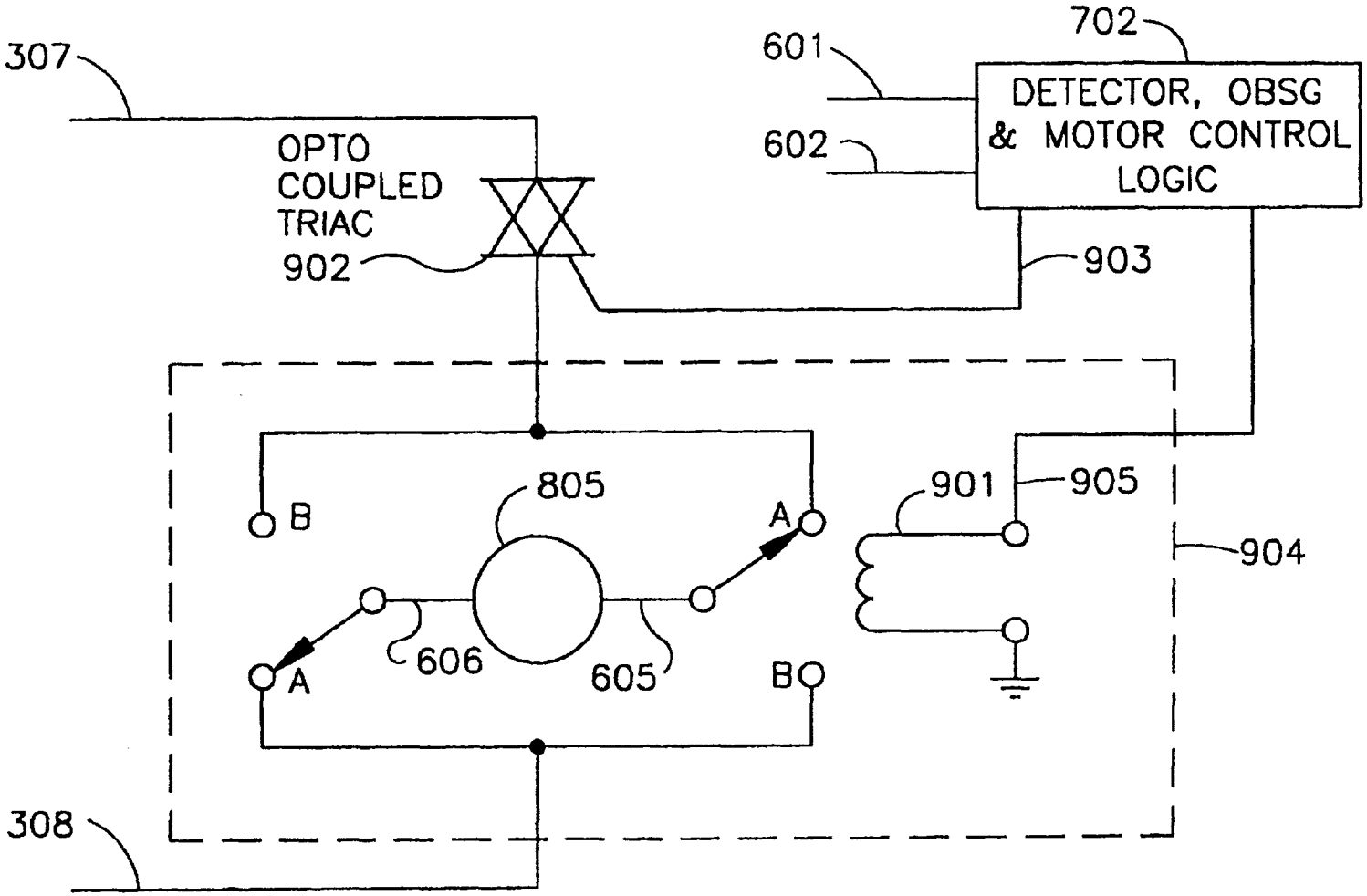
FIG. 9. Method to control DC motor with minimum insertion loss.

One problem with the circuit in FIG. 8 is the insertion loss between the track rails, 307 and 308, in FIG. 7 and the motor terminals, 605 and 606. Although the relays do not produce significant voltage drop, the diodes in the bridge rectifier and the dynamic breaking diodes, 806 and 807, do. Another circuit that can solve this problem is shown in FIG. 9. Here, a single double-throw double-pole relay, 904, is used along with an optocoupled triac ,902. The motor's direction is controlled by using control line, 905, to control the relay coil, 901, and by control line, 903, to gate the triac, 902. Neutral direction is achieved by gating off the triac. Forward or reverse motor operation occur when the triac, 902, is gated on; the polarity to the motor is controlled by the position of the relay contact arms, either position A or position B. The total insertion loss is now equal to the voltage drop across the triac which is about 1.2 v. The triac, itself, could be replaced by a relay to further reduce the insertion loss but there is good reason for a fast high current pass device that we will cover later. It may be possible to use other types of pass devices like HEX FET's to reduce insertion loss.

Now when a PR is detected by the detector and motor control logic circuit, 702, the control line, 905, is activated to change the polarity directly to the motor to prevent the engine from changing direction. Unlike the circuit in FIG. 8, the relays are used each time a PR is detected and there will always be a slight delay in the detector logic and the relays before they can change the polarity to the motor. This is usually not a problem and should not cause any apparent change in locomotive operation. The only time relay activation is not required when a PR is detected is when the engine is already in neutral or when a PR is intended to affect a direction change as described earlier. In the latter case, the polarity to the motor is meant to be reversed so the relays should stay in their present position.

Dynamic braking for the circuit in FIG. 9 can be produced by applying a load directly across motor terminals 605 and 606. As before, this load can be fixed or variable, and might be applied by a relay or appropriate pass device.

Reversing Loops on two-rail layouts

Figure 14:
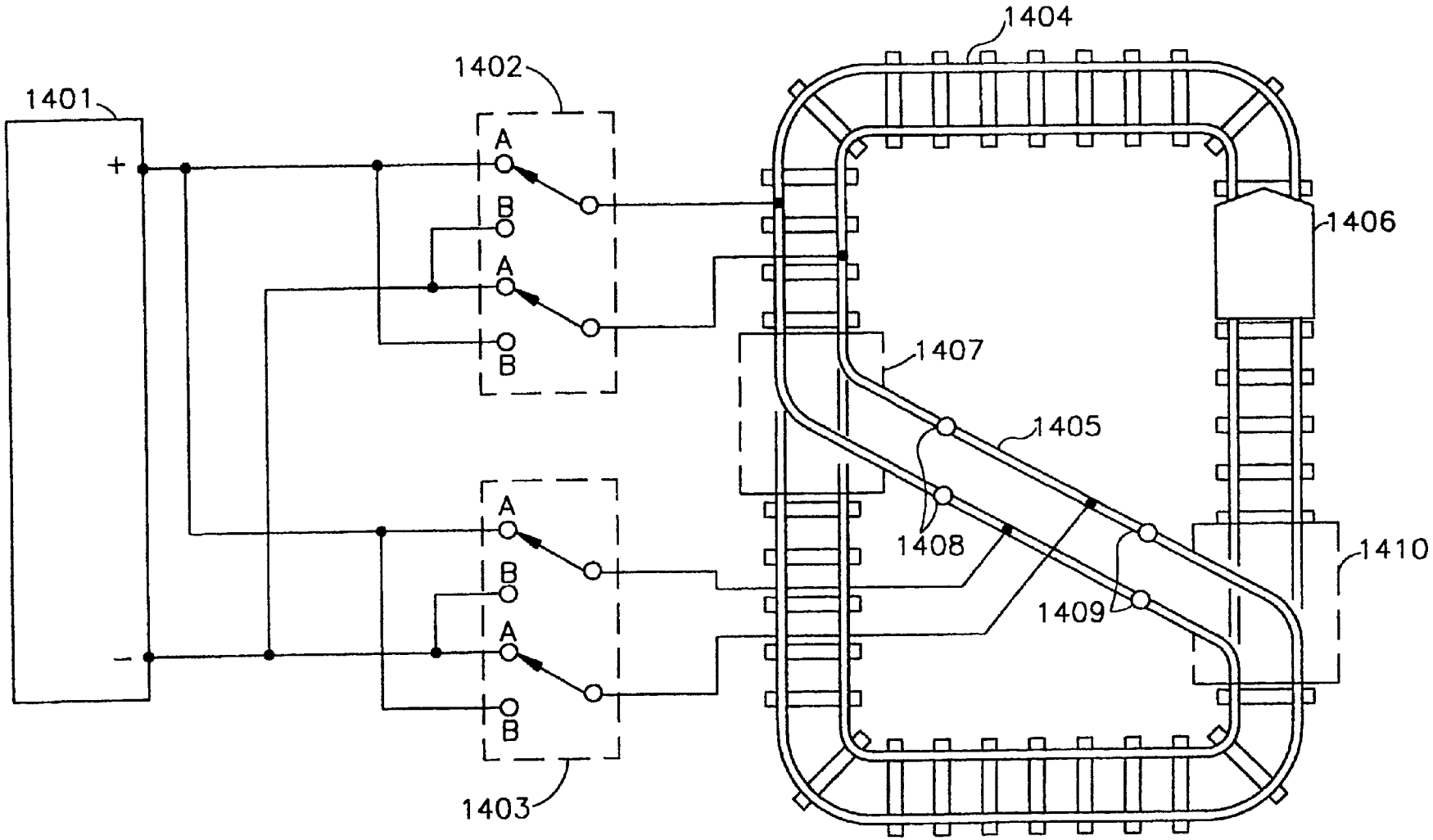
FIG. 14 (PRIOR ART)
FIG. 14. Drawing showing a typical reverse-loop layout.

Locomotives that have on-board motor controllers, have the potential to no longer be troubled by misbehavior as it travels through a reverse loop. A reversing loop occurs whenever a train is turned around by a loop of track so it is facing in the opposite direction. Thus, the locomotive will face a conflict of drive polarity at the reversing interface. A model railroader normally deals with this by installing polarity reversing switches at various points on the layout to overcome these conflicts. A typical reversing loop is shown in FIG. 14 for a DC powered train although the problem is similar for AC powered trains. A DC power pack, 1401, which includes the normal direction switch is connected to the "main" line, 1404 of the layout through additional reversing switch, 1402. The outputs of the power pack, 1401 are also connected to a reverse-loop branch, 1405, through another reversing switch 1403. A locomotive, 1406 is shown running counter-clockwise on the main line. The locomotive will simply run around and around the main line until the mainline turnouts, 1407 and 1410, are operated to direct the locomotive, 1406 onto the reverse-loop branch, 1405. Electrically, the reverse-loop branch is completely isolated from the main line, 1404, by insulating pin pairs 1408 and 1409. The operator will be sure that the two reversing switches, 1402 and 1403 are in the same "A" position before entering the reverse loop branch. Once the locomotive, 1406, enters the reverse loop at turnout, 1407, and is on the reverse-loop branch, 1405, and located between the two sets of insulating pins, 1408 and 1409, the operator will move switch 1402 from the A position to the B position. This will flip the polarity of the power applied to the main line track, 1404. Now the locomotive, 1406 can proceed past insulating pins 1409 without a polarity conflict and onto the main line. The locomotive, 1406 will now go around the main line in a clockwise direction.

Figure 15:
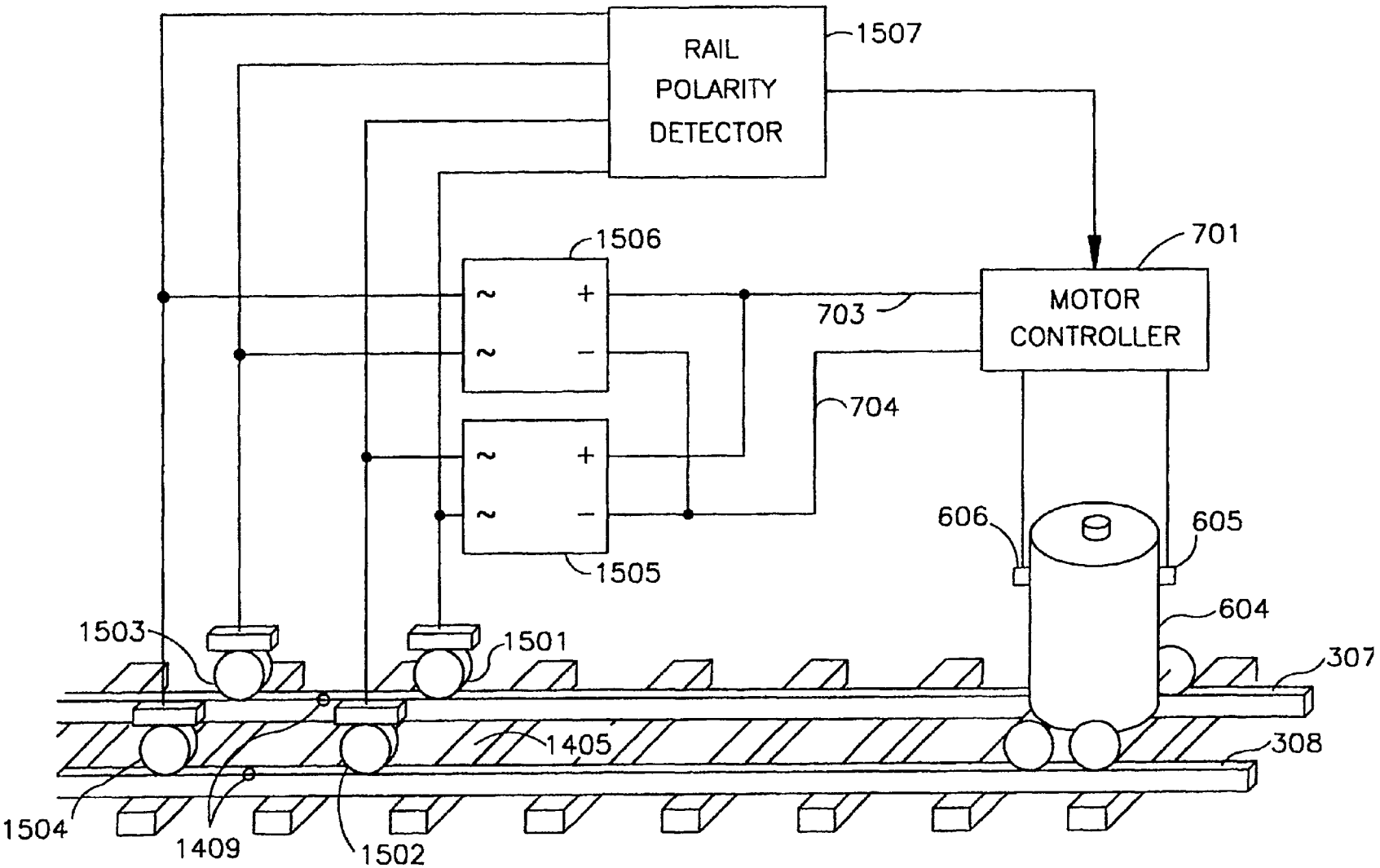
FIG. 15. Method to eliminate reverse-loop switching.

FIG. 15 shows a novel design where the four wheels of a powered truck are interfaced to on-board electronics to achieve independence from reversing-loop switches and problems. The reverse loop situation is like the one discussed in FIG. 14, except that insulating pin set, 1408 is eliminated. Also reversing switches 1402 and 1403 are no longer needed, although the model railroader will likely already have them in the layout and will simply leave them permanently set to the A position. The locomotive motor, 604, is shown riding on a truck without power pick-ups; the power for the motor comes from the sliding pickups on wheels, 1501 through 1504. A reversing scenario works as follows: Just as in the description of FIG. 14, locomotive, 1406 runs around the main line in a counter-clockwise. When the operator operates the mainline turnouts, 1407 and 1410, the locomotive 1406, moves on to the reverse loop branch 1405 from turnout, 1407, and proceed to insulating pins, 1409. It is at this point that FIG. 15 is drawn. The powered truck is shown just after the lead wheels, 1501 & 1502 on the truck have passed over insulating pin set, 1409. Since the second set of insulating pins, 1408, is missing, the polarity of the track voltage on the lead wheels 1501 will be opposite the polarity on trailing wheels 1503 & 1504. In a classically powered DC locomotive this situation would produce a dead short across the track. FIG. 15 shows a different way to deal with this. Historically, wheels, 1501 & 1503, would usually be electrically connected together. Likewise wheels, 1502 & 1504, would be connected. In this new method the power picked up across wheels 1501 and 1502 are run through bridge rectifier, 1505, so that the polarity of the power at wire, 703, is always positive relative to wire, 704. Likewise the power picked up across wheels 1503 and 1504 are run through bridge rectifier, 1506. The output of bridge rectifier, 1506, is also tied to wires, 703 (positive) and 704 (negative). This power arrangement ensures that the power input to the motor control electronics is stable and with known polarity. The voltages from wheels 1501–1504 are also routed to the rail polarity detector, 1507, which will determine the difference between a true direction reversal as applied from the power pack, 1401, verses the polarity changes attendant with running over reverse loop insulating pins (such as 1409). In the case of a true direction reversal, the polarity of voltage on wheel 1501 will have been the same as the polarity of voltage on wheel 1503. Likewise, the polarity of voltage on wheel 1502 will have been the same as the polarity of voltage on wheel 1504. When a true direction reversal as applied from the power pack, 1401, occurs, the polarity on both 1501&1503 will reverse with respect to wheels 1502 & 1504. However, in the case of simply running over the insulation pins of a reverse loop, the polarity of wheels 1501 & 1502 will reverse. After the second wheel set, 1503 and 1504, proceeds past insulating pins, 1409, then their polarity will also reverse. After the locomotive has passed the insulating pins, the polarity of 1501 with respect to 1503 will again be the same as will the polarity of 1502 with respect to 1504; they will simply be reversed from what they were before crossing the insulating pin set, 1409. In this way, the rail polarity detector electronics, 1507, is able to discriminate between a true direction reversal as applied from the power pack, 1401, verses the polarity changes attendant with running over reverse loop insulating pins (such as 1409) and will instruct the motor controller, 701, to reverse the direction the motor is turning only when the operator changed the polarity switch on his power pack, 1401, with the intention of reversing the engine.

Figure 16A:
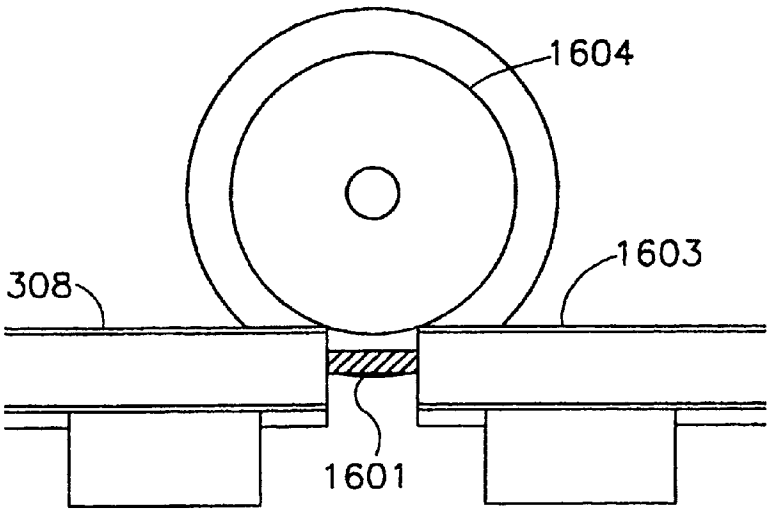
FIG. 16. Method to prevent model railroad wheel from shorting two blocks sections.
Figure 16B:
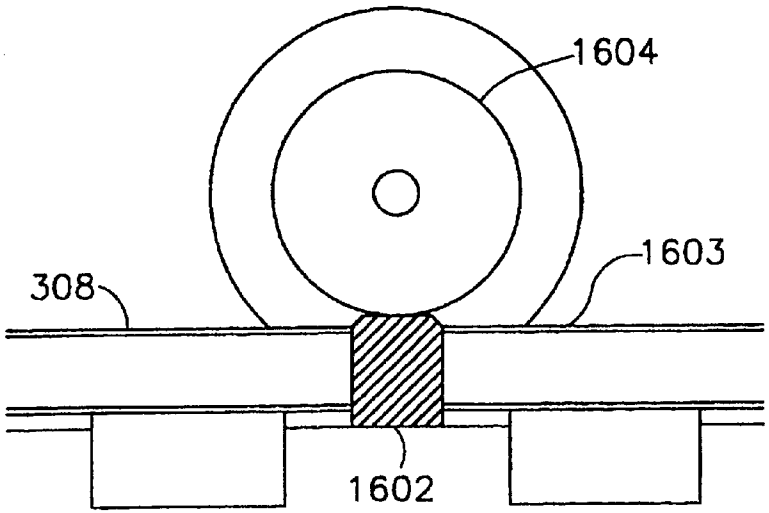

One last consideration is that the insulating pin should be constructed in such a way as to ensure that when a wheel passes over the insulated joint, the wheel itself does not form a short across the rails. In FIG. 16a, a side view of the track is shown with rail, 308, insulated from rail 1603, using a small insulating pin, 1601. When conducting model railroad wheel, 1604, passes over the insulating pin, 1601, the wheel will short out the two sections of track, 308 and 1603, with disastrous results. The correct way to install an insulating pin is shown in FIG. 16b. In this case, the insulating pin, 1602, forms a slight bump on the top surface of the rail. Thus, as the wheel, 1604, passes over the joint, it is pushed up and does not short the rails. In the classical reversing loop branch, special pins of this design, 1602, are not needed since at the point in time when the wheel rolls over the pin, the polarity on either side of the insulating pin has been switched manually so that it is the same.

The control system described in this patent eliminates the need to use such reverse loop switches and greatly simplifies the operation of the train on the layout. Note, this will require that the routing of power from various pick-ups on the locomotive be under control of on-board motor-control electronics as to not short out the track power. FIG. 15 shows how the power pick-ups from the engine truck can be modified to achieve this. This method does, of course, still require the use of an insulated track section to keep the track itself from shorting out the transformer powering the track at the reverse-loop points.

Motor back EMF (Electro-Motive Force) detection to determine motor speed

Our train control system can be significantly expanded by having information about how fast the engine is moving or a least to have information about how fast the motor is turning. This information can be used to generate new states for the on-board state generator described in U.S. Pat. No. 4,914,431 to allow for new remote control effects or state dependent effects. Besides new remote control features, the speed of the engine can be used for many other purposes. The following is a list of some of the more important applications or uses for motor speed information:

1. To have the chuff sound-effect from a steam engine be synchronized with the engine wheel speed.

2. To have the sound effect of an electric motor, such as the ones used in Pennsylvania GG-1, change in RPM with engine speed.

3. To have the sound effects change under different loading conditions. If the applied voltage is known and the speed is know, then it is a simple computation to determine how much the motor is loaded. The sound effects could change to heavier more labored sounds when the model train electric motor is turning slowly with high applied voltage. Alternately, if the electric motor is turning fast at lower applied voltage, the engine sound effects could reduce in volume and have much lighter unlabored sounds. Other effects such as the amount of simulated smoke effect from smoke stacks on the engine could change under different loading conditions.

Another advantage of knowing the motor power demand is when trying to match the power requirements of different engines on a multiple headed train to make sure that each are sharing approximately the load equally.

4. To determine how far an engine has traveled by time and speed measurements which can be useful when programming the operation of an engine to perform certain tasks or effects at different locations on the layout.

5. To know how many revolutions a motor has turned between lubrications.

6. To provide information for diagnostics to see how smooth the motor is operating to determine binding problems or other irregularities in motor performance.

7. To provide motor speed control to prevent the motor from speeding up during the power boost from Lionel transformers when the whistle button is used.

8. To know when a engine is slowing down to produce braking sound effects such as squealing brake shoes.

9. To have the simulated sound effects of clanking wheels against track joints correspond to train speed.

10. To know that a locomotive is stopped when power is still applied to the track.

11. To know the direction of a locomotive.

12. To do speed control of the engine to set it at some constant speed as it moves around the layout where variations in track voltage or grades or tight curves would normally cause speed changes. Also, knowing the engine speed will allow the system designer to provide a number of programmed speeds at different times or gradual start-up or gradual slow-down effects to simulate engine momentum.

13. To produce an appropriate amount of frequency shift in a Doppler sound effect.

14. To be able to use speed as an input variable to change the OBSG state. For example, a PR might operate the horn or whistle effect if the motor speed is above some minimum threshold, but a PR might toggle the bell on/off if the motor speed is below the threshold.

One way to determine the motor speed on DC "can" motors (permanent magnet motors) is by back EMF of the motor. Under normal conditions with applied track voltage and the engine under load, the back EMF is less than the applied EMF since power is being delivered to the motor. However, when AC power is used or DC power from unfiltered rectified AC, it is possible to measure the back EMF from the motor during the sine wave zero crossing periods.

Figure 10:
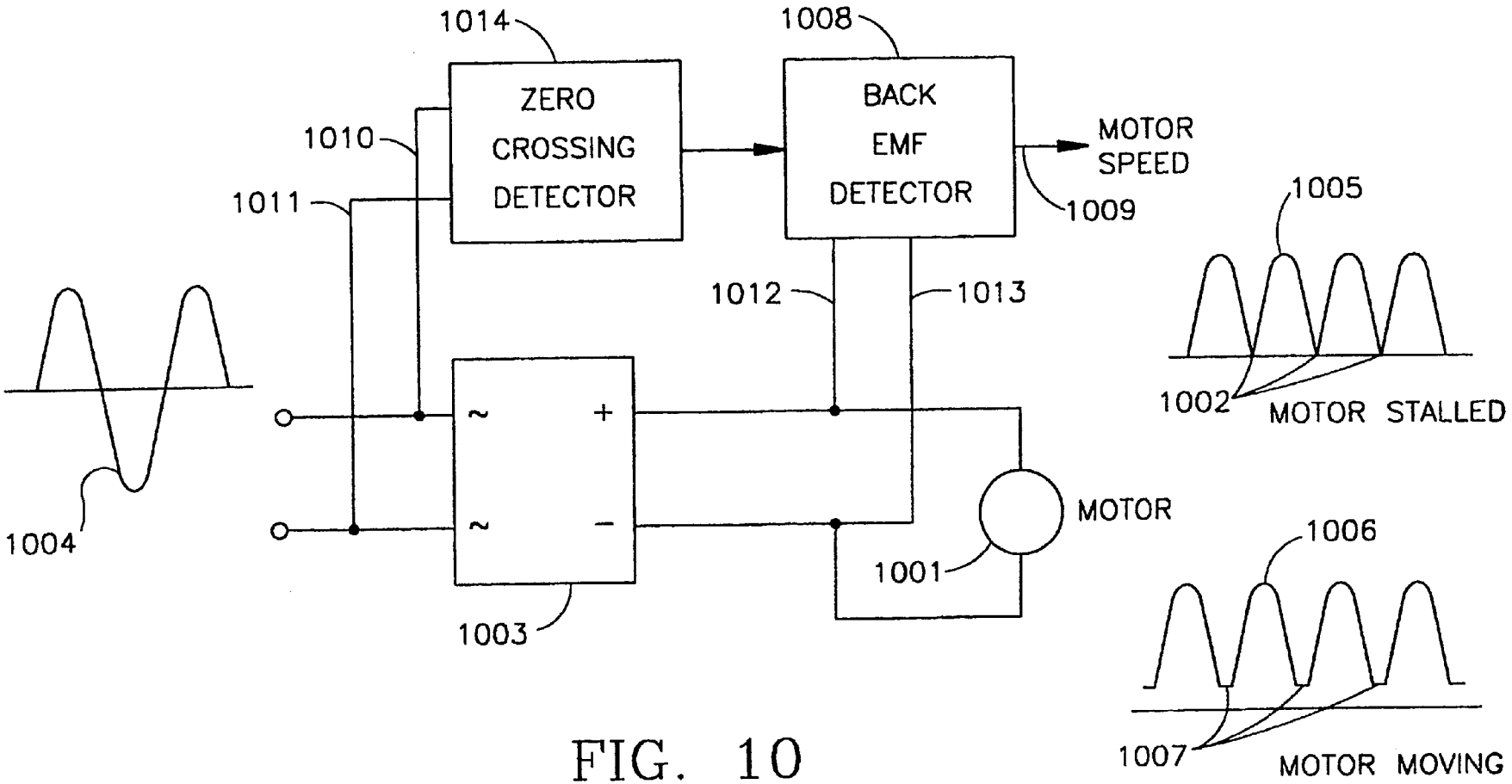
FIG. 10. Method to measure back EMF during zero crossings.

FIG. 10 shows an AC sine wave, 1004, applied to the input of a bridge rectifier, 1003, which has DC outputs connected to DC motor, 1001. The output wave form, 1005, across the motor terminal is shown for a motor stalled and the output wave form, 1006, is shown for a motor that is rotating. When the motor is stalled (i.e. powered but not moving) the output across the motor, 1001, is close to zero volts, 1002, during each zero crossing of the input sine wave, 1004. However, if the motor is moving, the output across the motor, 1001, is above zero volts, 1007, at each zero crossing of the input sine wave. In fact, the motor terminal voltage around the zero crossing points are directly proportional to the motor speed. The outputs from the motor, 1001, are connected to the input of Back EMF Detector, 1008, which generates motor speed and polarity signal, 1009. Inputs, 1010 and 1011, from the applied AC are connected to the zero crossing detector, 1014, which is connected to the back EMF detector, 1008. With information about when zero crossings occur, the detector, 1014, can use simple analog gate circuits to determine motor output polarity near the zero crossing or it can also use an absolute valley detector (minimum absolute voltage) which would not require a zero crossing detector. A more direct back EMF detector would use an ADC digitizer circuit and computer algorithms to mathematically analyze the motor voltage for minimum absolute voltage.

Sometimes, power packs for DC model trains use filtered DC or use duty cycle methods on pulse drive output to provide variable power to the tracks. For these cases, there are no dependable zero crossings and it may not be possible to determine motor back EMF voltages directly. The best solution is to use a pass device to interrupt the power briefly to the motor in order to determine the back EMF during the time the power is electronically interrupted. These interruptions should be long enough to ensure a good measurement but short enough to not affect the apparent speed or operation of the engine.

Figure 11:
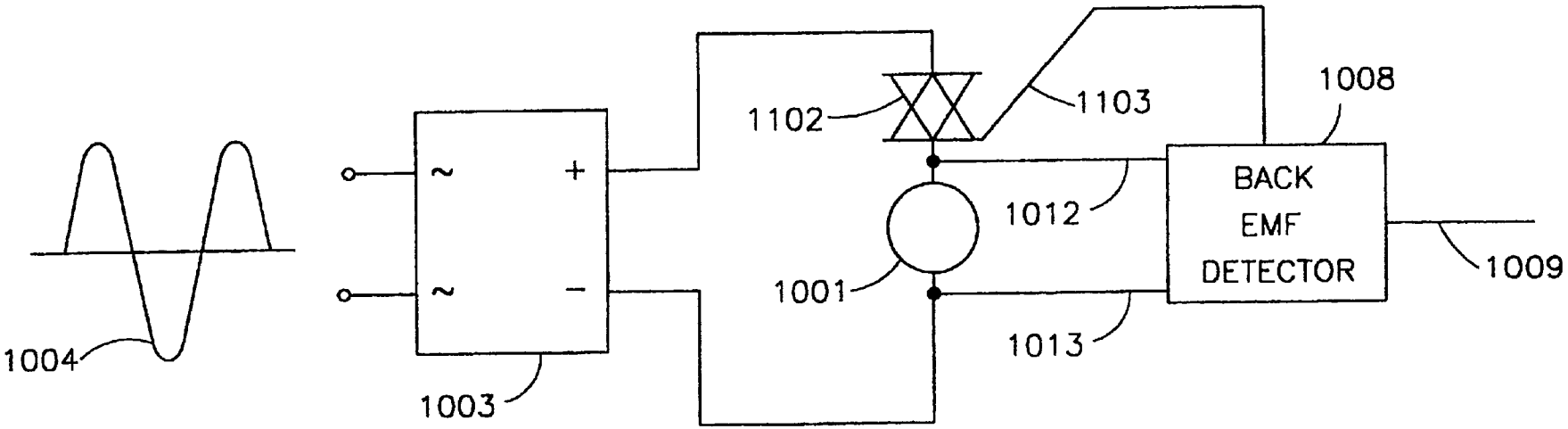
FIG. 11. Method to measure back EMF by pulsing off power to the motor.

FIG. 11 shows pass device, 1102, added and the zero-crossing detector, 1014, removed from the circuit in FIG. 10. The output lines, 1112 and 1113, from the motor, 1001, are still connected directly to the input of back EMF detector, 1008. An additional control line, 1103, to the pass device, 1102, is used to gate the pass device on or off.

In this circuit, the back EMF detector, 1008, sends out a pulse on 1103 to shut off the pass device, 1102, which disconnects the motor, 1001, from the power source, 1003, for a specified brief time interval. As soon as the pass device is shut off, the back EMF detector measures the motor voltage on lines, 1012 and 1013, for the time the pass device is off.

This technique can to be applied to any motor control circuitry as long as a controlled pass device is available. For instance, the pass device, 902, in FIG. 9 could be used to shut down the power to motor, 805. It is probably impractical to use relays to interrupt the motor power since they are slower to turn on and off than active pass devices and would see a lot of "on and off" operations under heavy load conditions which would affect long term reliability.

Using optical tachometer techniques to determine motor speed

Since many new locomotives are being produced that use flywheels attached to the motor shaft to improve coasting, a simple technique to detect motor speed is to use an adhesive label of dark and light bands applied to the flywheel and an L.E.D. transmitter and receiver pair to detect the motion of the flywheel. As the flywheel turns, the bands pass under the L.E.D. light source and reflect back into the receiver; a dark or black bands produces little light reflection and a white or silvered bands produces maximum reflection into the receiver unit. The output of the receiver is then detected by standard methods to produce pulses that correspond to motor speed.

Providing power to the on-board electronics

Because many DC powered trains operate on a range from zero to twelve volts, there is little power to operate on-board electronics at the lower throttle settings if a simple power supply design is used (like a bridge rectifier and filter capacitor). One way to solve this problem is to use a boost type switching regulator circuit to provide more voltage to the electronics than can be provided from the track. This is, however, an expensive solution. Another way to solve the problem is to change the range of the throttle from 5 volts to 12 volts and install simple on-board electronics to prevent the engine from moving until a full five volts is applied to the track. In this respect, operating DC powered trains would be similar to operating AC powered trains using Lionel type transformers that start at 5 volts. Now, there would be a dependable minimum five volts on the track to operate the on-board electronics.

The simplest way to change the level of throttle voltage where the motor starts to turn in the locomotive is use a pass device like opto-coupled triac, 902, in FIG. 9 or the triac, 1102, in FIG. 11 to control the threshold "motor starting" voltage. One simply way to do this is to supply the motor with the correct pulse drive duty cycle to have it just start to rotate when 5 volts is applied to the track and apply full power to the motor when maximum voltage is applied to the track. For instance, the applied duty cycle could be 10% to just start the motor when five volts is applied to the track and 100% when full voltage is applied to the track. In this way, except for the insertion loss of the triac pass device (and bridge rectifiers, if any), the operator still has the full power range of his throttle to change the speed of the locomotive but it is accomplished over a lower range of throttle voltage.

Since the pass device, such as 902 or 1102, controls the motor independently from the applied track voltage, the design could incorporate any function between the applied motor voltage as dependent variable and applied track voltage as independent variable. For instance, we could have the applied motor pulse drive duty cycle vary as a linear function of applied track voltage between 5 and 12 volts or it might be designed to provide an expanded range at the lower voltages and less range at the high track voltages. This would provide better control at lower voltage throttle settings.

The function between the motor speed and track voltage could also include time as a variable. This would allow modeling momentum effects of starting a heavy train by having the motor power increase slowly when the throttle is suddenly turned to a higher setting. This would model the slower acceleration of a big train. Simulated sound effects of a large engine under strain could be supplied during this momentum power up period by using a different sound record in the on-board sound effects generator.

Another way to solve the problem of supplying power at low voltages on the track is to use a buck-boost type switching regulator power supply to provide the necessary stable fixed output voltage for the electronics over a large range of input voltage. A switching regulator is also desirable since it can be designed to more efficient than a linear regulator at high track voltage where and avoid excessive heating in the locomotive.

Another technique is to use a battery backup to supply the necessary voltage and power when the track supply is too low. Such a circuit can also be designed to charge a re-chargeable backup battery when the track voltage is high. In this way, the operator may not have to replace or purposely recharge his battery if he uses the engine at high speeds for sufficiently time periods to replace the energy consumed from the battery at low speeds.

An additional feature that can be incorporated in a battery backup circuit is a method of turning the battery off after a prescribed time period when track power has been shut off. This way, the train operator can turn his layout off and have his engine electronics shut off automatically after a few seconds. The time-out period is required to provide continuous operation of sound effects and other features when the track power is being interrupted to cause direction changes or a reset.

Figure 17:
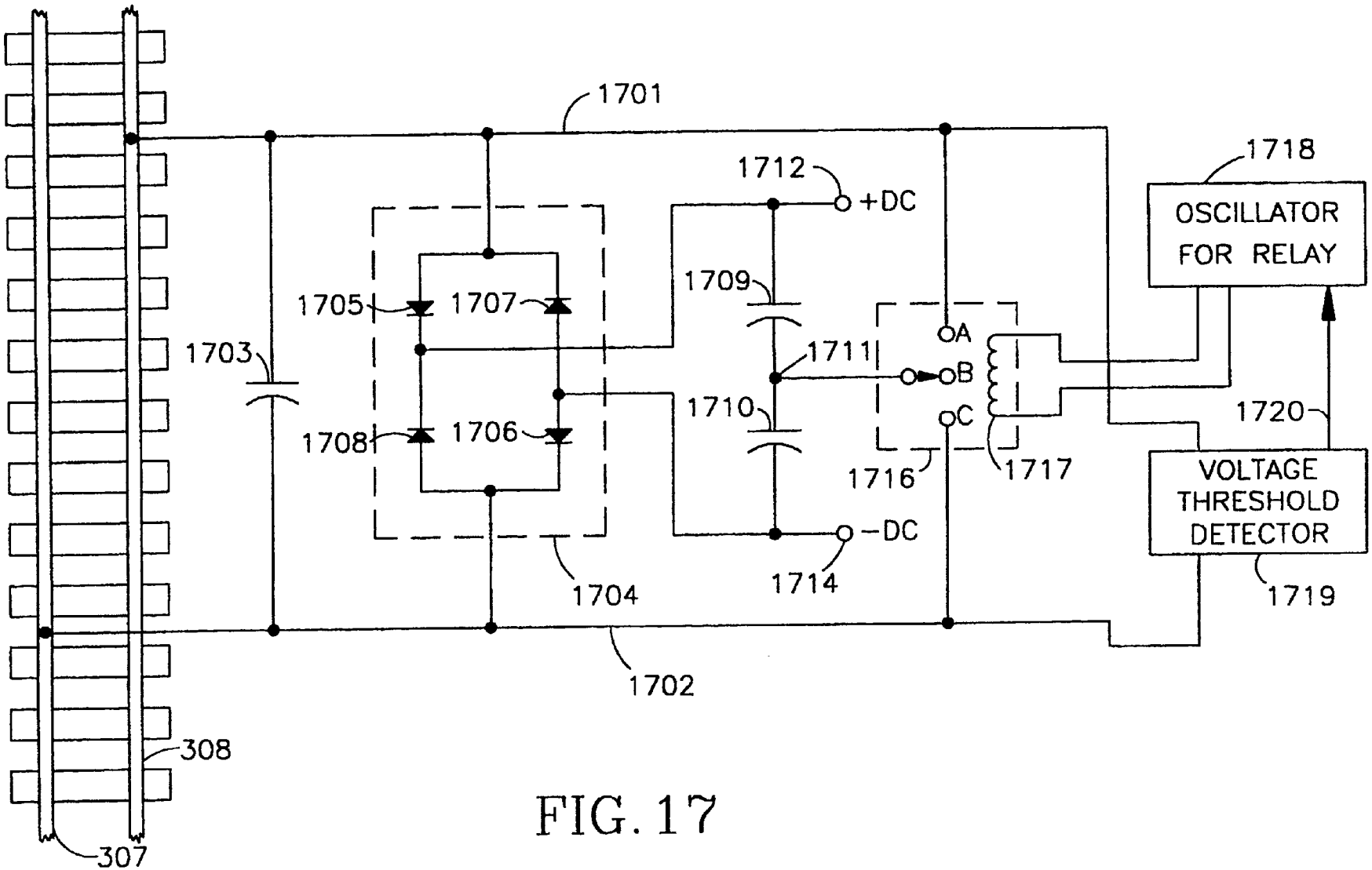
FIG. 17. On-board power supply design for DC powered trains.

The trouble with switching regulators is that they are expensive and operate at high frequencies that can cause Electromagnetic Interference (E.M.I.) problems with other electronics. Another power supply approach that works well for the DC train is the voltage doubler circuit shown in FIG. 17. The track voltage on rails 307 and 308 is applied to the on-board electronics through conductors 1701 and 1702. The bipolar filter capacitor, 1703, is used to insure that the DC source applied to the bridge 1704 is dependable voltage without excessive ripple; if the track supply voltage is filtered DC, there is little need for this capacitor. The bridge rectifier, 1704, insures that this electronic power supply will operate independent of the applied track voltage polarity on 1701 and 1702; if 1701 is positive with respect to 1702, then diodes 1705 and 1706 will conduct current during the operation of this circuit and diodes 1707 and 1708 are unused; on the other hand, if 1701 is negative with respect to 1702, then diodes 1707 and 1708 will conduct current and diodes 1707 and 1708 are unused.

The two output filter capacitors, 1709 and 1710 and connected in series across the output of the bridge rectifier and their common node, 1711, is connected to relay pole 1705 on relay 17 16. When the relay is connected to "B", there is no direct current to the common node, 1711, from either power supply rails, 1701 or 1702. In this case, the circuit is a simple bridge rectifier power supply with a filter capacitor made from the series connection of 1709 and 1710. The voltage at the power supply output terminals, 1712 and 1714 is equal to the input voltage between conductors 1701 and 1702 less the voltage drop across the diodes in bridge rectifier 1704. This is the state of operation of this power supply when the input track voltage on 1701 and 1702 is high.

However, when the voltage connected to input supply rails, 1701 and 1702 drops below a prescribed low voltage, VH, the voltage threshold detector circuit, 1719, output line, 1720, turns on the relay oscillator 1718, which causes relay 1716, to alternately move from position "A" to position "C" at some fixed rate which alternately connects the common node of capacitors, 1709 and 1710 to the power supply rails, 1701 and 1702. For the sake of explanation, assume that the relay arm, 1715, is either at position "A", "B" or "C" and spends very little time in transition between the terminals. When the relay arm is at terminal "A", diode 1706 is on and charges capacitor 1713 to the peak voltage across power supply rails 1701 and 1702 less the voltage drop on the diode 1706; all other diodes are off. When relay arm, 1715 moves to position "C", diode 1705 is on and charges capacitor 1709 to the peak voltage across power supply rails 1701 and 1702 less the voltage drop on the diode 1705; all other diodes are off. The net effect is to produce a DC output voltage from nodes 1712 to 1714 that is equal to twice the input voltage on rails 1701 and 1704 less the drop from two forward biased diodes. If there is a resistive load across the output from 1712 to 1714, one of the two capacitors, 1709, 1710, will be changing from the track supply while the other is discharging into the load. This will cause a ripple on the output voltage from 171.2 to 1714 that has a frequency equal to the frequency of oscillator 1718 and amplitude proportional to the load current and inversely proportional to frequency of oscillator 21718. The optimum frequency for low ripple would be high as practical considering other restraints like relay switching speed, capacitor series resistance (ESR) and time constants, EMI, etc.

In a practical implementation, a relay would not be used since it has a limited number of switch closures before wearing out. A more suitable approach would be to use active switching devices like Triac's to do the switching of the common node current at 1711; one triac connected to each input rail 1701 and 1702 and have their common connection to node 1711. This way, the triac could be left off to have the standard bridge circuit described in above where the relay arm, 1711, was connected to terminal "B" , or alternately switched on and off at a high rate of speed to provide the doubling output at low ripple. The only problem with using semiconductor switches is the insertion loss since each triac will reduce the output voltage doubling effect by about 3 volt.

This is a very practical circuit for overcoming the large input voltage range used on the track for DC model railroading. When the track voltage is low, the output voltage from the on-board electronic supply is close to double the applied voltage but when it is high, the output voltage can be reduced to approximately the value of the input voltage. This will keep the on-board electronics operating at low throttle settings, but keep the power supply from getting too hot at high settings.

Figure 18:
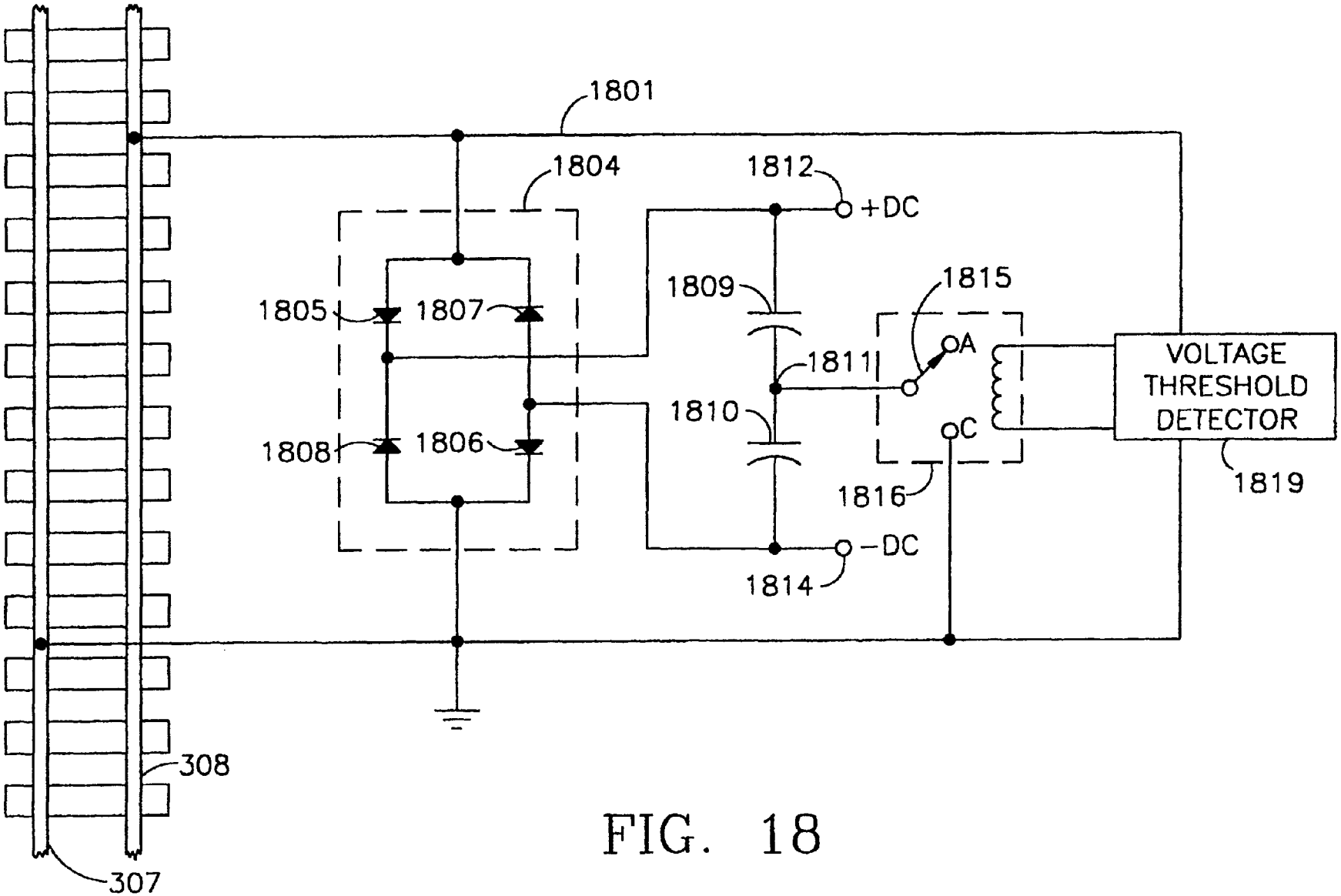
FIG. 18. On-board power supply design for AC powered trains.

This doubling concept is even simpler when applied to AC trains. FIG. 18 shows a circuit connected to track rails 307, 308 where AC power is applied; rail 307 is considered the AC ground connection. The track voltage is applied to bridge, 1804, to produce a DC output across the series connected filter capacitors, 1809 and 1810. The common node of these two capacitors is connected to relay 1816 that connects them to AC ground, 307, when relay arm, 1815, is connected to terminal "C" or to an open circuit when 1815 is connected to terminal "A".

When relay arm, 1815, is connected to terminal "A", this circuit is a standard bridge rectifier power supply with a filter capacitor made from the series wired capacitors, 1809 and 1810, connected across the output. When the applied voltage drops below a threshold voltage, VH, voltage threshold detector circuit, 1819, cause the relay arm, 1815, to switch to position "C" which starts the voltage doubling operation. Now, when the AC input at rail 1801, is positive, the positive terminal, 1812, of capacitor, 1809 will change to the positive peak voltage through diode 1805; all other diodes in the bridge are off. When the AC input at rail is 1801 is negative, the negative terminal, 1814, of capacitor, 1810 will change to the negative peak voltage through diode 1807; all other diodes in the bridge are off. This produces a voltage output across terminals, 1812 and 1814, that is equal to double the applied peak voltage less the diodes drops from 1805 and 1807.

Figure 12:
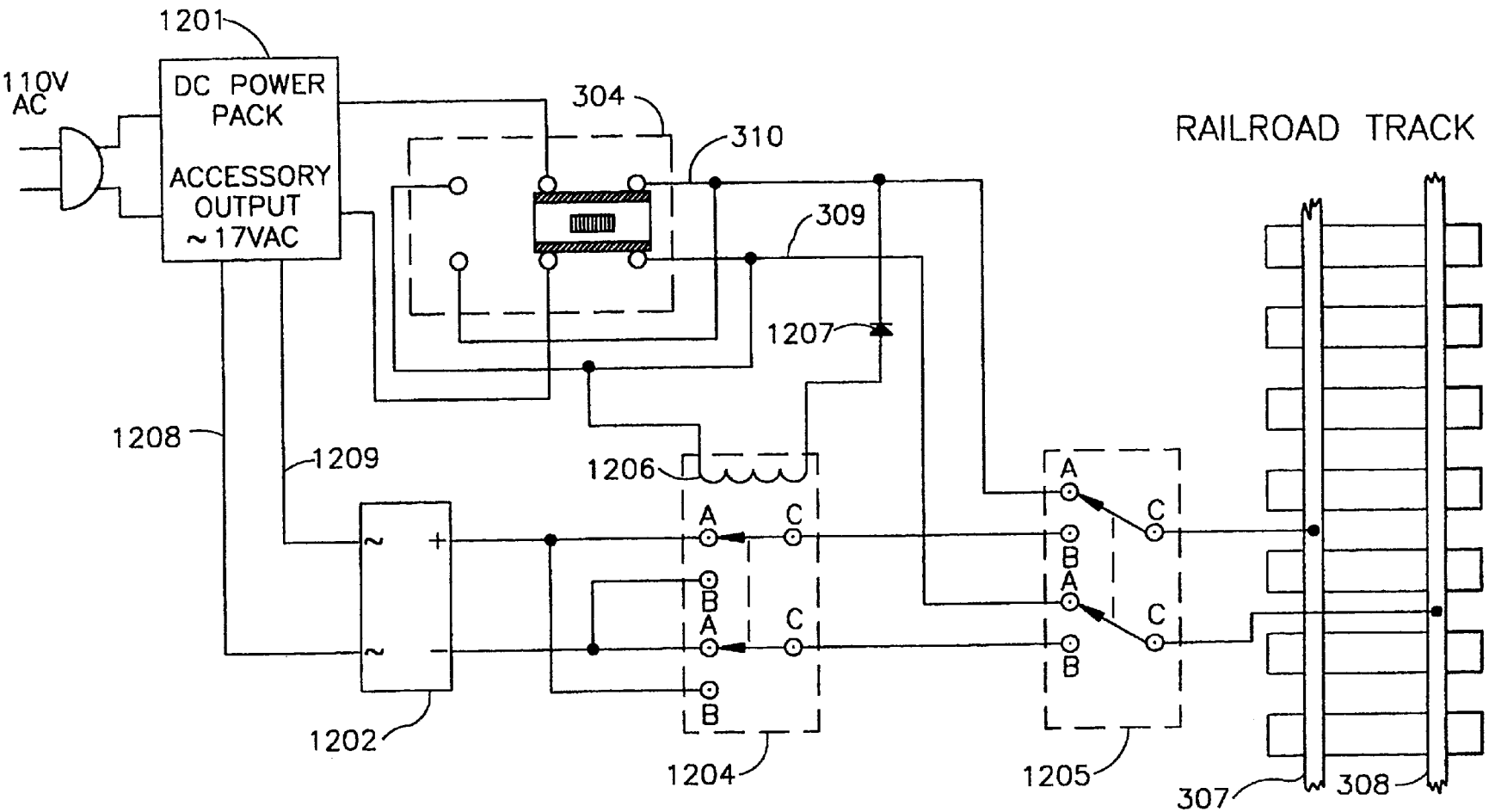
FIG. 12. Method to apply high voltage to a DC powered track.

For this circuit, a relay can be practically used since it will only move from one position to the other when the average input voltage setting passes through VH. However, the output filter capacitors, 1809 and 1810, may need to be larger since the ripple will be governed by the load current and input line frequency on track rails, 307 and 308 rather than the higher frequency possible with the DC version in FIG. 17. In any case, both circuits have the same advantages when applied to model railroading and go a long way to solve the problem of providing a reliable voltage supply for on-board electronics when there is a large input voltage range. Method to apply high voltage DC signals to the track Often, DC power packs used for DC powered trains will have a separate output voltage to power accessories on the layout. If this voltage is high enough, it can be converted to DC to provide the HV signal separately. The only problem is that the HV signal must have the same polarity as the applied DC track voltage; otherwise it would be detected as a PR or PRP remote control signal. FIG. 12 shows a simple method to provide high voltage DC directly to the track with the correct polarity.

The AC accessory output lines, 1208 and 1209, of DC power pack, 1201, are shown connected to the inputs of bridge rectifier, 1202. The positive output of the bridge rectifier, 1202, is connected to the top A terminal and bottom B terminal of double-throw double-pole relay, 1204. The negative output of bridge rectifier, 1202, is connected to the top B terminal and bottom A terminal of relay, 1204. The C preterminals of relay, 1204, are connected to the B terminals of double throw double pole switch, 1205, while the A terminals of switch, 1205, are connected to the variable DC output lines, 309 and 310, that are connected to the variable DC output from power pack, 1201, through reversal switch, 304. The C terminals of switch, 1205, are connected to the track rails, 307 and 308. In addition, the variable DC outputs, 309 and 310, are connected to the series connection of diode 1207 and relay coil, 1206, for relay, 1204.

Operation of this circuit is straight forward. If line, 310, is positive with respect to 309, the diode, 1207 is back biased and relay coil, 1204, is not actuated. If the user presses switch, 1205, a HV positive signal will be applied to the track rails, 307 and 308, that has the same polarity as the positive voltage previously applied by output lines, 310 and 309. On the other hand, if the polarity to the track from the power pack is reversed, so that output line, 310, is negative with respect to output line, 309, then diode, 1207, will be forward biased and relay coil, 1204, will be actuated (provided there is sufficient voltage to activate the coil). Now, if switch 1205 is pressed, a high voltage negative signal will be applied to the track rails, 307 and 308, that has the same polarity as the negative voltage previously applied by output lines, 310 and 309. In either case, the applied HV signal will always have the same polarity as the applied track voltage.

Microprocessor Implementation

Figure 13:
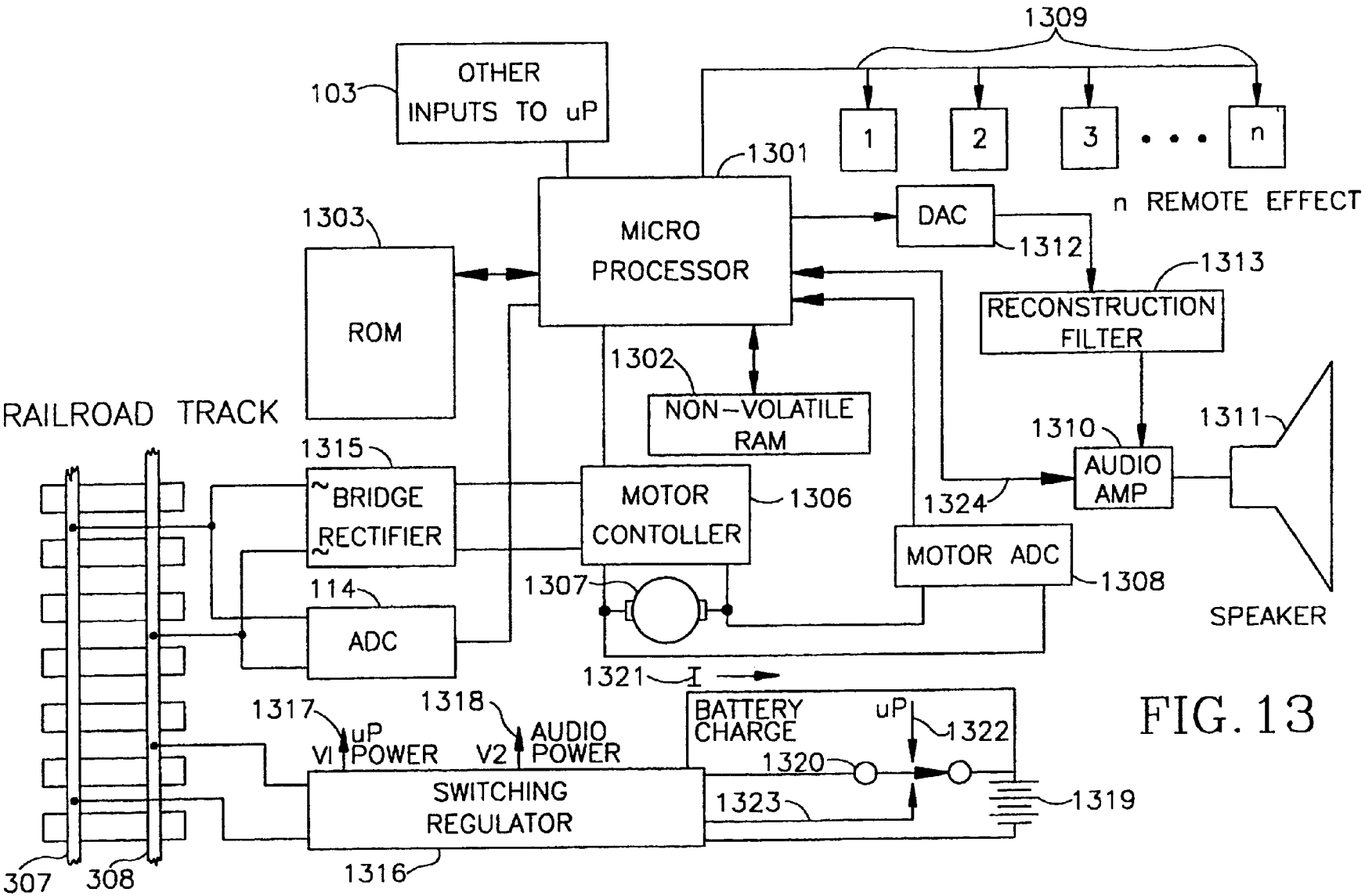
FIG. 13. Block diagram of preferred embodiment.

FIG. 13 shows an embodiment for remote control of DC powered trains using an on-board microprocessor. The microprocessor, 1301, along with read only memory (ROM), 1303, and non-volatile RAM memory, 1302, encompass the state generator and many of the functions in the blocks shown in FIG. 1 described in U.S. Pat. No. 4,914,431. The ROM, 1303, contains the source code to interpret remote control signals from the Analog to Digital Converter (ADC) signal detector, 114, and to generate the state generator states which are stored in RAM, 1302, and to generate the addresses and learned commands which are also stored in RAM, 1302.

The microprocessor also commands the motor controller, 1306, which contains pass devices and/or relays to apply either positive or negative voltage for forward and reverse operation of the motor, 1307, or to apply no voltage at all for neutral direction states, or to apply varying amount of power for motor speed control. The power for the motor comes directly from the output of motor controller, 1306, which is connected to bridge rectifier, 1315, which has inputs connected directly to the track rails, 307 and 308, and output connected directly to the motor controller, 1306; the polarity of applied voltage to the motor controller is thus independent of the polarity of the voltage on the track rails, 307 and 308. The Analog to Digital Converter, 1308, is connected directly to the motor brush terminals to measure the applied motor voltage or motor back EMF during the periods when applied motor voltage is below the generated back E.M.F.; the digital output of the ADC, 1308, is connected to the microprocessor, 1301, for speed determination by a microprocessor subroutine.

Figure 1:
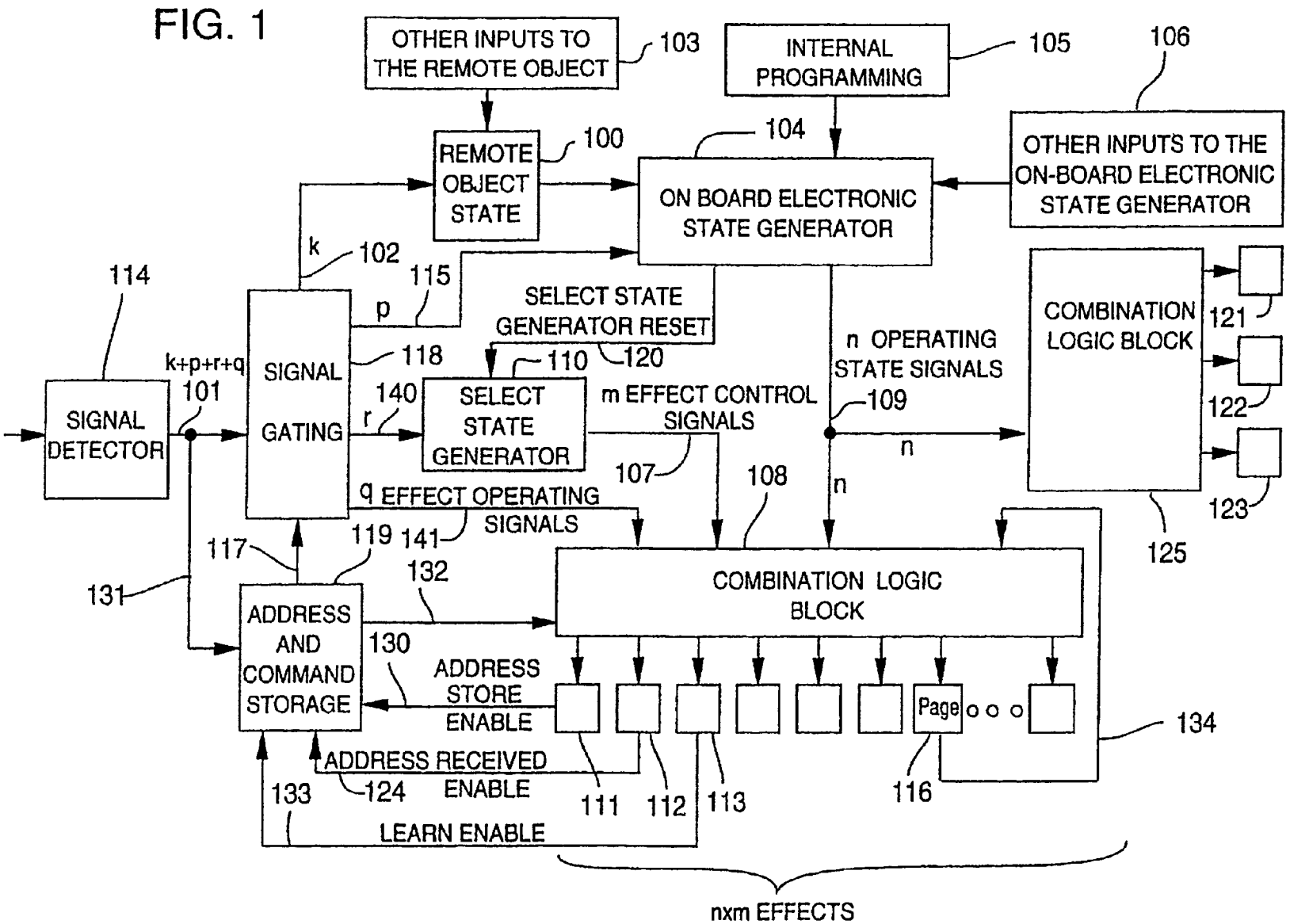
FIG. 1. Block diagram of remote control system from U.S. Pat. No. 4,914,431.
Figures 2A, 2B:
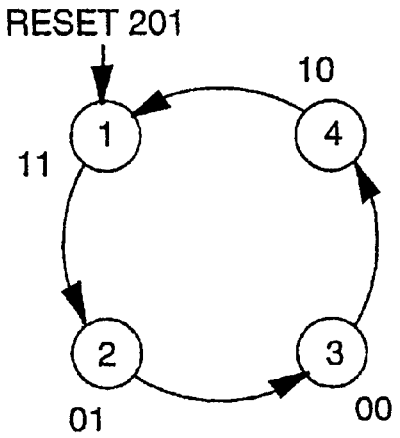
FIG. 2. Conceptual diagram of reverse unit direction states from U.S. Pat. No. 4,914,431.

Some of the nXm (read "n times m") effects, 111, 112, 113, etc. shown in FIG. 1 and the state dependent effects, 121–123, in FIG. 1 are shown in FIG. 13 by the Remote Effects blocks, 1309. Many of the nXm remote effects are special sounds stored digitally in ROM, 1303, and processed by the microprocessor. The DAC, 1312, converts the digital sound information to analog which is filtered by a reconstruction filter, 13 13, to reduce digitizing noise and then convened to audible sound by audio amplifier, 1310, and audio speaker 1311. The audio amplifier, 1310, is also under the direct command of the microprocessor to change the volume and tonal value of the sound and information is fed back to the microprocessor about the sound quality on line, 1324.

The signal detector, 114, in FIG. 1 is shown here by ADC, 114, which is connected directly to the track rails, 307 and 308, to determine power interrupt signals, the presence of a polarity reversal, PR, or PRP signal or the presence of a high voltage, HV or HVP, signals. If the ADC is fast enough it can also be used to detect the presence of other remote control signals that may be on the track including the presence of AC remote control signals superimposed on the DC applied power. The output of ADC, 114, is connected to microprocessor, 1301, which does the signal gating function, shown as 118 in FIG. 1, and to determine the size of the signal for doing special effects that respond to the magnitude of the applied remote control signals.

The power supply for the system, 1316, is connected directly to the track rails, 307 and 308. The output provides stable DC voltage, V1, 1317, for the microprocessor, and DC voltage, V2, 1318, for the audio amplifier and some of the special effects circuits, 1309. Because the track voltage ranges from 0 to 12 volts, the power supply is a buck-boost switching regulator design that supplies both 5 and 9 volts over most of the entire input range (3 to 12 volts). In addition, the power supply also employs a battery backup, 1319, which supply power to the system during periods of high power requirements and/or very low input voltage or when the input power is interrupted to do a direction change or a reset. The switch, 1320, is under the control of both the microprocessor via control line, 1322 and the switching regulator via control line, 1323. If track power is suddenly turned off to the rails, 307 and 308, the microprocessor, 1301, will open the switch after a suitable period of time (perhaps 10 seconds or so) and thus disconnect the battery from the system. If the microprocessor does not perform this task, the switching regulator, 1316, will open the switch, 1320, on its own after an additional time period. When there is sufficient input power available from the track, the switching regulator, 1316, also provides battery charging current, 1321.

The battery backup system is useful in this invention to maintain sound effects and other special features that would seem peculiar if they suddenly shut off when the track power is interrupted. In particular, our reset feature .requires a three-second period without track power and it appears more realistic to have the simulated locomotive sounds continue during this period.

Remote control signals and states: The remote control signals used for this embodiment are PR, PRP, HV and HVP. On-board state generator states, or OBSG States, are shown in table 1 below. These OBSG states are uniquely specified by the conditions listed in columns 2, 3 and 4. The first column gives OBSG state reference numbers that are used in the this discussion. However, these number are not used in the system since the OBSG states are uniquely defined by the next three columns. Also, which remote effect goes with which OBSG state number is not important and future embodiments may have different effects for different OBSG states. The second column specifies the four direction states of the reverse unit (forward, neutral before reverse, reverse, and neutral before forward) plus the reset state. Reset, in this case, is specified as a non-moving directional state. The third column lists the number of times that HVP has been applied after entering a new direction state. In either of the two neutral states or in reset, HVP's can change the state of the OBSG. The forth column is reserved for special conditions that can also affect the OBSG state such as whether the engine ID number has been selected (called IDS for ID Selected), the motor speed, temperature, time or other remote control signals or if it is not dependent any other inputs (represented by a ""). The fifth column indicates the remote control signal that will operate the Remote Effect. This will usually be an application of PR or a number of applications of PRP shown as "n PRP". In particular, note that one remote control effect in neutral is achieved by the combination of an HV and a PRP shown as "HV&PRP"". If an asterisk (*) is shown in any of columns two through 5, it implies that the condition or variable or signal will not affect the OBSG state. The sixth column describes the remote control effect. "N/A" means that a remote control signal or special effect has not been assigned.

While the signals described in this patent are cast specifically in terms that best relate to a DC- powered environment, essentially all of the features described in this embodiment apply equally well to any system that uses any type of remote control signals and on-board state generator states to increase the number of remote control options. For instance, the remote control features and system functions for the DC powered trains can be applied to the AC-powered environment simply by making a translation of terms.

In our earlier patent U.S. Pat. No. 4,914,431 we used the terms superimposed positive DC remote control signal and superimposed negative DC remote control signal. We also introduced another remote control signal described as applied AC power supply voltage in excess of a predetermined value (called "High Voltage AC" here). Possible translations to the AC-powered environment can be made as follows:

| DC-powered environment | AC-powered environment |
|---|---|
| PR | Continuous superimposed positive DC remote control signal |
| PRP | Positive DC pulse R/C signal |
| HV | Superimposed negative DC remote control signal or High Voltage AC supplied power |
| HVP | A brief application of superimposed negative DC remote control signal, or a brief excursion from Low Voltage AC applied power to High Voltage AC applied power and back again to Low Voltage AC applied power. |

In addition, the use of on-board microprocessors and A/D converters allows for improvement in the detection of remote control signal for both AC and DC powered trains. An example for AC powered trains is the detection of the small amount of DC remote control signal after the application of a large DC voltage from older type Lionel transformers (referred to earlier as position 2 and position 1 ). Using mathematical techniques, the microprocessor can determine if a position 2 DC signal occurred after a position 1 signal and turn on the remote effect immediately and keep it on while the smaller position 2 DC is present. On the other hand, if the position 1 signal was not present, and the microprocessor and A/D detected a small amount of DC that could be a position 2 DC signal, it could wait for a period of time to be sure that it was not a spurious signal. This is an improvement of simple hysteresis detection because it allows for responsive remote control effects when the signal is strong but does not eliminate a response altogether if the signal is weak. Also, when the Lionel horn is released, another large DC position 1 signal is generally applied to the track and this can be used to advantage by the microprocessor to know for certain that the remote control signal was meant to be removed. On the other hand, if the weaker position 2 signal is accidentally interrupted or falls below allowable lower limits, the microprocessor could wait for a short period of time before shutting off the remote effect to be sure that the remote control signal had actually been removed.

| Summary of Acronyms used: | |
|---|---|
| ADC | Analog to Digital Converter |
| DAC | Digital to Analog Converter |
| EMF | Electro-Motive Force |
| ID | Identity |
| IDS | Identity Selected |
| HV | High Voltage |
| HVP | High Voltage Pulse |
| LV | Low Voltage |
| OBSG | On-Board State Generator or On-Board Electronic State Generator |
| PR | Polarity Reversal |
| PRP | Polarity Reversal Pulse |
| RAM | Random-Access Memory |
| ROM | Read-Only Memory |
| R/C | Remote Control |

In summary, in the table below, the OBSG state in column one is uniquely determined by the status of the variables in the next three columns [the Direction State, the number of High Voltage selects (#HVP "select") after entering a new direction state and other conditions such as if the identification number has been selected (IDS) or it does not matter what extra conditions exist (represented by a "")]. Column 5 specifies the remote control signal that operates a specific remote effect based on the OBSG state and column 6 describes the effect. In other words, if you are in OBSG state #5, you must have entered reset, then applied a total of 4 HVP select operations the object ID number must have already been selected. Now, if a PRP is applied, the engine will toggle between master and slave. To get to OBSG #1, simply do a reset (turn power off for three seconds or more and re-apply power).

| 1 OBSG State | 2 Direction State | 3 # HVP "select" | 4 Other Conditions | 5 R/C "operate" Signal | 6 Remote Effects |
|---|---|---|---|---|---|
| 1 | Reset | 0 | * | n PRP | Temporary/Road ID |
| 2 | Reset | 1 | * | n PRP | Engine select. |
| 3 | Reset | 2 | IDS | n PRP | Temporary ID set. |
| 4 | Reset | 3 | IDS | PRP | Temporary ID clear |
| 5 | Reset | 4 | IDS | PRP | Engine master/slave toggle. |
| 6 | Reset | 5 | IDS | PRP | Engine reversal/non-reversal toggle. |
| 7 | Reset | 6 | IDS | PRP | Motor Chuff volume set. |
| 8 | Reset | 7 | IDS | n PRP | Overall sound volume setting. |
| 9 | Reset | 8 | IDS | PRP | Smoke/overhead blinking light on/off toggle |
| 10 | Reset | 9 | IDS | n PRP | Selects page |
| 11 | Reset | 10 | IDS | PRP | Uncoupler on/off. |
| 12 | Reset | 11 | IDS | n PRP | Automatic Operation. |
| 13 | Reset | 12 | IDS | Timed PRP | Fuel tank fill. |
| 14 | Reset | 13 | IDS | N/A | N/A |
| 15 | Reset | 14 | IDS | N/A | N/A |
| 16 | Reset | 15 | IDS | n PRP | Road ID set. |
| 17 | Reset | 16 | IDS | n PRP | Engine ID set. |
| 18 | Reset | 17 | IDS | n PRP | Engine and/or Road ID clear |
| 19 | Reset | 18 | IDS | n PRP | Operational clear |
| 20 | Reset | 19 | IDS | n PRP | Transformer type. |
| 21 | Reset | 20 | IDS | n PRP | System type. |
| 22 | Reset | 21 | IDS | PRP | Reset engine log. |
| 23 | Reset | 22 | IDS | PRP | Track sanding |
| 24 | Reset | 23 | IDS | N/A | N/A |

-continued

| 1 OBSG State | 2 Direction State | 3 # HVP "select" | 4 Other Conditions | 5 R/C "operate" Signal | 6 Remote Effects |
|---|---|---|---|---|---|
| 25 | Reset | 24 | IDS | N/A | N/A |
| 26 | Reset | 25 | IDS | N/A | N/A |
| 27 | Reset | 26 | IDS | N/A | N/A |
| 28 | Reset | 27 | IDS & Motor Speed | n PRP | Chuff Level/rate setting |
| 29 | Reset | 28 | IDS | n PRP | Dynamic breaking selection. |
| 30 | Reset | 29 | IDS | n PRP & timed PR's | Selects different horn frequencies |
| 31 | Reset | 30 | IDS | PRP | Overhead blinking light on/off. |
| 32 | Reset | 31 | IDS | N/A | N/A |
| 33 | Reset | 32 | IDS | PRP | Feedback on/off. |
| 34 | Reset | 33 | IDS | PRP | Doppler Shift horn enable |
| 35 | Reset | 34 | IDS | PRP | Lock-out enable |
| 36 | Reset | 35 | IDS | PRP | Test tones. |
| 37 | Reset | 36 | IDS | PRP | Diagnostic Status. |
| 38 | Reset | 37 | IDS | PRP | ITIC off.on. |
| 39 | Reset | 38 | IDS | N/A | N/A |
| 40 | Reset | 39 | IDS | N/A | N/A |
| 41 | Neutral | 0 | LV & master & Coupler not armed | PRP | Toggle bell on or off. |
| 42 | Neutral | 0 | HV & Uncouple enable "on" | PRP | Arms coupler. |
| 43 | * Not Reset | * | Coupler armed | PRP | Opens coupler. |
| 44 | Forward & Reverse | n | Coupler not armed | PRP | Blows horn n times. |
| 45 | * | * | Not RESET & Lock-out enabled | PR & 2 sec power down | Locks direction into current direction |
| 46 | Neutral | 2 | * | PRP | Tender tank water fill sound effect |
| 47 | Neutral | 3 | * | PRP | Filling sand dome sound effect |
| 48 | Neutral | 4 | * | PRP | Shoveling coal sound effect (fixed time record) |
| 49 | Forward or Reverse | * | Doppler Enabled & Motor Speed & PRP > 2 sec (horn blows) | PR within 0.25 sec of end of horn. | Horn continues to blow but the frequency of the horn (and all sound effects) slide from their original pitch to a lower pitch determined by the motor speed. The pitch of the sound effects very slowly return to "normal" while horn is off. |
| 50 | Neutral | 5 | * | PRP | Ash pan scrap or grate shake |
| 51 | Neutral | 6 | * | PRP | Track Sanding |

1. This state allows the user to select his engine by applying a number of PRP's equal to the temporary identification or road identification (ID) numbers. Temporary ID numbers are assigned to the engine or remote object in OBSG state 3 and Road ID numbers are assigned to the engine or remote object in OBSG state 16. If an engine has a temporary ID number assigned, it takes precedence over any road ID number assigned. In other words, if an engine has Road ID of m and Temp ID of n, then applying m PRP's would not select the engine but applying n PRP's would select the engine. Selecting an engine is the same as turning it on. Once an engine is on, it can be cycled through all direction states. In reset it will respond to commands in the table where IDS is shown under "other conditions". If an engine is off, it will not respond to any command except reset which will allow it to be selected in OBSG state 1. There is a special effect that can be added to this state; it is "engine start." This is the sound of an engine coming up to pressure (in the case of a steam locomotive) or the sound of a diesel motor turning over. This can occur simply by making the length of the PRP a predetermined time (such as 3 seconds.) Thus, when you select, say, engine #3—the third PRP would be held for 3 seconds. This control sequence would begin the "engine start" effect. If an engine had not been lubricated for a long time and, as such, had not had the lubrication timer reset, then a clever way to communicate the need for engine lubrication to the operator would be to make the engine very hard to start. The amount of time that an engine has been running would be summed and recorded in memory.

2. This state allows the user to select an engine by applying a number of PRP's equal to the engine ID number. Engine ID numbers are assigned to the engine or remote object in OBSG state 17. The engine must be selected with Road or Temporary ID number in OBSG state 1 before he can select an engine with engine ID numbers. The use of Road and Engine ID numbers allows the model train operator to first select his group or "road" and then to select his engine within that group. For instance, the operator may first select all UP (Union Pacific road name) model engine in OBSG 1 which will turn on all engines in that group. Then the operator moves to OBSG state 2 and selects specific engines within that group using the engine ID numbers. Using Road and Engine ID numbers allows the operator to group his engines conveniently and avoid high ID numbers.

3. This OBSG state allows the user to set his temporary ID number by using a number of PRP's. When the operator is in OBSG state 3, applying "p" PRP's will assign p as the Temporary ID number. Temporary ID numbers are used to give the engine or remote object a number that can be used temporarily to override the road ID number. This allows the user to assemble any number on engines in a train and give them all the same temporary ID number to allow operating the train as a single unit with only one ID number. When the temporary ID number is erased (cleared in OBSG state #4), all the engines or remote objects return to their original Road number to allow the user to select each engine separately.

4. This OBSG state allows the user to clear or "erase" the temporary ID number by applying a PRP.

5. This OBSG state allows the user to set his engine to slave status with a PRP; in this condition the bell and whistle/horn remote control effect will not operate. This is useful when running a number of engines together where the user does not want all the horn and bell effects on all engines to occur at the same time. The master status means that the user can operate bells and whistle/horns.

6. This OBSG state allows the user to turn on or off the reversal special effect with a PRP which programs the engine to start in neutral before reverse rather than neutral before forward. This is useful when the user wants to run engines facing back to back or nose to nose in a multiple engine consist (grouping of several engines running together).

7. This OBSG state allows the user to change the engine motor or chuff volume sound effect with repeated use of PRP's. In this state, each time a PRP is received by the engine, the sound decreases until it reaches zero volume. At zero volume, the next PRP will cycle the volume back to maximum and the process continues to lower and lower volume as each PRP is received.

8. This OBSG state allows the user to set the overall volume of all sound effects on his engine or remote object with repeated use of PRP's in the same manner as described in OBSG state 7 above. One method is to use a digital potentiometer to attenuate the audio signal into the audio amplifier. Each application of a PRP could change the resistance and hence the sound volume. Another way is to change the digital sound output by multiplying each digital sound amplitude by an attenuation factor before it is applied to the output D/A converters. In this example, each PRP would select a different digital attenuation factor to change the volume.

9. This OBSG state allows the user to toggle on and off the smoke generator effect with each PRP. The smoke generator is used to model the steam and smoke that is exhausted from steam locomotive smoke generators and steam chests. This effect can also be used in diesels to model the smoke from the diesel exhaust.

The smoke generator can also be accompanied by a firebox lighting effect that can simulate the fire in the steam locomotive. If these two effects were always on or off at the same time, the firebox lighting effect would be very useful as visual feedback to indicate that the smoke generator was on. Smoke generators usually have a hot element that burns a light oil to produce smoke. If the element is on with no oil present, it will usually bum the heater element out sooner; most manufacturers recommend turning the smoke generator off when not in use. Unfortunately, it is easy to accidentally leave it on after the oil is completely burned because there is no indication it is on (no smoke). However, if a firebox effect is on only when the smoke generator is on, the glowing and flickering lights will remind him to either add oil or turn the smoke generator off.

The actual flickering effects from the smoke generator can be controlled from the on-board system computer since it is best suited to produce the random variations in light intensity required to simulate a fire effect. Also, since the computer controls the sound effects for the steam chuff, it could have the fire effect glow brighter whenever a chuff occurs. In real steam locomotives, a partial vacuum is produced by the exhaust of the steam out the smoke stack which draws air into the firebox draft opening; when the engine is moving slowly, you can see the immediate effect of the extra oxygen on the fire as it gets suddenly brighter.

Since the model steam engine usually has the on-board electronics in the tender and the smoke generator and firebox lights in the engine, there may be many wire connections required to operate the different effects. One way to avoid unnecessary wiring is to have the smoke generator come on at full power whenever the random signaling for the lighting effects for firebox is present. This could be done by filtering the variable pulses for the firebox lamps to produce a single on/off input signal to the smoke generator.

In a more advanced system, the smoke could be produced in response to the brightness of the tire. In this way, when an engine is working hard going up a grade or starting a heavy train, there would be a hot glowing fire and a lot of smoke. When the engine is slowing down or moving down a grade, there would be less fire and less smoke. Also, firebox activity or brightness could be part of an "engine start" effect, perhaps gradually coming up to "full fire". The engine could be made immovable until "full fire" is achieved.

A new type of smoke generator could also be added to produce smoke exhaust only when the chuff sound is heard. Normally, smoke generators on model trains fall into two categories. The first is a continuous smoke generator that produces smoke at a constant rate at the applied power level. The other type produces puffs of smoke from a plunger that exhaust air through the smoke element that carries smoke out the smoke stack; the plunger is often mechanically coupled to the wheels or gear box to produces more puffs of smoke as the speed is increased. This second type of smoke generator is more realistic looking but requires that mechanical parts are connected to the engine which makes it expensive to produce; it also limits its use as an aftermarket product since most users will not want to alter their engines nor do they usually have access to machinists to add the mechanical connections to the wheels or gear box.

A better idea would be to use an air source that is controlled electrically from a solenoid or other mechanical apparatus. This way, whenever a chuff is heard, air could be exhausted through the smoke element and out the smoke stake. For instance, a solenoid could be used with a plunger in a cylinder to pump air though the smoke element whenever the solenoid is activated. In this way, the smoke could be make synchronous with the chuff sounds and the brightness variations in the smoke box, producing a very realistic effect.

This same idea could be applied to diesels. Although diesels do not have the same amount of smoke as a steam engine nor as distinctive "puffs" of smoke, they do smoke profusely whenever they are under heavy load. Instead of a solenoid type plunger arrangement, a better choice would be a pump or fan that would produce a continuous stream of air through the smoke element when activated. The amount of air and the duration or the exhaust could be controlled from the microprocessor to correspond to the labored sounds of the engine and the demands on the motor.

This OBSG state can also be used to turn on or off an overhead blinking light that is commonly found on modern diesels.

10. This OBSG state allows the user to select other groups of effects and options with repeated PRP's. If n PRP's are pressed, the user has advanced to page n. There are only a fixed number of pages (say p); once the user gets to the $p^{th}$ page, the next application of a PRP will advance his page to the original page at OBSG state #10 and additional PRP's will again advance the user through the p pages in an endless loop.

Each page has a fixed number of selections (say m) and selections are made by using HVP's in the usual manner. When the user gets to the mth selection, the next HVP will move the selection back to the first selection or "page" position. In other words, using repeated HVP's will continue through the same set of "m" selections in an endless loop. To exit the loop, the user can interrupt the power or return to the page selection position which is always position #1 on each page. The selections on each page are operated with PRP's or PR's in the same way there are done for other OBSG states.

This paging concept allows the system to expand the number of OBSG states in a manner that provides better organization of features and reduces the number of HVP's required for the same number of features. For instance, if there are 100 possible remote effects for reset, the user would normally have to use 100 HVP's to get to the last selection. However, if the $100^{th}$ effect was the tenth position on page ten, then the user would only have to apply ten HVP's to get to OBSG state #10, ten PRP's to get to page ten and ten HVP's to reach the tenth position on page 10.

11. This OBSG state allows the user to toggle on and off the uncoupler effect. The actual uncoupler operation is described below for OBSG state 42 and 43.

12. This OBSG state allows the user to select a number of different automatic train operation modes with repeated PRP's. Each time a PRP is received, the engine is set to perform to a different pre-loaded program that will blow whistles, ring bells, etc. After the last choice is made, the next PRP will return to the first automatic operation choice and the process continues.

A program for automatic operation of the engine or remote object might not commence until the engine leaves reset to go into forward and is commanded to initiate the program. One automatic operation is called "station stop". When this choice has been selected and the user is in forward, blowing the horn in some coded way such as two longs and two short blasts, or perhaps holding the bell button down for a predetermined time period, will start the engine's programmed sequence appropriate for coming into a train station. For instance, the program may first start tinging the bell until it comes to a stop. After the direction state has been changed to neutral before reverse, the system might play a digital sound record for a train arrival announcement such as "Now arriving on track 2, the New York Central Limited, etc . . . . ". When the user cycles the direction state to neutral before forward, there might be a departing message like "Now leaving on track 2, the New York Central Limited bound for Marysville, Altuna, etc. . . . ". When the user changes the direction state to forward, the bell might start ringing and last for 10 seconds or so. The big advantage of station stop announcements in the engine, is that the announcement is correct for the arriving or departing train. If different announcement are on recordings in the station, then there must be a way to select the proper announcement for the arriving train. The operator can easily do this by sight but it is difficult for the station to make the decision since it would need to discriminate between one engine on the track versus another. To determine the identity of a engine on a track is technically more difficult then having recordings located in the engine. It would require some way to read the train's name such as using a bar code reader in the track directed upwards to read a label attached to the underside of the engine as it passes over that track section or perhaps an LED transmitting digitally encoded information from the engine to an LED receiver beside or on the track.

The possibilities for automatic operation are quit board. In future systems, it will be possible for the user to program his own autonomic operation sequence. One very simple method is to have the engine learn the program by having the sequence performed once by the user. After that, when the program is started, the engine would repeat the same steps of blowing the horn, ringing the bell, etc. Also, the engine could be taught macro commands to respond to a remote control signal with a prescribed set of responses or the engine might be taught to respond to certain types of combinations or time sequenced remote control signals such as a horn that blows three short blasts and one long one, or track power interrupts of a certain time pattern, etc. More complex tasks for automatic operation, that required interacting with control tracks, track sensors, etc. may use PC's to connect directly to the on-board serial port to make programming easier.

Another special effect that can be included in automatic operation is moving silhouettes in the engine cab or passenger cars to simulate people getting on and off a train at the station. Train manufacturers have for years included painted silhouettes of train passengers on translucent backing inside the window areas of passenger cars. As the cost of flat panel displays and memory decreases, it would be a novel idea to have these otherwise fixed silhouettes get up and move around the passenger cars by using computer graphics animation techniques. Normally, while the train is moving or at rest (but not at a station to load and unload passengers), the passengers could be getting up and moving around from car to car or eating at the dining car or any of a number of activities. At a train station, they could be shown standing up, getting down luggage, walking to the end of the car (to simulate leaving the car) etc. On the other hand, if they were boarding, all these activities would be done in the opposite order. Also, the motion of the silhouettes could respond to other inputs like temperature or motion or time of day, etc. For instance, if the train was run to fast, people could be shown falling over or if the temperature were too high, they could be shown taking off their coats and it were dark out side they could be shown going to bed, etc. Appropriate sound effects could accompany each of the different silhouette scenarios such as braking glass or yelling customer in the dining car when the train moves too quickly.

A more advanced system could use color LCD displays to show more realistic colored in figures moving around inside the passenger cars. In fact, color car interior backgrounds could be shown on the LCD display for added realism. Another technique would be to actually add car interiors (such as seats, tables, etc.) and then place a single color or monochrome "transparent" LCD display down the center of the car that could be viewed from either side of the car. This would be cheaper to produce since there would only be one display. It would also appear more realistic and add visual perspective because the figures would actually be in the center of the car, rather than next to the window area.

The system for moving passengers could be completely on-board in a passenger car that has its own independent computer and graphics display. It could also have its own on-board state generator and be triggered in the same way described above or it may simply respond to a direct remote control signal or digital remote control signal to turn it on or even to direct the activities on the graphics display. This way, it would be independent of the engine. In fact, this concept of moving silhouettes is so broad that it can be applied to all aspects of model railroading or to modeling in general. Moving silhouettes can be applied to miniature houses, automobiles, business, etc.; anywhere there is motion behind a window or open structure.

13. This OBSG state allow the user to fill his fuel tank with fuel for simulated limited operating range. Apply a sustained PR will result in more simulated fuel being placed in the fuel tank depending on how long the PR is maintained. The user will hear a bell ding every few seconds to tell him the amount of fuel. When all the fuel is used up the engine will stop.

14–15. OBSG states 13–15 have not been assigned.

16. This OBSG state allows the user to set his Road ID number with repeated use of PRP signals. Applying "p" PRP's where p is any integer will assign p as the Road ID number.

17. This OBSG state allows the user to set his Engine ID number with repeated use of PRP signals. Applying "p" PRP's where p is any integer will assign p as the Engine ID number.

18. This OBSG state allows the user to clear his Road or Engine ID number. The first application of PRP will clear the Road ID and the second will clear the Engine and Road ID number.

19. This OBSG state allows the user to apply a PRP to reset all values set in all OBSG states one through 18 back the factory original values.

20. This OBSG state allows the user to set his system for optimal operation with different transformer types. Each time a PRP is received, a different transformer type is set. After the last transformer type is selected, the next PRP will cycle back the first choice and so on.

21. This OBSG state allows the user to select how his system is configured to provide different sets of responses to re,ote control signals for the OBSG states. Each time a PRP is received, he has selected a different set of preprogrammed responses for the OBSG states and remote control signals. This is useful when additional remote signals are available and the system can be expanded to do more functions and features. The selections in this OBSG state will keep the product from becoming obsolete since any new signaling system can be incorporated. As an example, this OBSG state will allow the user to select from a number of command control systems that will be available in the future. Conversely, selections in this OBSG state is also useful when trying to limit the number of remote control features for first-time users. After the last System Type is selected, the next PRP will cycle back to the first choice and so on.

One system type of importance is a backward compatible system that will allow the user to operate this system equipped engine in the same way (or nearly the same way) as he operates his standard engines where the motors are electrically connected to the rails. For DC powered train layouts, this means that the system equipped engine must always start in a direction specified by the track polarity and changing polarity will change direction. In this state, under normal operation, there can be no reset to a neutral directional state since this would be non-compatible with other engines that do not have any neutral states. If system equipped and standard engines were both used in a multiple headed consist and power was turned off for the reset period, the engines would not all be in the same directional state if a neutral direction reset was allowed. Also, a backward compatible system means that there is no easy to use remote control signal since PR's will cause direction changes and HV's will cause the engines to speed up abruptly. Therefore, in true compatibility mode, there is no remote control horn or bell operation using these two remote control signals. Also, it would appear that once the choice has been made to use the backward compatible system, there is no way to get back into a reset state to get out of this system or make any other changes for that matter.

However, we have described earlier a way that provides most of the necessary backward compatible operation but still leaves a way to do simple remote control. In this system, the direction button is used as a remote control signal when the engine is moving (to blow the horn, etc.) but when the engine is off, changing the polarity and turning the power back on will cause a direction change instead. In this system, the engine only has two directional states available (forward and reverse) but the user can still use PR to blow the horn when it is moving. However, the user should not blow the horn when the system engine is used with standard engines since the PR will reverse the standard engines. Since most operators of DC powered trains do not reverse their engines while the engine is moving (it is hard on the engines and looks very non-prototypical), this system is ideal as a backward compatible system that still retains some remote control effects.

There is still the problem of how to get back into reset. Since there is a remote control signal available (PR) there are a number of possible techniques to enter reset. For instance, the user could blow the horn with some coded sequence like two long and two short blasts to get into reset or hold the horn down for a specified long period of time, etc. Our preferred technique is to press the horn button while moving and while the PR is being applied, turn off the power for the reset time period. When power is reapplied, the engine comes up in neutral and in reset. When the user wants to exit reset, the power is interrupted. This procedure to get into reset is the same as the unlock procedure described below in #45. Since the unlock procedure will bring an engine back to reset, there is a certain consistency in using this technique to always bring an engine back to the reset state, regardless of the system type.

With only the PR signal available and no neutral directional state, the bell cannot be turned on the normal manner. However, as described above, a coded horn could be used to toggle the bell on and off. Another approach is to use the applied track voltage setting and the PR signal to control either the bell or the horn. If the track voltage is at a low setting below a predetermined value, PRP's will toggle the bell on and off. If the track voltage is above the predetermined setting, PR's will blow the horn.

A third technique is to use temporal OBSG states to determine if the bell toggles or the horn blows. Normally, OBSG states are static and stay fixed unless changed by a direction change or the application of some remote-control signal. A temporal OBSG state is one that is only there for a predetermined period of time and then either returns to the previous OBSG state or changes to some other determined OBSG state. For this particular example, a temporal OBSG state is established when a PR is first detected and lasts for say, 500 msec, and then the OBSG returns to the previous state. If another remote control signal were available, we might use the temporal OBSG state to change the effects of this remote control signal. However, since we only have the one remote control signal (PR), we propose using it for double duty in the following way. While the OBSG temporal state is present, the application of a PRP can be used to toggle the bell on and/or off but will not cause the horn to blow. After the 500 msec when the OBSG returns to its original state, the continued application of a PR will cause the horn to blow but will not toggle the bell on and off. The effect for the user is that if the PRP is applied quickly, the bell will toggle on or off but if the PRP is applied for a longer period, the horn will blow and there will be no effect on the bell. As long as the user applies PRP longer than 500 msec, the horn will blow but will have a 500 msec delay. On the other, hand, if the user applies a PRP within the 500 msec period, the bell can be toggled on and off.

This third technique can be improved further by preventing the temporal OBSG state from occurring within some specified time period from the last application of a PRP (say two seconds). Now when the user applies a PRP (longer than 500 msec) to blow the horn, there will be a 500 msec delay as usual but thereafter, applying additional PRP's of any duration will blow the horn quickly without delay as long as the time period between each PRP is less than 2 seconds. The user will only perceive the 500 msec delay for the first horn blast. The user will probably not notice any limitations in toggling the bell on and off since he will only occasionally attempt to operate the bell directly after blowing the horn. If he does try to toggle the bell too quickly after blowing the horn, the horn will simple blow again. He will quickly learn to wait out the two second before trying to operate the bell.

Another improvement can be made to this third method of blowing the horn and operating the bell by noticing that the bell is seldom turned on in prototype locomotives when the engine is moving at high speed; the bell is usually a feature reserved for moving into or out of a station or yard environment. Therefore, we could use the speed measurement of the engine and only allow the bell to be toggled when the engine is below some predetermined speed setting. Now the delay in the horn will only be noticed for the first blast if the engine is moving slowly and not noticed at all when moving at high speeds. We could also use this speed detection method to shut the bell off automatically when moving at speeds above the predetermined speed setting and turn back on when returning to a speed below the predetermined speed setting.

22. This OBSG state allows the user to reset his engine log to zero time. The engine log records the amount of time the engine has been on for information about when to lubricate the engine or to determine when the engine will need refueling. The computer will update the running time stored in memory after a specified time period (e.g. every five minutes). Applying a PRP in this OBSG state will reset the memory to zero time.

23–27. OBSG states 22–25 have not been assigned.

28. This OBSG state allows the user to set the chuff threshold and maximum chuff rate with PRP's as a function of motor speed. Chuffs are the digital sound effects that simulate the sound of steam exhaust frown running steam locomotives. With the first PRP, the engine starts moving and the chuffing sound is heard. The user lowers the speed until it is just at a stall and applies another PRP; the engine is now set to start chuffing at this measured motor speed. The user now turns the throttle up until the engine is running at its maximum desirable speed; anther PRP will set the speed where the maximum chuff rate will occur. If another PRP is applied, the entire process of setting the chuff threshold starts again.

29. This OBSG state allows the user to select the amount of dynamic braking. Each successive application of a PRP will decrease the amount of dynamic braking until zero braking is reached. The next PRP will return the selection to maximum braking and the process will continue with each PRP in an endless loop. Each selection of dynamic braking will apply a different load on the motor when it is coasting (i.e. coasting means the average applied voltage to the motor is less than the back E.M.F. from the motor). The load can be purely dissipative or like the prototypes, useful work can be done with the generated motor output such as powering the cooling fans, etc. In any case, appropriate sounds can be generated during the dynamic braking periods to simulate the actual effect (fan motors, electrical humming, etc.).

For a more advanced system, the dynamic braking could be under constant control of the operator where the amount of applied loading to the motor/generator could be varied real time.

30. This OBSG state allows the user to customize his diesel horn or steam whistle to have any combination of tones. Each time a short PRP (less than three seconds) is pressed, the horn or whistle choice moves to the next higher frequency tone without selecting it. However, if a PRP is maintained for three seconds, the next horn or whistle tone will be selected as part of the horn ensemble. After the last or highest frequency is selected, it returns to the lowest to continue the selection process. At each selection or choice, that particular horn or whistle record is heard for easy reference. For instance, consider the case of five horn sound records available in memory (e.g. Horn 1, Horn 2, Horn 3, Horn 4 and Horn 5). If the user applied a PRP for three seconds he would hear the sound of Horn 1 and he would have chosen Horn 1 as part of his horn ensemble. If he then applied a PR by pressing button, 501, "in" he would hear horn 1 and after three second, if he let go of button, 501, he would have selected Horn 1. On then other hand, if he had held in button, 501, for only two seconds, he would heard Horn 1 but would not have selected it. If he then applied three more short PRP's (less than three seconds) and then one long PRP (more than three seconds) he would have selected Horn 5 but not Horn 2, 3 or 4. After leaving OBSG state 30, his new diesel horn would be composed of both Horn 1 and Horn 5 records.

Real railroads often have very distinctive horns although there are only a small number of standard horn frequencies available. Individual railroads will use one, two, three, four or five chime horns with their choice of the available standard tones to provide their own unique sounds. Having the model railroad operator select from the same standard horn tones allows him to match the sounds of his favorite railroad and provides variety for his layout.

This idea of programming horn frequencies is not restricted to having an On-Board State Generator. A simple circuit could be designed that would allow the user to select his horn or whistle ensemble with simple switches on the circuit board. For instance, an analog circuit with five separate oscillators, each producing a unique horn sound, could be designed where the user could select which ones to sum together with a six wide dip switch.

31. This OBSG state allows the user to toggle on and off his overhead blinking light with each PRP. The overhead blinking light simulates the strobe lights often found atop modern diesel locomotives.

In more advanced systems, the overhead blinking light (or other lights like marker lights, headlights, cab lights, running lights, ditch lights, or truck lights, etc.) can be used to indicate when an engine has been selected. Sometimes it is difficult to determine which engine has been turned on from the sound effects alone when many engines are grouped together. If an overhead blinking light or other light where to come on when an engine is selected, it is easy to spot.

32. OBSG state 32 has not been assigned.

33. This OBSG state allows the user to toggle on and off the "bell ding" feedback effect with each PRP. The feedback effect is a single bell "ding" each time a PRP is received and acknowledged by the system. It tells the user that a proper signal had been sent. When better and more automatic PRP signal generators are available, the user may want to turn this sound off since it is no longer needed.

In general, providing audio or visual feedback to the operator for any system that does not have a method to send information back down the track from the remote object to the user, is a very good idea. This way, there is confirmation that the information was sent and properly received. If no such method is available, there must be some way to insure a valid transmission such as using redundant data transmission and error correction techniques.

34. This OBSG state allows the user to toggle on and off the "Doppler" effect with each PRP. The Doppler effect is only activated under special command in forward or reverse (see OBSG state 49 below). Doppler shift is a change is perceived pitch that occurs when a sound source is either moving towards or away from the observer. In trains, the most dramatic effect is often heard at road crossing where the whistle or horn from a speeding engine shifts from a high pitch to a noticeably lower pitch as the engine passes by.

35. This OBSG state allows the user to toggle the direction-lockout-enable effect on or off with each PRP. Lockout is a way for the user to prevent his engine from changing direction when a power interrupt occurs (or any other signal that is intended to change the engine's direction). The actual lockout is only turned on when the engine is in a directional state (but not reset).

36. This OBSG state allows the user (or more likely the repair person or system installer) to test the sounds on the system by applying PRP's. Each time a PRP is applied, a different audio wave form is generated for test purposes.

For this system, the audio output from the test tones can be analyzed by hearing or displayed on an oscilloscope for comparison against a standard. For a more advanced system, an on-board digitzer (ADC) would be used to measure and store the audio output from the audio system and compare this to the actual test tone records in memory to see if they were within specifications. In fact, for an advanced system, the user could have access to built-in diagnostics and on-board test programs to test many characteristics of the system.

37. This OBSG state allows the user to send to his computer screen via the system serial port, the status of the various setting for the system by using a PRP. Applying a PRP will cause the transmission of data to commence.

In advanced systems, the serial port can be used to communicate between the two computers in order to directly program the on-board system. Also, the serial port could be used to communicate between two different on-board computers to coordinate their operation or to exchange information.

38. This OBSG state allows the user to enable ITIC sound effect for steam engines. ITIC effect is the words "I think I can" repeated over and over again instead of the chuffing sounds. "I think I can" words keep time with the engine speed in the same way that chuff sounds do. "I think I can" effect is actually turned on in forward or reverse after some predetermined complex set of operations like, blowing the whistle once, then changing direction, then turning on the bell, etc.

39–40. These OBSG states have not been assigned.

41. This OBSG state allows the user to toggle the bell on and off. If the engine is in neutral and the throttle is set at a low voltage and the engine is set to "master" status, then the bell will toggle between on and off for each applied PRP. The bell will stay on in all states (except a reset) until it is turned off in neutral. There is a preferred technique to turn the bell off. If the bell is ringing and the operator does a PRP to turn it off, you could immediately shut the bell off. This way the operator would at least know for sure he did turn the bell off. This does not sound natural, however. If you simply wait till the bell record ends and stop the ringing, the operator has insufficient feedback to know if his command to stop the bell was really received. Thus, he might well press PRP more than once trying to get the bell off. This might actually turn the bell back on before it stopped ringing. The best compromise is to accept one or more PRP's as simply multiple requests to turn the bell off. Only after the bell record has completed and a predetermined time (perhaps zero) has passed are further PRP's to be interpreted as a request to toggle the bell back on.

42. This OBSG state allows the user to arm the coupler effect with a PRP. When the engine is in neural, the throttle voltage is at HV and the engine has been set to have the uncoupler on (OBSG state #11 ), applying a PRP will arm the coupler to open when the system receives another PRP. The remote effect of arming the coupler is accompanied with the sound effect of the coupler lift bar being raised.

An alternative way to arm the coupler is to use a short application of a PRP while in neutral where the long PRP would do another operation such as toggling the bell on and off. The same principle would apply to firing the coupler in forward or reverse; that is, a short application would open the coupler but a long operation would not fire the coupler but would do some other operation.

43. This OBSG state allows the user to open his coupler in any direction state except reset by applying a single PRP. The application of this PRP will open the coupler with the correct sounds of the coupler knuckle opening and the air release sounds from the parting brake lines. It will also disarm the coupler.

44. This OBSG state allows the user to blow the horn by applying a PR in either forward or neutral. The horn will blow as long as the PR is applied. When the polarity is return to its original value, the horn will stop blowing. In other words, the horn will blow during the duration of a PRP.

45. This OBSG state allows the user to lock his engine in its present directional state so that no power interruptions of other remote control signals can change its direction. This is a valuable feature to have when using engines with block signals that turn the power off to the track to stop trains at red signals. The user is expecting his train to continue in forward when power is reapplied but, in fact, without lockout, the engine would either reset or advance to the next direction state depending on how long the no-power condition lasted.

Lockout is achieved in any direction state by applying a PR and then Turning off the power for a short period of time (about 1.5 seconds, but less than the reset time—3 seconds) until a short horn blast is heard and then re-applying power immediately. The engine is now locked in this direction. Note that the application of the PR may cause some remote effect such as blowing the horn or turning on the bell or arming the coupler.

To exit lockout, the user applies a PR and waits for a full three seconds. This will put the engine into reset.

46. This OBSG state allows the user to apply a PRP to have a fixed time digital sound record played out that simulates the sounds of an engine tender being filled with water from a water tank. The record will play each time a PRP is applied.

47. This OBSG state allows the user to apply a PRP to have a fixed time digital sound record played out that simulates the sounds of an engine being filled with sand from a sand tower. The record will play each time a PRP is applied.

48. This OBSG state allows the user to apply a PRP to have a fixed time digital sound record played out that simulates the sounds of a locomotive fireman shoveling coal into the firebox. The record will play each time a PRP is applied.

49. This OBSG state allows the user to time a Doppler shift effect on all sound effects when the locomotive is in forward or reverse by applying a PRP for at least two seconds and then applying a second PRP within 250 mSec. The Doppler effect must be enabled and the engine must be moving to do this feature. After the Doppler effect is initiated, all sounds including the horn will shift in frequency by an amount that is a monotonic function of motor speed and over a time interval that is also a monotonic function of motor speed. For a digital sound system, the change in frequency can be accomplished two ways: 1) the clock for the digital system can be changed in frequency to which will increase or decrease the rate that all digital sounds records are applied to the output digital to analog converter (D/A) or 2) an on-board processor can select the rate that the digital sound record is applied to the output D/A. If the on-board processor is also the digital sound system, the latter technique is preferred since it can precisely control the rate of sound data into the D/A and can maintain all other operations and calculations at its nominal clock speed.

After the Doppler shift has occurred, the sounds must return to normal as the trains moves away from the observer. This is done gradually by the digital system by changing the sound data output rate to the D/A slowly enough not to be noticed.

50. This OBSG state allows the user to apply a PRP to have a fixed time digital sound record played out that simulates the sounds of a locomotive fireman scraping the ash pan, shaking the grate or dumping the ash. The record will play each time a PRP is applied.

51. This OBSG state allows the user to apply a PRP to activate the tracking sanding effect. When real locomotive slip on the rails, they can apply sand though small feeder pipes to the rails just in front of the wheels to provide extra traction. This is not practical for model trains but there is a way to provide extra traction electrically. The idea is simple enough. In the fifties, the Lionel company added permanent magnets to their engine to magnetize the drive wheels which increased traction to the steel rails considerable. We propose magnetizing the wheels but using electromagnets instead of permanent magnets.

When the user uses a PRP to activate the sanding effect, current will be supplied to electromagnets near the wheels or wheel axle to produce the needed traction. After the engine has climbed the grade or has left the low traction track area, the user will blow a horn or perform some other operation to turn the effect off. The present invention includes the following features:

1. An electronic hysteresis method to detect position 1 and position 2 horn positions on AC powered trains to provide better noise immunity.

2. A method to use the position 1 or position 2 output signals on AC powered trains to provide different effects.

3. A method to use the amount of DC present in the remote control signal for AC powered trains to control some feature in a continuous analog manner.

4. A method to use a motor controller on DC powered trains to prevent the motor from changing direction when the track polarity is reversed.

5. A method to use the direction control switch on DC power packs to provide a polarity reversal or polarity reversal pulse to change polarity of the applied track voltage as a remote control signal.

6. A method to use the direction control switch on DC power packs to provide a polarity reversal or polarity reversal pulse remote control signal when the engine is moving without changing the engine direction but the polarity reversal will change direction of the engine if the power is turned off when the direction button is changed. The engine detects that when the power is re-applied, that the polarity is reversed and understands that it has been requested to move in the other direction.

7. A method of using a coded whistle to turn on or off a remote control feature.

8. A method of using two polarity reversals to produce a polarity reversal pulse (PRP) as a remote control signal.

9. A method to use applied DC voltage in excess of a predetermined value as a remote control signal (HV).

10. A method of applying an HV and then return to low voltage to produce a high voltage pulse (HVP).

11. A method of using one available remote control state to determine the state of an OBSG and the other to operate its corresponding special effect.

12. A method to use HV or HVP to select the OBSG state in a non-moving directional state.

13. A method to use reset (or other non-moving state) to initialize the operating characteristics of an engine.

14. A method of using the operate remote control signal to make a number of option choices for some OBSG by having the options available in a continuous loop.

15. A method to control the sound volume of sound effects in an engine or car by repeated applications of the operate remote control signal to select the volume level in a continuous loop of discrete values.

16. A method to nest selections of OBSG states to make it easier to organize and select the desired option such as the paging concept.

17. A method of sending PRP's of different pulse length to send binary information to the remote object.

18. A method of using brief excursions of the opposite polarity of DC on the track as remote control method that does not greatly affect the speed of a model engine.

19. A method of using a double-pole double-throw switch and a single pass device as a motor controller that will provide forward and reverse direction control, control of neutral and motor speed control.

20. A method of using a double-pole double-throw switch and a single pass device as a motor controller to minimize insertion loss.

21. A method of using a variable load across the motor when it is coasting to produce dynamic braking.

22. A method of isolating the power from different wheel pickups on model engines and the use of an independent on-board motor controller to eliminate the need for reverse loop switches.

23. A method of sensing the power from different isolated wheel pickups to determine the difference between a PR remote control signal and the effects of moving through a polarity reversal from an insulated reverse loop junction.

24. A method of using a special insulating pin to prevent an electrically conducting model railroad wheel from shorting out between two rail sections of different polarity.

25. A method of using the measurement of motor back E.M.F. to have the steam exhaust sound effect in model steam locomotives be synchronized with engine speed.

26. A method of using the measurement of motor back E.M.F. (or other motor speed measurement) to have the sound effect of an electric motor be synchronized with engine speed to model electric type proto-type engines.

27. A method of using the measurement of .motor back E.M.F. (or other motor speed measurement) and the applied motor voltage to calculate the load on the motor to have motor or steam sound effect correspond to how hard the engine is working.

28. A method of using the measurement of .motor back E.M.F. (or other motor speed measurement) and applied motor voltage on each engine in a multiple headed train consist to equalize the power for each engine.

29. A method of using the measurement of motor back E.M.F. (or other motor speed measurement) to determine speed to know how far an engine has traveled for programmed operation of the locomotive.

30. A method of using the measurement of motor back E.M.F. (or other motor speed measurement) to determine how many revolutions a motor has turned to log motor use for maintenance.

31. A method of using the measurement of motor back E.M.F. (or other motor speed measurement) to determine variations in speed during diagnostic tests to determine if the engine is operating smoothly and if its current draw is within specifications.

32. A method of using the measurement of motor back E.M.F. (or other motor speed measurement) to maintain the speed of an AC powered train when a whistle boost signal is applied.

33. A method of using the measurement of motor back E.M.F. (or other motor speed measurement) to produce braking sound effects such as squealing brake shoes, etc.

34. A method of using the measurement of motor back E.M.F. (or other motor speed measurement) to have the clickity-clack sound effects of wheels on track joints correspond to train speed.

35. A method of using the measurement of motor back E.M.F. (or other motor speed measurement) to know the direction of a locomotive or to know that is stopped when power is applied.

36. A method of using the measurement of motor back E.M.F. (or other motor speed measurement) to control motor speed to produce momentum effects during start up and slow down.

37. A method of using the measurement of motor back E.M.F. (or other motor speed measurement) to determine scale miles per hour to calculate Doppler frequency shift sound effects.

38. A method of measuring back E.M.F. for AC power trains by sampling the voltage of the motor at zero crossing of the applied AC wave from.

39. A method to measure motor speed by using an optical receiver and transmitter to shine light on a label of dark and light stripes placed on the motor flywheel.

40. A method to measure motor back E.M.F. by employing a absolute valley detector or minimum absolute voltage which does not require a zero crossing detector.

41. A method of measuring motor back E.M.F. by using a series pass device that can shut off power to the motor for brief periods during the measurement.

42. A method of using a boost type switching regulator circuit to power the on-board electronics that would maintain constant output voltage over the large input voltage range.

43. A method of using a pass device in series with the motor to increase the value of applied voltage (Vmin) where the motor will start to turn but to not limit the applied power at the maximum throttle setting (Vmax); this can easily be done with pulse width duty cycle techniques. This technique decreases the required track voltage range from 0-Vmax to Vmin-Vmax. If Vmin is chosen to be sufficient to keep the on-board electronics operating, then the range of applied voltage can be restricted to Vmin-Vmax with no change in operating performance other than, perhaps, the voltage resolution on some power packs (that is, the number of discrete voltage changes within the limit of Vmin to Vmax).

44. A method of using a controlled pass device in series with the motor to change the motor power versus applied voltage function to provide better control over the motor or to match different engine that have different motors and gearing to operate at the same speed at the same track voltage setting.

45. A method of using a controlled pass device in series with the motor to control the amount of momentum effect that is displayed.

46. A method of using voltage doubling techniques to maintain sufficient voltage for on-board power supplies over the useful input voltage range.

47. A method to apply HV or HVP that has the same polarity of the applied track voltage by using a separate fixed AC outputs, a bridge rectifier, a track polarity detector and a switch to select either polarity of HV.

48. A microprocessor implementation of this invention with ADC and mathematical algorithms for signal detection of HV, HVP, PR, PRP or other signals on the track.

49. A method to select the volume and tone of the audio output from the on-board sound generator by remote control.

50. A method of using battery backup to maintain the operation of the on-board electronics during periods of power shut down.

51. Methods of automatic shut down of the battery after a predetermined time period without track power.

52. A method of sensing the audio output from the audio amplifier with a ADC and mathematical algorithms to determine sound quality or adjust volume to reduce distortion effects under conditions of low voltage or during battery backup.

53. A method of addressing AC powered locomotives by using repeated pressing of the DC remote control signal in addition to the applied AC power where the remote object would count the number of applications of DC until it equaled the identification number stored in the locomotive.

54. A method of sending remote control signals by repeated applications of positive and negative DC control signals in addition to the applied AC power to send binary information to the remote object.

55. A method of addressing a remote object by repeated applications of positive and negative DC control signals in addition to the applied AC power to send binary information to the remote object.

56. A method of addressing DC powered locomotives by using repeated pressing of the PRP remote control signal where the remote object would count the number of applications of PRP until it equaled the identification number stored in the locomotive.

57. A method to have the engine start up sound effect by selecting the engine with a remote control signal and maintaining the control signal for a predetermine time period to initiate the start sequence.

58. A method of using a temporary ID numbers for locomotives with different ID numbers to allow a number of locomotives to operate in a group for multiple head trains and all "temporarily" respond to the same ID number.

59. A method to clear the temporary ID number to return each engine to its assigned ID number.

60. A method to set an engine into slave status where the horn, bell and perhaps lights and couplers will not respond to remote control signals but other appropriate sounds and features remain like engine sounds for diesels or steam chuff for steam engines.

61. A method to set an engine in "reversal" where the engine resets to reverse rather than forward to allow engines to face in opposite directions in a multiple consist and run in the same direction.

62. A method to set the chuff volume or diesel motor sound independent from other sound effects on a model engine.

63. A method to turn on and off a smoke generator unit for diesels and steam by remote control and a method to change the amount of smoke generated depending on how hard the engine is working.

64. A method to have the model engine perform different programs of automatic train operation where the engine will change speed, blow whistle, turn on bell, stop to pick up passengers, etc.

65. A method to have the engine learn different programs for automatic operation.

66. A method to produce the illusion of moving people in passenger cars, building, etc. by using computer graphics techniques to have animated silhouettes displayed in window or door areas.

67. A method to have station arrival and departure announcements correspond to the correct train by having the announcements come from the locomotive sound generator itself. Station announcements could be done as part of automatic operation or could be a stand alone feature that was initiated by a remote control signal.

68. A method to determine the location and identity of an engine by using a bar code label under the engine that would be read by a bar code reader under the track.

69. A method to determine the location and identity of an engine by using a LED transmitter located in the engine transmitting digitally encoded information of the train identity to a stationary LED receiver beside or on the track.

70. A technique to identify an engine by both its group number (called road ID number) and its individual engine number (call engine ID number) to make it easy to organize and select an individual engine.

71. A method for the user to assign ID number to his engines by having the engine count the number of times a remote control signal has been applied.

72. A method to clear all or pan of the engine commands that are stored in memory to restore the engine to factory original conditions.

73. A method to set the engine to respond differently to different transformers since each has slightly different methods of sending their remote control signals or different methods of changing the power applied to the track.

74. A method to set an engine to have different feature sets (referred to as different systems) to allow the user to configure his engine response to his own abilities and the limitations of his layout and to allow the system to be expandable in the future.

75. A method to set the track voltage threshold where the steam chuff starts (or diesel engine starts to rev up) and a method to set track voltage where the maximum chuff rate (or maximum diesel R.P.M.) will occur. This allows the user to set the engine to correct performance for his engines combination of motor, gear ratio, and drag.

76. Methods to allow the user to customize his horn by selecting any combination of available tones from a library of stored horn records.

77. A method to select from a number of different operations of over head blinking light.

78. A method to provide audio feedback to indicate when a remote control signal has been sent and a method to turn this feedback effect off when not needed.

79. A method to provide standard audio tones for testing the system.

80. A method to digitize the audio output from the sound system and compare with standard test tone records to determine if the system is within specifications.

81. A method to connect the on-board computer to another computer to determine status of the system or to communicate between the two computers or between two on-board systems to exchange information.

82. A method to toggle off a long sound record that will insure that the sound effect is not accidentally turned back on by repeated application of the remote control signal. Any number of applications of the remote control signal will shut the sound effect off until the sound is not heard; there after the remote control signal will toggle it back on.

83. A method to lock the on-board state generator in the current directional state by applying a PR and then turning the power off for not less than a predetermined time period and not more than a second predetermined time period.

84. A method to un-lock the on-board state generator from its current directional state by applying a PR and then turning off the power for not less than a predetermined time period.

85. A method to simulate the sound effects that would normally come from outside an engine such filling of a steam tender from a water tank or filling the fuel tank, or the sound of loading and unloading passengers, filling the sand domes, washing the engine or cars, loading the baggage cars, etc. with sound effects generated inside the engine.

86. A method to use an unlock procedure (applying a PR and waiting for the reset time out) to enter the reset state.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

We claim:

1. A model train locomotive for use on a model railroad track that is coupled to a power supply for controllably applying a polarity-reversible DC track power signal to the track, the locomotive comprising:

a motor for driving the locomotive over the track;

means for isolating the motor from the track so as to allow use of polarity-reversals on the track power signal for controlling remote effects; and means responsive to polarity-reversals on the DC track power signal for controlling remote effects without reversing the motor[.]

*wherein the DC track power signal consists of an adjustable-voltage electric current having a single, selected polarity except when at least one polarity-reversal occurs for controlling remote effects.*

2. A model train locomotive according to claim 1 wherein the means for controlling remote effects includes:

an on-board electronic state generator for indicating a present state that is one of a predetermined series of states, at least one of the states having a corresponding remote effect associated therewith;

means coupled to the electronic state generator and responsive to a first remote control signal conveyed to the locomotive over the track for changing the present state of the state generator to a present state that corresponds to a desired remote effect, thereby selecting the desired remote effect; and means coupled to the electronic state generator and responsive to a second remote control signal conveyed to the locomotive over the track for operating the selected remote effect, whereby multiple remote effects are controllable through use of the first and second remote control signals.

3. A model train locomotive according to claim 2 wherein one of the first and second remote control signals includes a reversal in polarity of the DC power signal applied to the track (PR).

4. A model train locomotive according to claim 2 wherein one of the first and second remote control signals comprises two reversals in polarity of the DC power signal applied to the track, the two reversals occurring within a predetermined time interval so as to form a polarity reversal pulse (PRP).

5. A model train locomotive according to claim 2 wherein one of the first and second remote control signals includes an interruption in the DC track power signal having a duration greater than a predetermined minimum duration.

6. A model train locomotive according to claim 2 wherein one of the first and second remote control signals includes a track power signal having a voltage magnitude in excess of a predetermined level (HV).

7. A model train locomotive according to claim 2 wherein one of the first and second remote control signals includes a high voltage pulse (HVP) on the track power signal.

8. A model train locomotive according to claim 1 further comprising a motor reverse unit for driving the motor according to a selectable direction state, whereby the motor direction is controllable independently of the polarity of the DC power signal applied to the track.

9. A model train locomotive according to claim 8 wherein the motor reverse unit has a plurality of selectable direction states including forward, reverse and neutral direction states, and further includes means for changing the direction state in response to an interruption in the DC track power signal having a duration greater than a predetermined minimum duration.

10. In a DC powered model train locomotive having a motor, a method of using polarity reversals of the DC track power signal as a remote control signal, the method comprising the steps of:

receiving the DC track power signal through the wheels of the locomotive;

rectifying the DC track power signal so as to form a DC output signal having a predetermined polarity independent of the polarity of the DC track power signal;

selecting a direction state that is one of a predetermined series of direction states including forward, reverse and neutral states;

selecting a DC signal polarity for driving the motor in a motor direction corresponding to the selected direction state; and applying the DC output signal to the motor with the selected DC signal polarity, thereby driving the motor in the motor direction corresponding to the selected direction state notwithstanding a reversal in polarity of the DC track power signal.

11. A method according to claim 10 further comprising: detecting a polarity reversal of the DC track power signal; and controlling a remote effect in response to the detected polarity reversal.

12. A method according to claim 10 further comprising:

selecting a desired remote effect; and operating the selected remote effect in response to a polarity reversal of the DC track power signal.

13. A method according to claim 10 further comprising:

in response to an interruption in the DC track power signal having a duration greater than a predetermined minimum duration, resetting the on-board electronic state generator so as to select a .reset state as the present state.

14. A method according to claim 10 further comprising, in response to an interruption in the DC track power signal having a duration greater than a predetermined minimum duration, changing the selected direction state.

15. A method according to claim 10 further comprising changing the direction state in response to a polarity reversal of the DC track power signal.

16. In a DC powered model train locomotive having a motor, a method of using polarity reversals of the DC track power signal as a remote control signal, the method comprising the steps of:

maintaining a selected one at a time of a series of On-Board State Generator (OBSG) states, at least one of the OBSG states having a corresponding remote effect associated therewith;

changing the OBSG state by applying a first remote control signal to the locomotive; and repeating said changing step so as to select the OBSG state that has a desired remote effect associated therewith.

17. A method according to claim 16 wherein each of the OBSG states has a corresponding one of a series of direction states, the series including a forward state, a neutral state, a reverse state and a reset state; and further comprising:

advancing the direction state to a next one of the series of direction states in response to an interruption in the DC track power signal having a duration longer than a predetermined minimum duration.

18. A method according to claim 16 wherein the first remote control signal includes a polarity reversal of the DC track power signal.

19. A method according to claim 16 wherein the first remote control signal includes a high-voltage pulse on the track power signal.

20. A method according to claim 16 further comprising operating the selected remote effect in response to a second remote control signal.

21. A method according to claim 20 wherein the second remote control signal includes a polarity reversal of the DC track power signal.

22. A method according to claim 20 wherein the second remote control signal includes a polarity reversal pulse on the DC track power signal.

*23. A model train locomotive according to claim 1 wherein the means responsive to polarity-reversals on the DC track power signal for controlling remote effects includes:*

*an on-board electronic state generator ("OBSG") for indicating a present state that is one of a predetermined series of states, at least one of the states having a corresponding remote effect associated therewith;*

*means coupled to the electronic state generator and responsive to a remote control signal conveyed to the locomotive over the track for operating a selected remote effect, whereby multiple remote effects are controllable through use of the on-board electronic state generator and the remote control signals.*

*24. A model train locomotive according to claim 23 where at least one of said states with corresponding remote control effect exists only for a predetermined amount of time.*

*25. A model train locomotive according to claim 24 where the series of states includes a temporal state with corresponding remote control effect is activated when a horn remote control signal is present for a predetermined amount of time.*

*26. A model train locomotive according to claim 25 where succession and reapplication of said horn signal will acti-*

*vate said corresponding remote control effect associated with the temporal state if reapplication of horn signal occurs while said temporal state is present.*

*27. A model train locomotive according to claim 26 where said remote effect is a Doppler shift effect that affects the frequency and volume of electronic on-board locomotive sounds.*

*28. A model train locomotive according to claim 27 where said Doppler shift effect sounds gradually return to normal sounds after a predetermined period of time after said reapplied horn signal stops.*

*29. A model train locomotive according to claim 23 additionally comprising detection means responsive to two reversals of polarity of the DC track power signal applied to the track, the two reversals occurring within a predetermined time interval so as to form a polarity reversal pulse (PRP).*

*30. A model train locomotive according to claim 29 additionally comprising digital detection means responsive to digital data from a series of PRP's.*

*31. A model train locomotive according to claim 30, where the digital detection means is responsive to a counted number of PRP remote control signals.*

*32. A model train locomotive according to claim 29, where the PRP detection means is responsive by advancing feature options with each application of a PRP remote control signal.*

*33. A model train locomotive according to claim 29 further comprising means responsive to the pulse width of a PRP remote control signal.*

*34. A model train locomotive according to claim 29 further comprising means responsive to PRP's of different pulse widths of a remote control signal.*

*35. A model train locomotive according to claim 30 further comprising means responsive to a series of PRP's of different pulse widths of a digital remote control signal.*

*36. A model train locomotive according to claim 30 where PRP signals are of such short duration that the speed of standard DC powered locomotives are not noticeably affected when PRP signaling is being sent.*

*37. A model train locomotive according to claim 1 further comprising a motor controller, and wherein the power applied to the motor by the motor controller, or throttle setting, is a function of a voltage of the polarity-reversible DC track power signal applied to the track.*

*38. A model train locomotive according to claim 37 where the amount of applied DC track power signal voltage is varied by amplitude of the DC track power signal waveform.*

*39. A model train locomotive according to claim 37, where the amount of applied DC track power signal voltage is varied by pulse-width modulation of the DC track power signal waveform.*

*40. A model train locomotive according to claim 37, where the amount of applied DC track power signal voltage is varied by amplitude of a filtered pure DC track power signal waveform.*

*41. A model train locomotive according to claim 37, where the amount of applied DC track power signal voltage is varied by a combination of pulse-width modulation and amplitude variation of the DC track power signal wavefrom.*

*42. A model locomotive according to claim 37 whereby the motor controller is responsive only to the amount of the applied DC track power signal voltage above a predetermined value.*

*43. A model locomotive according to claim 37 further comprising mathematic methods to change the functional response of the motor controller to the amount of applied DC track power signal voltage to match performance of other locomotives that have different motor and gearing characteristics.*

*44. A model train locomotive according to claim 37 additionally comprising detection means responsive to two reversals of polarity of the DC track power signal applied to the track, the two reversals occurring within a predetermined time interval so as to form a polarity reversal pulse (PRP).*

*45. A model train locomotive according to claim 44 additionally comprising digital detection means responsive to digital data from a series of PRP's.*

*46. A model train locomotive according to claim 44 further comprising detection means responsive to the pulse width of a PRP remote control signal.*

*47. A model train locomotive according to claim 45 further comprising detection means responsive to PRP's of different pulse widths of a remote control signal.*

*48. A model train locomotive according to claim 45 further comprising detection means responsive to PRP's of different pulse widths of a digital remote control signal.*

*49. A model train locomotive according to claim 1 where the motor is a DC permanent magnet type.*

*50. A model train locomotive according to claim 1 where the motor is an AC/DC Universal type.*

*51. A model train locomotive according to claim 1 where the means responsive to polarity-reversals is a detector with inputs connected to the track.*

*52. A model train locomotive according to claim 51 where the detector is analog.*

*53. A model train locomotive according to claim 51 where the detector is digital.*

*54. A model train locomotive according to claim 53 where the detector is a microprocessor-based system that digitizes and analyzes the track voltage by mathematic methods.*

*55. A model train locomotive according to claim 1 where isolation means is a full-wave bridge rectifier.*

*56. A model train locomotive according to claim 1 where isolation means are relays.*

*57. A model train locomotive according to claim 1 where isolation means are independent full-wave bridge rectifiers with each bridge input connected to different locomotive pickup pairs.*

*58. A model train locomotive according to claim 57 further comprising detection means to detect the polarity of each pickup pair.*

*59. A model train locomotive according to claim 58 further comprising means to discriminate between traversing a reverse loop and detection of polarity reversal remote control signals (PR's or PRP's).*

*60. A model train locomotive according to claim 1 where said model railroad track further comprises raised insulators at specific track joints to prevent pickup wheels on said locomotive from shorting between two contiguous rail sections of different polarity.*

*61. A model train locomotive according to claim 1 further comprising means to affect the motor power and motor direction independently of the applied track voltage.*

*62. A model train locomotive according to claim 61 with means to detect motor speed to determine locomotive speed.*

*63. A model train locomotive according to claim 62 where motor speed detection means is measurement of Back EMF of the motor.*

*64. A model train locomotive according to claim 62 further comprising:*

*A flywheel connected to the motor shaft with parallel dark and light bands,*

*An L.E.D. transmitter and receiver pair mounted next to the flywheel to detect the motion of the dark and light bands as the flywheel turns,*

*An output of the L.E.D. receiver connected to a microprocessor to determine the locomotive speed.*

*65. A model train locomotive according to claim 23 where an on-board state generator (OBSG) state is the locomotive speed.*

*66. A model train locomotive according to claim 61 where the motor power and direction control means are responsive to PR signals.*

*67. A model train locomotive according to claim 66 where motor direction means are responsive to power being reapplied with a changed polarity.*

*68. A model train locomotive according to claim 1 comprising:*

*motor power control circuitry,*

*a sound reproducing system,*

*a memory that stores a plurality of digital sound samples at different memory locations wherein the sound effects contain multiple samples that emulate a train locomotive under different conditions; and*

*a controller connected to the memory for recalling at least one of the sound effects, wherein the controller is an integrated sound, motor, and remote effects controller.*

*69. A model train locomotive according to claim 68 where said controller is a microprocessor.*

*70. A model train locomotive according to claim 68 wherein the controller includes random effects.*

*71. A model train locomotive according to claim 70 wherein the random effects include random variation lighting intensity to simulate a fire.*

*72. A model train locomotive according to claim 1 wherein the means for controlling remote effects is responsive to cessation of the DC track power signal to affect remote effects.*

*73. A model train locomotive according to claim 1 wherein the means for controlling remote effects is responsive to two reversals of polarity of the track power signal applied to the track, the two reversals occurring within a predetermined time interval so as to form a polarity reversal pulse (PRP).*

*74. A model train locomotive according to claim 73 additionally comprising detection means responsive to data from a series of PRP's.*

*75. A model train locomotive according to claim 73 further comprising detection means responsive to the pulse width of a PRP remote control signal.*

*76. A model train locomotive according to claim 74 further comprising detection means responsive to PRP's of different pulse widths of a remote control signal.*

*77. A model train locomotive according to claim 68 where commands are amplified bi-polar digital signals made up of a series of PRP's of different pulse widths (Frequency Shift Keying "FSK" transmissions) to allow locomotive addressing, control of locomotive motor, control of sound effects and special effects.*

*78. A model train locomotive according to claim 68 where the DC track power signal is superimposed on 50/60 Hz AC track power with plus and/or minus DC signaling to control remote effects.*

*79. A model train locomotive according to claim 68 wherein the sound reproducing system is controlled by said controller to affect the quality and quantity of the sounds.*

*80. A model train locomotive according to claim 79 wherein system volume is controlled by said controller and by remote control commands from a user.*

*81. A model train locomotive according to claim 80 where each PRP incrementally affects the system volume.*

*82. A model train locomotive according to claim 79 further comprising standard audio test tones for testing the sound reproducing system .*

*83. A model train locomotive according to claim 79 wherein a system tonal quality is controlled by said controller and by remote control commands from a user.*

*84. A model train locomotive according to claim 79 further comprising means to sense audio output from the sound reproducing system, and software means to determine the quality of the sound.*

*85. A model train locomotive according to claim 84 further comprising means to change the system volume to reduce distortion under conditions of low voltage.*

*86. A model train locomotive according to claim 84 where sensing means to sense the audio output is an on-board digitizer (ADC).*

*87. A model train locomotive according to claim 84 where said quality of sound is used to determine if sound quality is within specifications.*

*88. A model train locomotive according to claim 87 further comprising standard audio test tones for testing the audio system.*

*89. A model train locomotive according to claim 79 wherein individual sound sample volume is controlled by said controller and by remote control commands from a user.*

*90. A model train locomotive according to claim 89 where said commands are repeated PRP where each PRP incrementally affects the individual volume.*

*91. A model train locomotive according to claim 69 wherein said motor control circuitry is controlled by said microprocessor to affect the motor power and motor direction independently of the track voltage polarity.*

*92. A model train locomotive according to claim 91 wherein motor operation includes separate neutral non-moving states.*

*93. A model train locomotive according to claim 91 wherein said motor control circuitry comprises relays and/or pass devices to affect the motor power and direction through microprocessor control.*

*94. A model train locomotive according to claim 93 wherein said pass devices use pulse width modulation (PWM) to change the motor power though microprocessor control.*

*95. A model train locomotive according to claim 93 wherein said pass devices are SCR's, Transistors, Triac's, or HEXFET's.*

*96. A model train locomotive according to claim 68 whereby the motor control circuitry is responsive only to the amount of the applied track power signal above a predetermined value.*

*97. A model train locomotive according to claim 68 further comprising mathematic methods to change the functional response of the motor control circuitry to the variable voltage track power signal to match performance of other locomotives that have different motor and gearing characteristics.*

*98. A model train locomotive according to claim 78 further comprising means to determine locomotive speed and detector means responsive to DC horn commands to maintain constant speed when horn commands are applied.*

*99. A model train locomotive according to claim 78 where said superimposed plus and minus DC signaling on AC track power are binary digital commands to allow locomotive addressing, control of locomotive motor, control of sound effects and special effects.*

*100. A model train locomotive according to claim 78 wherein track detector means responds to a magnitude of superimposed plus and minus DC signaling to affect features in an analog manner.*

*101. A model train locomotive according to claim 69 further comprising means to determine locomotive speed.*

*102. A model train locomotive according to claim 101 where means to determine locomotive speed comprises:*

*a magnet;*

*magnetic field sensor,*

*wherein the sensor is affected by the relative motion of said magnet and magnet field sensor.*

*103. A model train locomotive according to claim 102 wherein*

*the magnet is a magnetic pole piece of an electric motor,*

*the magnetic field sensor is an electric motor armature,*

*where the sensor is affected by the relative motion of said motor magnetic pole pieces by producing a measurable voltage (back-EMF) proportional to the rotation velocity of said motor armature.*

*104. A model train locomotive according to claim 103 further comprising:*

*an Analog to Digital Converter (ADC) connected directly to motor brush terminals to measure the motor Back EMF during periods when the applied motor voltage is below the generated Back EMF;*

*the said ADC digital output connected to said microprocessor to determine the locomotive speed.*

*105. A model train locomotive according to claim 104 wherein said motor controller disconnects the motor from the motor power source for a specified period of time to allow said ADC to measure the motor Back EMF.*

*106. A model train locomotive according to claim 69 further comprising:*

*A flywheel connected to the motor shaft with parallel dark and light bands,*

*An L.E.D. transmitter and receiver pair mounted next to the flywheel to detect the motion of the dark and light bands as the flywheel turns,*

*The output of the L.E.D. receiver connected to a microprocessor to determine the locomotive speed.*

*107. A model train locomotive according to claim 104 where the microprocessor can calculate and log an approximate number of motor revolutions for use in locomotive maintenance.*

*108. A model train locomotive according to claim 104 further comprising means for diagnostic testing, wherein the microprocessor determines from said speed measurements the amount of binding or irregularities in motor performance or the amount of current draw or the sound quality.*

*109. A model train locomotive according to claim 104 further comprising means to report when the motor has stopped or report the direction of rotation of the motor when powered.*

*110. A model train locomotive according to claim 101 where Back EMF or other motor speed measurement is used to determine the speed of the locomotive in scale miles per hour.*

*111. A model train locomotive according to claim 110 wherein the microprocessor calculates by mathematical methods how far a locomotive has traveled by time and speed measurement.*

*112. A model train locomotive according to claim 110 where the microprocessor can calculate by mathematical methods how far a locomotive has traveled by time and speed measurement.*

*113. A model train locomotive according to claim 68 where sound samples are digital.*

*114. A model train locomotive according to claim 68 where sound samples can be played at the same time.*

*115. A model train locomotive according to claim 113 where sound samples emulate a prototype locomotive at different speeds.*

*116. A model train locomotive according to claim 115 where digital sound samples are of prototype locomotive electric traction motors at different speeds.*

*117. A model train locomotive according to claim 115 where digital sound samples are of prototype locomotive steam engine exhaust at different speeds.*

*118. A model train locomotive according to claim 101 further comprising at least one of the following: digital sound samples of prototype steam exhaust at different speeds or traction motors at different RPM's, wheel clickity-clack at different speeds, squealing brake sounds wherein appropriate sounds are synchronized to the locomotive speed.*

*119. A model train locomotive according to claim 69 further comprising:*

*A speed control circuit on-board the model locomotive coupled to the microprocessor,*

*A speed sensor on-board the locomotive coupled to the microprocessor for sensing the present speed of the model locomotive,*

*A motor voltage sensor for sensing the present applied motor voltage,*

*Software means to compute the motor load, and*

*Software routines, which decrease or increase motor power to equalize the powered shared between locomotives motors in multiple headed train consists.*

*120. A model train locomotive according to claim 69 further comprising:*

*A speed control circuit on-board the model locomotive coupled to the microprocessor,*

*A speed sensor on-board the locomotive coupled to the microprocessor for sensing the present speed of the model locomotive,*

*Remote control commands to set the speed of the locomotive, and*

*Software routines, which compare the speed from said speed sensor, compared to said set speed for controlling the motor so that the locomotive speed matches the set speed.*

*121. A model train locomotive according to claim 120 wherein the speed of the model locomotive is maintained at substantially the set speed regardless of changes in model train work load.*

*122. A model train locomotive according to claim 69 further comprising:*

*means for adjusting the locomotive's speed,*

*means for sensing the locomotive's present speed, and wherein the microprocessor receives commands to set the desired speed, for comparing the present speed to the set speed and for controlling the means for adjusting so that the locomotive's speed substantially matches the set speed.*

*123. A model train locomotive according to claim 122 further comprising means for sensing the load conditions of the model train, whereby said microprocessor takes the load conditions into account when controlling the means for adjusting.*

*124. A model train locomotive according to claim 69 comprising:*

*software to process one of said commands to set speed of said locomotive;*

*a motor control circuit; and*

*a speed control circuit that monitors the locomotive's speed and provides information to the microprocessor concerning a current speed of the locomotive, such that the processor compares the present speed of the locomotive to the set speed and outputs a command to a motor control circuit to drive the train to run at a set speed.*

*125. A model train locomotive according to claim 124 wherein the microprocessor commands the motor driving means to increase the motor power as the locomotive moves up a grade and to decrease the motor power as the locomotive moves down a grade in order to maintain the locomotive at the set speed.*

*126. A model train locomotive according to claim 124 wherein the microprocessor commands the motor power control circuitry to change the power to the motor as the track voltage changes in order to maintain the locomotive at the set speed.*

*127. A model train locomotive according to claim 124 wherein the microprocessor commands the motor driving means to increase the motor power as the locomotive moves through tight curves in order to maintain the locomotive at the set speed.*

*128. A model train locomotive of claim 124 whereby the microprocessor commands the motor control circuit to increase the motor power due to increased load conditions on the locomotive.*

*129. A model train locomotive of claim 124 whereby the microprocessor commands the motor control circuit to increase the motor power as the locomotives moves up grade.*

*130. A model train locomotive of claim 124 whereby the microprocessor commands the motor control circuit to decrease the motor power as the locomotive moves down grade.*

*131. A model train locomotive of claim 124 wherein the model train's speed is calibrated in scale miles-per-hour.*

*132. A model train locomotive of claim 124 wherein the microprocessor commands the motor control circuit to increase the motor power when load conditions on the locomotive increase, and to decrease the motor power when load conditions on the locomotive decrease in order to maintain the locomotive at the set speed.*

*133. A model train locomotive of claim 124 wherein the microprocessor commands the motor control circuit to increase the motor power as the train moves up grade and to decrease the motor power as the locomotive moves down grade in order to maintain the train at the desired speed.*

*134. A model train locomotive of claim 124 wherein the microprocessor software further includes programmed speeds at different times to simulate locomotive momentum during gradual startup or gradual slow down.*

*135. A model train locomotive according to claim 69 further comprising:*

*Means for receiving commands corresponding to a set speed of said locomotive,*

*means for sensing the model locomotive's present speed,*

*means for driving the motor,*

*the microprocessor receiving information concerning the model locomotive's present speed and commanding the motor driving means to adjust the locomotive's present speed to match the set speed.*

*136. A model train locomotive of claim 135 wherein the means for sensing continuously monitors the speed of the locomotive.*

*137. A model train locomotive of claim 135 whereby the microprocessor commands the motor driving means to increase the motor power due to increased load conditions on the locomotive.*

*138. A model train locomotive of claim 135 whereby the microprocessor commands the motor driving means to change the motor power as the locomotive moves up grade.*

*139. A model train locomotive of claim 135 whereby the microprocessor commands the motor driving means to decrease the motor power as the locomotive moves down grade.*

*140. A model train locomotive of claim 135 whereby the microprocessor commands the motor driving means to change the motor power of the locomotive due to changed load conditions on the locomotive.*

*141. A model train locomotive of claim 135 wherein the model locomotive's speed is calibrated in scale miles-per-hour.*

*142. A model train locomotive of claim 135 wherein the microprocessor commands the motor driving means to increase power to the motor when load conditions on the locomotive increase, and to decrease power to the motor when load conditions on the locomotive decrease in order to maintain the locomotive at the set speed.*

*143. A model train locomotive according to claim 113 where digital sound samples emulate a prototype locomotive at different workloads.*

*144. A model train locomotive according to claim 143 where digital sound samples are changed in volume to simulate a prototype locomotive at different workloads.*

*145. A model train locomotive according to claim 135 further comprising sound samples that emulate a prototype locomotive at different workloads, such that said different workload sounds are synchronized to the momentum simulation.*

*146. A model train locomotive according to claim 143 further comprising means to compute actual motor loading such that said digital sound samples emulating different workloads are synchronized to said actual motor loading.*

*147. A model train locomotive according to claim 143 where digital sound samples emulate a prototype electric locomotive traction motors at different workloads.*

*148. A model train locomotive according to claim 143 where digital sound samples emulate a prototype steam locomotive steam exhaust (chuff) at different workloads.*

*149. A model train locomotive according to claim 143 where digital sound samples emulate a prototype diesel motor at different workloads.*

*150. A model train locomotive according to claim 143 where digital sound samples emulate prototype diesel locomotive dynamic brakes at different workloads.*

*151. A model train locomotive according to claim 68 where digital sound samples simulate the sounds of a prototype locomotive during start up.*

*152. A model train locomotive according to claim 151 where start-up sounds are responsive to a remote control signal.*

*153. A model train locomotive according to claim 151 where digital sound samples simulate sounds of a poorly maintain prototype locomotive during start up.*

*154. A model train locomotive according to claim 151 further comprising sound samples of a poorly maintained prototype locomotive such that at startup, said poorly maintain sounds are played as an indication of needed maintenance.*

*155. A model train locomotive according to claim 68 where digital sound samples simulate prototype locomotive bells.*

*156. A model train locomotive according to claim 155 where the simulated prototype locomotive bells are responsive only to a PRP signal with duration less than a predetermined pulse width.*

*157. A model train locomotive according to claim 156 where the simulated prototype locomotive bells are non-responsive to a command to turn the bell on until the bell record has stopped playing.*

*158. A model train locomotive according to claim 68 where digital sound samples simulate prototype locomotive horns or whistles.*

*159. A model train locomotive according to claim 158 where the simulated prototype locomotive horns are responsive to a PRP by continuing to sound during the duration of said PRP.*

*160. A model train locomotive according to claim 158 where the simulated prototype locomotive horn effect is responsive only to a PRP in excess of a predetermined pulse width.*

*161. A model train locomotive according to claim 68 where digital sound samples simulate sounds of prototype locomotive braking.*

*162. A model train locomotive according to claim 135 where digital sound samples simulate sounds of prototype locomotive coupler opening sounds.*

*163. A model train locomotive according to claim 162 where said coupler sounds include at least one of the lift bar being raised, the coupler knuckle opening up and the brake air lines parting.*

*164. A model train locomotive according to claim 135 further comprising means to uncouple the locomotive.*

*165. A model train locomotive according to claim 164 where means to uncouple the locomotive are responsive to PRP commands.*

*166. A model train locomotive according to claim 165 and claim 161 where means to uncouple the locomotive also include sound effects of coupler opening.*

*167. A model train locomotive according to claim 68 where digital sound samples simulate sounds of prototype locomotive stopping at a passenger station.*

*168. A model train locomotive according to claim 167 where station stopping sounds include at least one of arriving announcement of correct train name, arrival announcement of track number, departure announcement of correct train name, and names of destination cities and towns.*

*169. A model train locomotive according to claim 68 where digital sound samples simulate the sounds of a prototype locomotive refueling.*

*170. A model train locomotive according to claim 169 where refueling sounds are responsive to an extended PRP.*

*171. A model train locomotive according to claim 68 where digital sound samples simulate the sounds of a prototype steam locomotive tender being refilled with water.*

*172. A model train locomotive according to claim 68 where digital sound samples simulate the sounds of prototype locomotive being refilled with sand.*

*173. A model train locomotive according to claim 68 where digital sound samples simulate the sounds of coal being shoveled into the firebox.*

*174. A model train locomotive according to claim 68 where digital sound samples simulate the sounds of the scraping of the ash pan, shaking the grate or dumping the ash.*

*175. A model train locomotive according to claim 68 comprising digital sound samples of individual tones of prototype locomotive horns or whistles, and means to allow the user to combine any number of said individual tones to produce a variety of multi-chime whistle or horns from a limited number of individual tones.*

*176. A model train locomotive according to claim 68 comprising digital sound samples of locomotive sounds generated from the locomotive with digital sound samples of environmental sounds from outside the locomotive.*

*177. A model train locomotive according to claim 68 further comprising means to select locomotive by their Identification (ID) numbers and select consist ID numbers (Temporary ID numbers) using PRP remote control signals.*

*178. A model train locomotive according to claim 177 further comprising means to indicate the locomotive being selected through operation of locomotive lights.*

*179. A model train locomotive according to claim 68 wherein the locomotive can be configured to respond to signals from one or more operating modes and power sources, including means responsive to standard variable voltage DC track power, means responsive to standard variable AC track power and means responsive to one or more Command Control systems available.*

*180. A model train locomotive according to claim 179 wherein the Digital Command Control signals are bi-polar signals made up of a series of PRP's of different pulse widths (FSK) under high-speed digital control.*

*181. A model train locomotive according to claim 69 further comprising:*

*an electrical power supply having a means for collecting the AC or DC track power signal from the conductive rails,*

*means to convert the AC or DC track power to internal DC regulated power supplies for audio and microprocessor power, independent of the polarity of the track voltage.*

*182. A model train locomotive according to claim 181 further comprising means to filter the low-level noise in the reception of the track power signal for sound and control of the locomotive control system.*

*183. A model train locomotive according to claim 182 where said means to convert the AC or DC track power consists of:*

*A bridge rectifier circuit,*

*filter capacitors,*

*and linear regulators to provide stable voltages for the locomotive control system.*

*184. A model train locomotive according to claim 181 where electrical power supply means is a switching regulator.*

*185. A model train locomotive according to claim 181 where the electrical power supply is a voltage doubler circuit.*

*186. A model train locomotive according to claim 181 further comprising a charge storage device to provide backup system power during low track-voltage or high system-power requirements.*

*187. A model train locomotive according to claim 186 further comprising battery control circuitry to disconnect the battery from the system power supply when track power is shut off.*

*188. A model train locomotive according to claim 186 further comprising means to change the system volume when battery back-up is engaged.*

*189. A model train locomotive according to claim 186 where said charge storage device is a rechargeable battery and further comprising circuit means to recharge the battery from power supplied to the track rails.*

*190. A model train locomotive according to claim 69 further comprising means to initialize or change or set and store locomotive behavioral and operational parameters.*

*191. A model train locomotive according to claim 190 where storage means is a Long Term (non-volatile) Memory device.*

*192. A model train locomotive according to claim 190 where storage means can be cleared or erased using PRP signals.*

*193. A model train locomotive according to claim 190 further comprising means to set and store locomotive Identification (ID) numbers and consist ID numbers using PRP remote control signals.*

*194. A model train locomotive according to claim 190 where locomotive behavioral parameters include setting the threshold motor voltage where the diesel motor sounds revs up or where the steam exhaust chuff sounds starts up.*

*195. A model train locomotive according to claim 190 where locomotive behavioral parameters include setting the voltage where the diesel motor revs up to maximum RPM or where the steam exhaust is at maximum chuff rate.*

*196. A model train locomotive according to claim 68 where the integrated sound, motor, and special effects controller further includes programming means.*

*197. A model train locomotive according to claim 196 where programming means further includes means to enable slave status wherein certain sound effects such as horn and bell, certain light effects, certain coupler operations and sound effects are disabled and non-responsive to their remote control signals.*

*198. A model train locomotive according to claim 196 where programming means further includes means to enable different modes of operation of an overhead blinking light.*

*199. A model train locomotive according to claim 196 where programming means is responsive to PRP signals of different pulse widths.*

*200. A model train locomotive according to claim 196 where the programming means includes a serial port.*

*201. A model train locomotive according to claim 200 where the programming means further includes a personal computer (PC) that is connected to the serial port means.*

*202. A model train locomotive according to claim 201 where the programming means further includes means to exchange information between the PC and the locomotive's integrated sound, motor, and special effects controller.*

*203. A model train locomotive according to claim 196 where the programming means further includes means to program automatic operation of the engine's behavior.*

*204. A model train locomotive according to claim 203 where automatic operation programs include at least one of changes is speed, blowing of whistle, bell operation, and stopping to pick up passengers.*

*205. A model train locomotive according to claim 203 where automatic operation programs includes response to how far a locomotive has traveled to indicate locomotive's location on the layout.*

*206. A model train locomotive according to claim 203 where automatic operation programs includes response to how far a locomotive has traveled and how long it has been operating to indicate the amount of simulated fuel consumed.*

*207. A model train locomotive according to claim 204 where any of a number of preloaded programs can be selected by a user to perform it program of blowing whistles, ringing, bells, etc.*

*208. A model train locomotive according to claim 203 where automatic operation programs includes arrival and departure announcement means that corresponding to the correct train by having the announcements from the engine integrated sound, motor, and remote effects controller.*

*209. A model train locomotive according to claim 196 where the programming means further includes means to learn responses to time sequenced remote control signals from a user.*

*210. A model train locomotive according to claim 196 where the programming means further includes means to learn responses to macro commands from remote control signals.*

*211. A model train locomotive according to claim 203 where the programming means for automatic operation further includes means to interact with control tracks and track sensors.*

*212. A model train locomotive according to claim 211 where the interaction means further includes an LED transmitter means located in the engine and said track sensor means that is a stationary LED receiver beside or on the track to receive digitally encoded information of the train ID from the transmitter means.*

*213. A model train locomotive according to claim 211 where the interaction means further includes a bar-code label under the locomotive and sensor reader in the track to receive digitally encoded information of the locomotive ID from the bar-code label.*

*214. A model train locomotive according to claim 196 further comprising means for audio feedback to a user to indicate confirmation of programming data.*

*215. A model train locomotive according to claim 214 where audio feedback means are one or more bell ding sounds.*

*216. A model train locomotive according to claim 68 where the integrated sound, motor, and remote effects controller further includes a serial port to communicate to other on-board computers to coordinate operation and exchange information.*

*217. A model train locomotive according to claim 91 further comprising:*

*a speed sensor circuit on-board the model locomotive coupled to said microprocessor to monitor the locomotive's speed,*

*and a smoke unit for producing smoke from the model locomotive;*

*wherein said microprocessor controls the sound system circuit and smoke unit such that the train operation sounds and the smoke correspond to the speed of the model locomotive.*

*218. A model train locomotive of claim 217, wherein as the speed of the model locomotive increases, the sound system plays locomotive sounds which simulate a locomotive moving at an increased speed, and the smoke unit produces an increased amount of smoke.*

*219. A model train locomotive of claim 217, wherein said volume of outputted smoke changes when the model locomotive's real or simulated load changes.*

*220. A model train locomotive of claim 218 further comprising a sound system circuit coupled to said processor, wherein said processor controls said sound system circuit so that the sound system circuit outputs sounds based on the model locomotive's speed.*

*221. A model train locomotive of claim 219, wherein reproduced sounds change when the model locomotive's real or simulated load changes.*

*222. A model train locomotive of claim 221, wherein the volume of outputted smoke changes when the model locomotive's load changes.*

*223. A model train locomotive of claim 222, wherein the outputted sound is a chuff sound and the smoke is outputted in puffs.*

*224. A model train locomotive of claim 223, wherein the chuff sounds and the puffs of smoke correspond to the speed of the locomotive.*

*225. A model train locomotive of claim 224, wherein as the model locomotive's load changes, there is a corresponding change in the chuff sounds and the puffs of smoke.*

*226. A model train locomotive of claim 222, wherein the outputted sound is diesel motor sound and the smoke is outputted in a stream.*

*227. A model train locomotive of claim 226, wherein as the model locomotive's load changes, there is a corresponding change in the diesel labored sounds and the stream of smoke.*

*228. A model train locomotive according to claim 1 and further comprising:*

*a sound reproducing system,*

*a first sound memory storing a plurality of sound effects;*

*a controller connected to the first sound memory for recalling one or more of the stored sound effects;*

*a second sound memory containing multiple sound samples that emulate a locomotive operating at various speeds and work-loads;*

*an integrated sound, motor and special effects controller controlled by the bi-polar digital signal, the motor and special effects controller reproducing the stored sounds contained in the model train; and*

*a digital packet triggering a sound effect for automatic playback of a sound effect.*

*229. A model train locomotive according to claim 228 wherein the model locomotive has two or three rails for providing a digital signal and powering the sound effects of the model train, motor and, special effects.*

*230. A model train locomotive according to claim 228 wherein the model locomotive has means for collecting the digital bi-polar signal from any of the two insulated track rails or from an insulated third rail by pickups on insulated wheels; and where said motor insulating means is a bridge rectifier connected to the track with an output producing a DC voltage regardless of the phase of the bi-polar signal; and a regulated power supply to provide power for the controller and audio amplifier.*

*231. A model train locomotive according to claim 228 further comprising means for decoding a properly addressed digital signal for control of the model locomotive's electric motor, control of the sound functions and on-board special effects.*

*232. A model train locomotive according to claim 228 further comprising the steps of: a fixed external source of either AC or DC power and means for connecting a bi-polar digital signal to the sound unit; and means for filtering the low level signal noise in the reception of the bi-polar digital signal for power and control of the sound unit.*

*233. A model train locomotive according to claim 228 further comprising:*

*means to synchronize sound effects through the use or a magnetic field sensor to trigger speed sensitive sounds located in a model train locomotive,*

*wherein the speed sensitive sounds are stored in the memory and include various samples that emulate different speeds and/or workloads;*

*a controller that recalls the same synchronized sound effects at intervals appropriate to the speed of the locomotive using magnetic speed sensing and further wherein multiple sounds can be played at the same time.*

*234. A model train locomotive according to claim 228 further comprising: a controller that decodes address codes within the bipolar digital signal that matches the locomotive address to control the locomotive motor, sound effects and on-board special effects.*

*235. A model train locomotive according to claim 228 further comprising: a magnetic sensor to sense the speed of a steam locomotive to trigger the proper speed sound effect for synchronizing of the sound effect to the speed of the locomotive.*

*236. A model train locomotive according to claim 228 further comprising: a controller that decodes the address of a bipolar digital signal for control of sounds effects, model train propulsion and on-board special effects wherein the controller is operatively connected to the sound storage of the sound effects wherein the sound storage has a predetermined set of sounds at specific addresses; and a controller that is connected to special effects output that controls lighting and other on-board effects.*

*237. A model train locomotive according to claim 228 where in the controller controls the volume of the plurality of sound effects contained in the locomotive.*

*238. A model train locomotive according to claim 228 comprising: a plurality of digitized sounds that are controlled by the controller that receives a bi-polar digital signal.*

*239. A model train locomotive according to claim 228 wherein the enabling means is an internally monitored magnetic sensors responding to a change in magnetic field.*

*240. A model train locomotive according to claim 228 wherein the activation means is a magnetically responsive sensor constructed and arranged near a magnetic field, the magnetic sensor responding to relative changes to its magnetic field.*

*241. A model train locomotive according to claim 1 wherein the remote control signals are high-speed digital bipolar signals (PRP's) for power and control further comprising:*

*a sound reproducing system,*

*a sound memory storing a plurality of sound effects at addresses wherein the sound effects contain multiple samples that emulated a train locomotive at various conditions; and*

*a controller connected to the sound memory for recalling one or more sound effects;*

*an integrated sound, motor and special effects controller controlled by the bi-polar digital signal, the motor and special effects controller reproducing the stored sounds contained in the model train; and a digital signals triggering a sound effect for automatic playback of a sound effect.*

*242. A model train locomotive of claim 241 wherein the sound effects are digital.*

*243. A model train locomotive of claim 241 wherein the sound effects are at predetermined addresses in the sound memory.*

*244. A model train locomotive of claim 241 wherein the controller recalls a plurality of sound effects.*

*245. A model train locomotive of claim 244 wherein the plurality of sound effects are recalled in a predetermined sequence.*

*246. A model train locomotive of claim 241 wherein the various conditions include various speeds.*

*247. A model train locomotive of claim 241 wherein the various conditions include various work-loads.*

*248. A model train locomotive of claim 241 wherein the memory includes a plurality of special effects stored therein and further wherein the model locomotive includes a motor wherein the controller controls the motor.*

*249. A model train locomotive of claim 241 wherein the digital signal is a bipolar digital signal.*

*250. A model train locomotive of claim 241 wherein the digital signal triggers the sound effect.*

*251. A model train locomotive of claim 241 further comprising: an electrical power supply connected to at least one of the plurality of rails; a pick-up means for collecting the digital signal; and a full-wave bridge rectifier connected to the electrical power supply and further having an input for receiving the digital signal and an output wherein the output produces a DC voltage without regard to phase of the digital signal.*

*252. A model train locomotive of claim 241 wherein the memory includes a plurality of special effects stored therein and further wherein the model locomotive includes a motor and means for simultaneously decoding the digital signal for control of the sound effects, the motor and/or the special effects.*

*253. A model train locomotive of claim 241 further comprising: a fixed external source of electrical power; means for connecting the digital signal to the sound memory; and means for filtering the digital signal.*

*254. A model train locomotive of claim 241 further comprising: a speed sync sensor in the controller wherein the controller recalls a plurality of speed sensitive sounds to emulate a speed of the train locomotive based on a speed of the model train wherein the speed sync sensor synchronizes the speed sensitive sounds with the speed of the model train.*

*255. A model train locomotive of claim 241 further comprising: a second memory (RAM) for storing the plurality of sound effects.*

*256. A model train locomotive of claim 241 further comprising: a discrete address contained within said integrated sound, motor and special effects controller wherein the digital signal includes addressing to compare with said discrete address to select the locomotive.*

*257. A model train locomotive of claim 241 wherein the memory includes a plurality of special effects stored therein and further wherein the model locomotive includes a motor and further wherein the model locomotive includes a controller that decodes a digital signal for control of the sound effects, the motor and/or the special effects.*

*258. A model train locomotive of claim 241 wherein the memory includes a plurality of special effects stored therein wherein the special effects include a lighting special effect and further wherein the controller controls the special effects.*

*259. A model train locomotive of claim 241 wherein the plurality of sound effects has a volume controlled by the controller.*

*260. A model train locomotive of claim 241 wherein the controller is programmed to control the sound effects.*

*261. A model train locomotive of claim 241 wherein the sound effects are digitized.*

*262. A model train locomotive of claim 241 further comprising: an activation means for activating the sound effect wherein the activation means is a magnetically responsive sensor.*

*263. A model train locomotive of claim 241 further comprising: means for controlling a variable filter network wherein the variable filter network suppresses audible noise.*

*264. A model train locomotive of claim 241 wherein the sound effects include a sample that emulates a train locomotive at multiple speeds.*

*265. A model train locomotive of claim 241 wherein the controller is an integrated sound, motor, and special effects controller.*

*266. A model train locomotive of claim 241 wherein the controller is controlled by a bipolar digital signal.*

*267. A model train locomotive of claim 241 wherein the controller recalls the sound effects of either one or a plurality of sound effects in a predetermined sequence by means of a bipolar digital signal.*

*268. A model train locomotive of claim 241 wherein the sound effects are replicating momentum effects using steam or diesel sound effects.*

*269. A model train locomotive of claim 241 wherein a sound unit, with a register fixed in firmware or programmable for control variables wherein the control variables are one of acceleration, deceleration, start voltages, motor response curves, momentum sound effects, load factor sound effects, coasting sound effects and means to synchronize sound effects to the rotation of wheels.*

*270. A model train locomotive according to claim 1 that uses high-speed PRP digital control signals for propulsion and control, further comprising:*

*a sound unit,*

*a memory within the sound unit wherein the memory stores a plurality of sound effects at addresses wherein the sound effects contain multiple samples that emulate a prototype train locomotive at various speeds and work-loads, wherein the sound effects simulate the various speeds and various work-loads by comparing the on-off rate of a sensor to a digital speed setting; and a controller connected to the memory for recalling at least one of the sound effects wherein the controller is controlled by a digital signal.*

* * * * *